United States Patent [19]
Yue et al.

[11] Patent Number: 5,857,013
[45] Date of Patent: Jan. 5, 1999

[54] METHOD FOR AUTOMATICALLY RETURNING VOICE MAIL MESSAGES

[75] Inventors: Drina C. Yue; Raymond J. Smets, both of Atlanta; Thomas Joseph Moquin, Roswell; Evan Kraus; Lawrence R. Berke, both of Atlanta, all of Ga.

[73] Assignee: BellSouth Corporation, Atlanta, Ga.

[21] Appl. No.: 881,620

[22] Filed: Jun. 24, 1997

Related U.S. Application Data

[63] Continuation of Ser. No. 623,121, Mar. 28, 1996, Pat. No. 5,717,741, which is a continuation of Ser. No. 368,088, Jan. 3, 1995, abandoned, which is a division of Ser. No. 936,384, Aug. 26, 1992, abandoned.

[51] Int. Cl.⁶ .................................................. H04M 1/64
[52] U.S. Cl. ........................... 379/67; 379/89; 379/355; 379/209
[58] Field of Search .................................. 379/67, 88, 89, 379/201, 209, 216, 355

[56] References Cited

U.S. PATENT DOCUMENTS

| | | |
|---|---|---|
| 2,957,047 | 10/1960 | Wennemer . |
| 3,609,245 | 9/1971 | Richter et al. . |
| 4,277,649 | 7/1981 | Sheinbein . |
| 4,313,035 | 1/1982 | Jordan et al. . |
| 4,371,752 | 2/1983 | Matthews et al. . |
| 4,518,824 | 5/1985 | Mndardini . |
| 4,625,081 | 11/1986 | Lotito et al. . |
| 4,680,785 | 7/1987 | Akyama et al. . |
| 4,740,788 | 4/1988 | Konneker . |
| 4,752,951 | 6/1988 | Konneker . |
| 4,759,056 | 7/1988 | Akyama . |
| 4,769,834 | 9/1988 | Billinger et al. . |
| 4,790,003 | 12/1988 | Kepley et al. ............................. 379/88 |
| 4,791,665 | 12/1988 | AD . |
| 4,853,952 | 8/1989 | Jachmann et al. ........................ 379/89 |
| 4,899,358 | 2/1990 | Blakely ................................... 379/215 |
| 4,899,373 | 2/1990 | Lee et al. . |
| 5,029,196 | 7/1991 | Morganstein . |
| 5,029,200 | 7/1991 | Haas et al. ................................ 379/89 |

(List continued on next page.)

FOREIGN PATENT DOCUMENTS

| | | |
|---|---|---|
| 0 420 527 | 9/1990 | European Pat. Off. . |
| 0 451 695 A2 | 4/1991 | European Pat. Off. . |
| 3315884 | 5/1983 | Germany . |
| 1-149650 | 6/1989 | Japan . |
| 90/01328 | 8/1990 | WIPO . |
| 90/06729 | 11/1990 | WIPO . |
| 91/00483 | 1/1991 | WIPO . |
| 92/00036 | 2/1992 | WIPO . |

OTHER PUBLICATIONS

Inbound/Outbound Magazine, "Automatic Call Distribution", May 1990, pp. 36–42.

British Telecommunications Engineering, vol. 4, Apr. 1985. Newson, "Merlin Voice Mail VM600", pp. 32–35.

Crump, Jr. Cellular Telephones A Layman's Guide, Oct. 1985, pp. 118–121.

Bell Atlantic Service Advertisement for Return Call, Caller ID (Feb. 1990) and Answer Call (Jul. 1992).

*Primary Examiner*—Ahmad F. Matar
*Attorney, Agent, or Firm*—Jones & Askew

[57] ABSTRACT

A method for returning a voice mail message for a subscriber of a voice mail service. The method includes the steps of accessing the voice mail service on a second calling line on the public switched telephone network, playing a first voice mail message for the subscriber, the first voice mail message having been received on a first calling line from a source and the first calling line number having been recorded, receiving a call back indication from the subscriber, automatically generating a call to the source, connecting the subscriber to the first calling line, monitoring the call to determine when the call is terminated, and returning the subscriber to the voice mail service.

20 Claims, 50 Drawing Sheets

U.S. PATENT DOCUMENTS

| | | | |
|---|---|---|---|
| 5,040,208 | 8/1991 | Jolissaint | 379/201 |
| 5,181,236 | 1/1993 | LaVallee et al. | 379/67 |
| 5,185,782 | 2/1993 | Srinivasan . | |
| 5,193,110 | 3/1993 | Jones et al. | 379/88 |
| 5,197,096 | 3/1993 | Sakuma et al. . | |
| 5,241,586 | 8/1993 | Wilson et al. | 379/89 |
| 5,282,243 | 1/1994 | Dabbaghi et al. | 379/142 |
| 5,283,818 | 2/1994 | Klausner et al. | 379/89 |
| 5,309,505 | 5/1994 | Szlam et al. | 379/88 |
| 5,329,578 | 7/1994 | Brennan et al. . | |
| 5,329,583 | 7/1994 | Jurgensen et al. | 379/266 |
| 5,434,909 | 7/1995 | Price et al. | 379/88 |

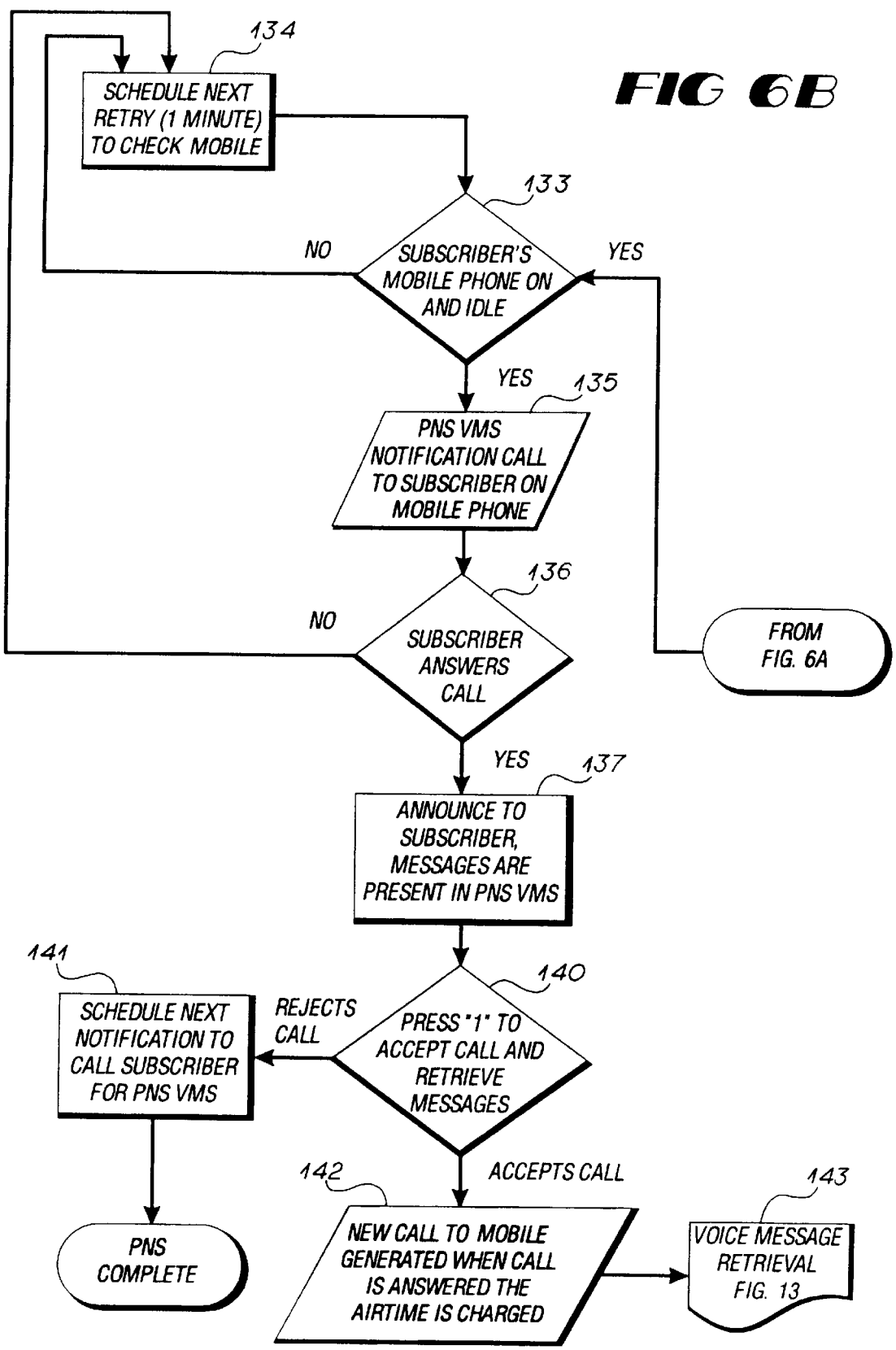

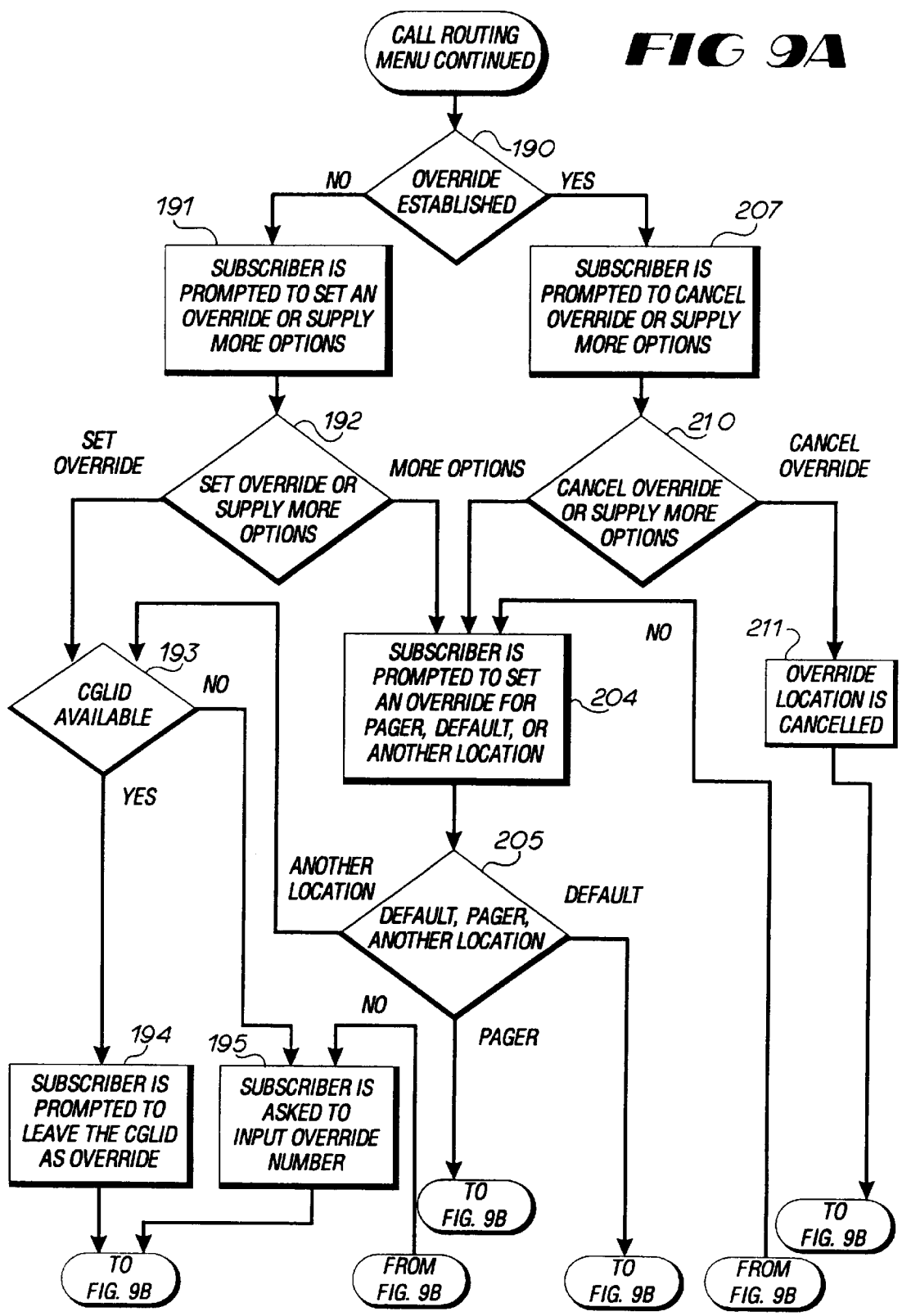

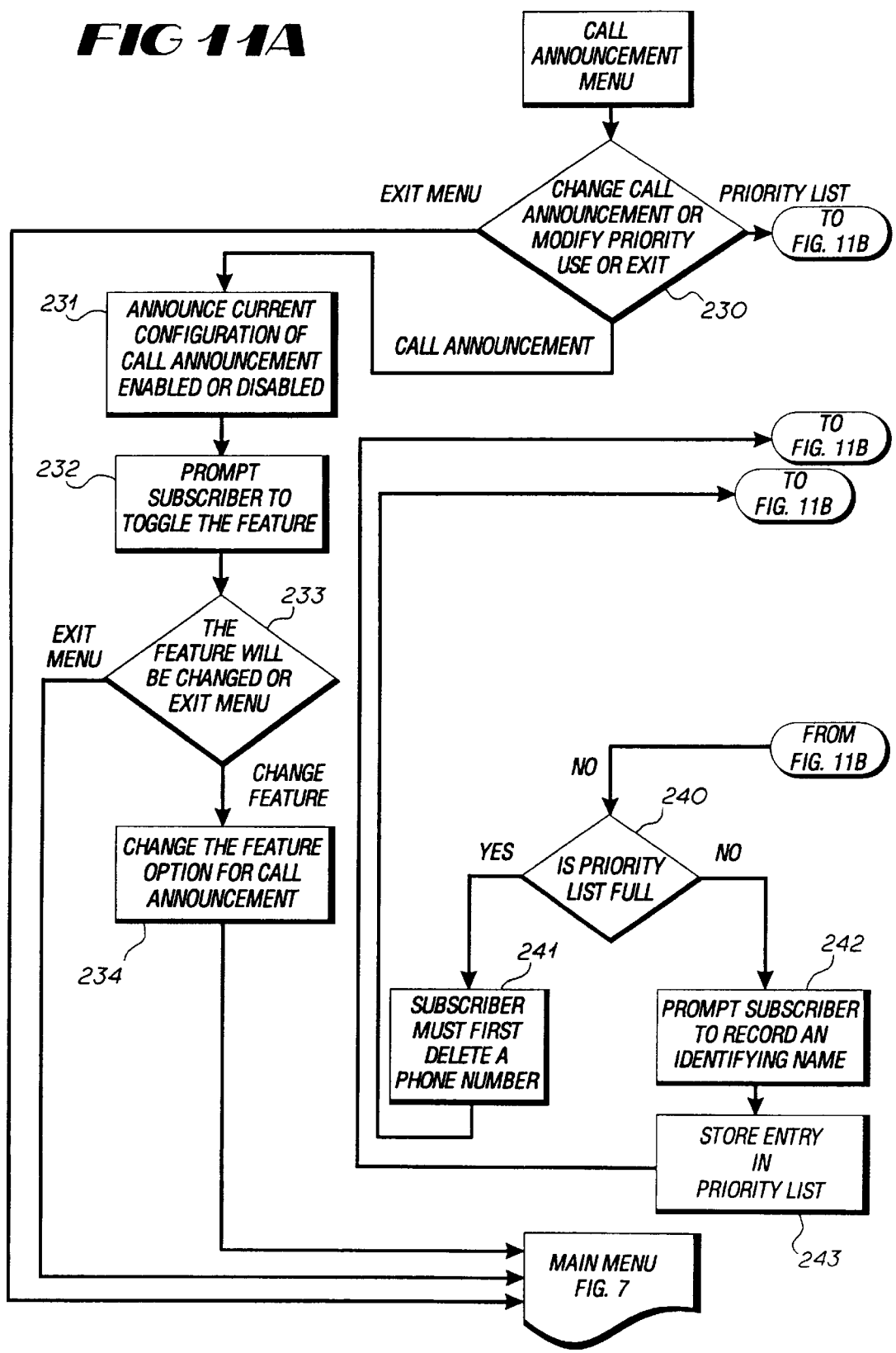

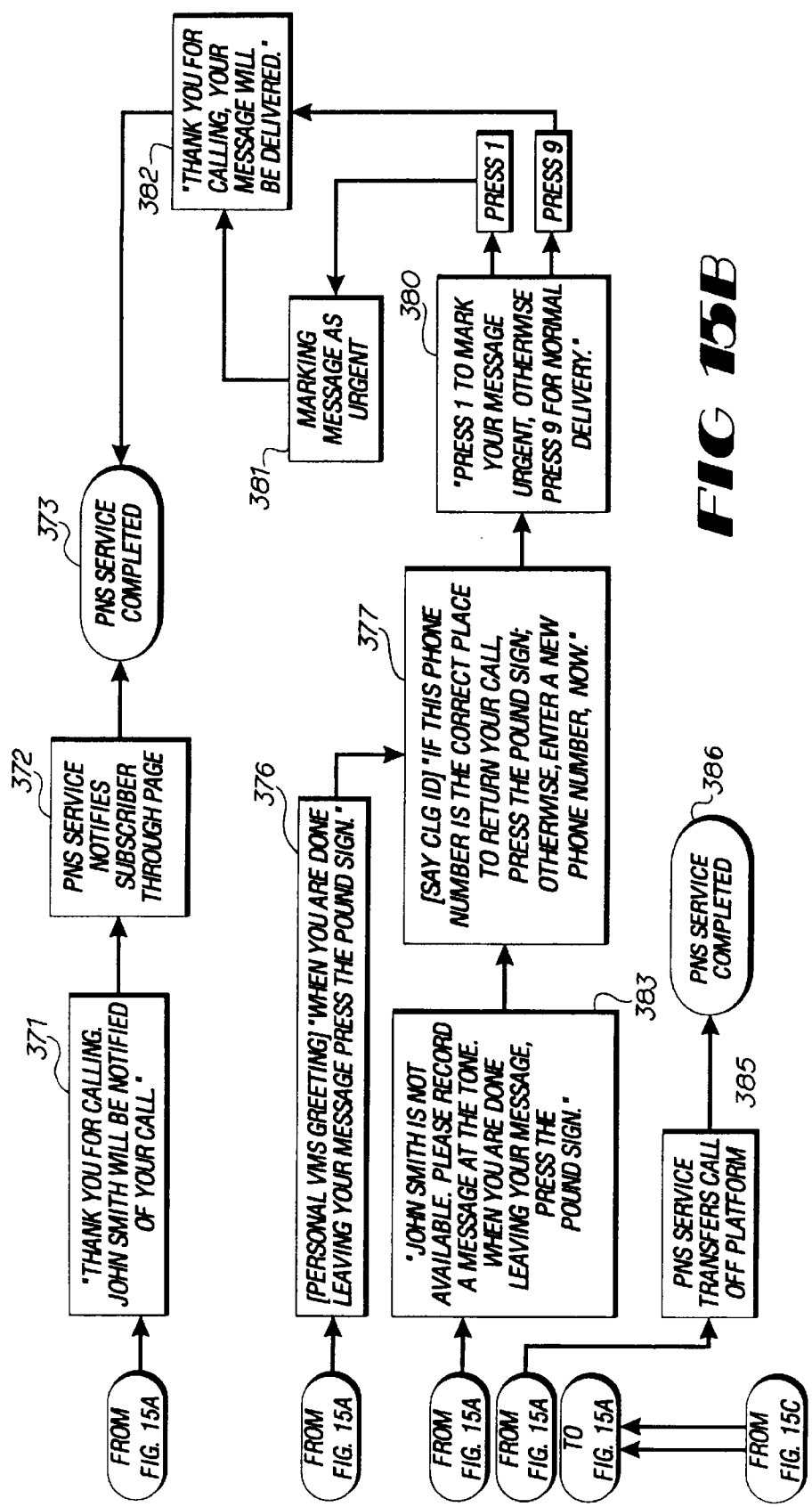

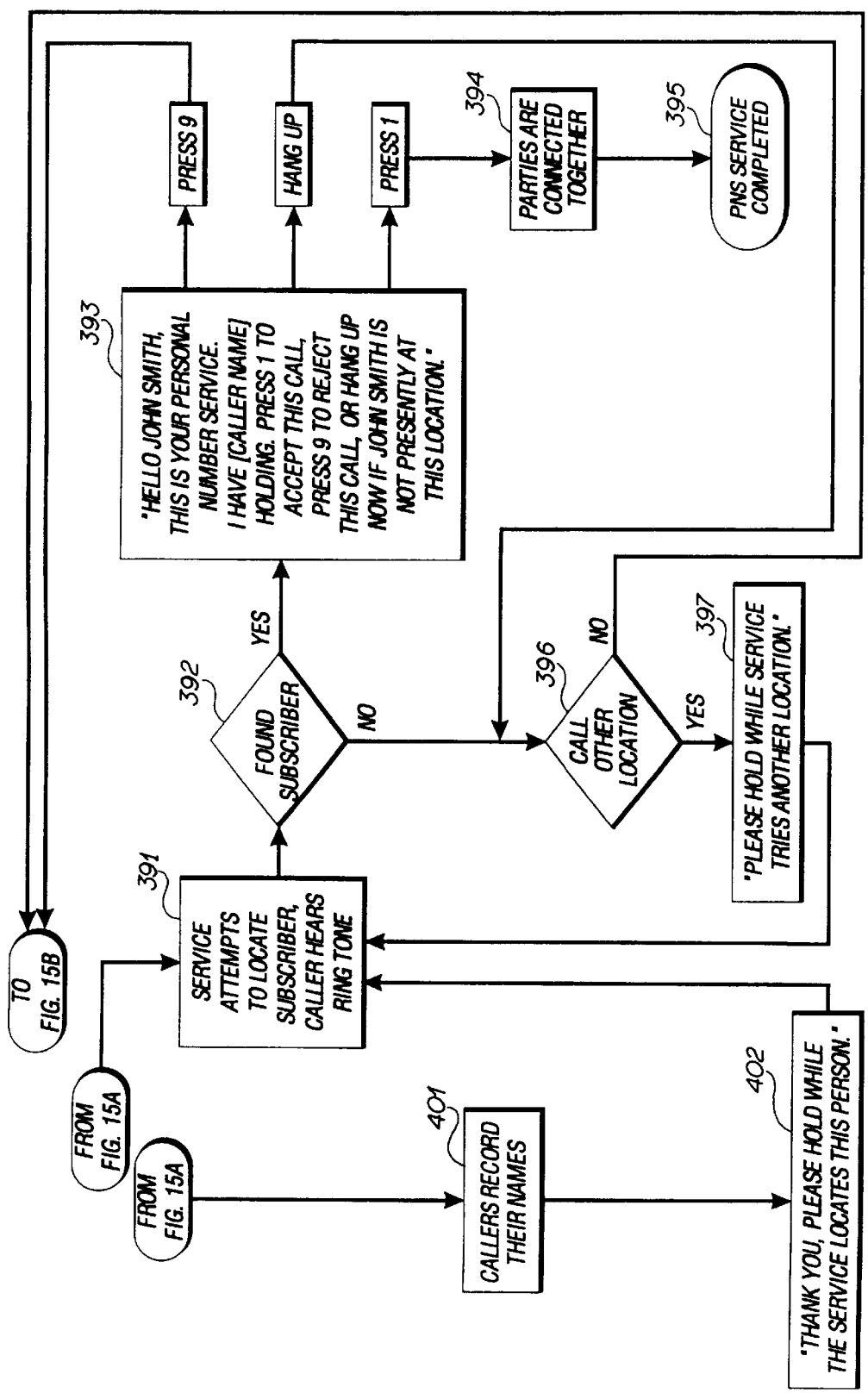

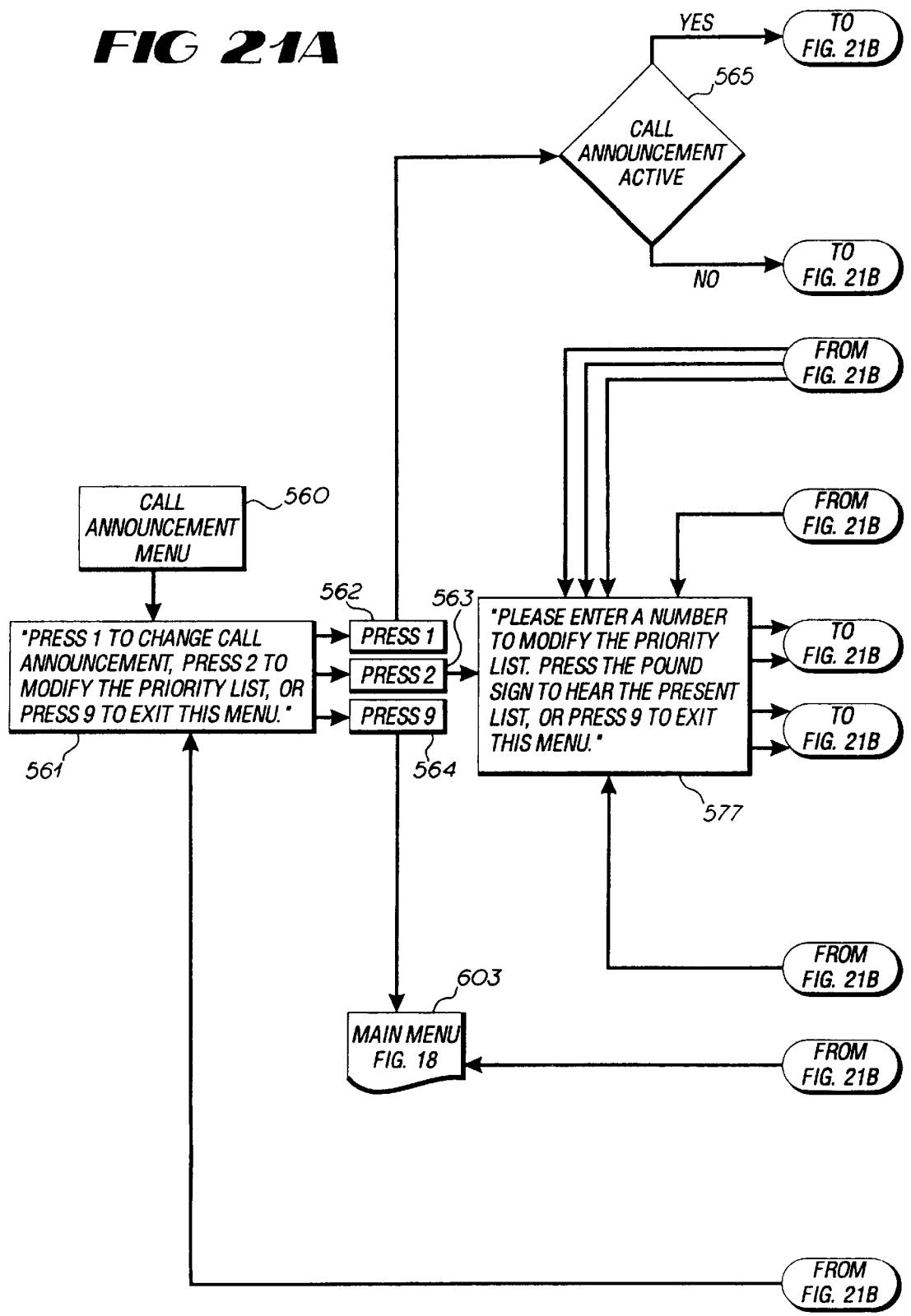

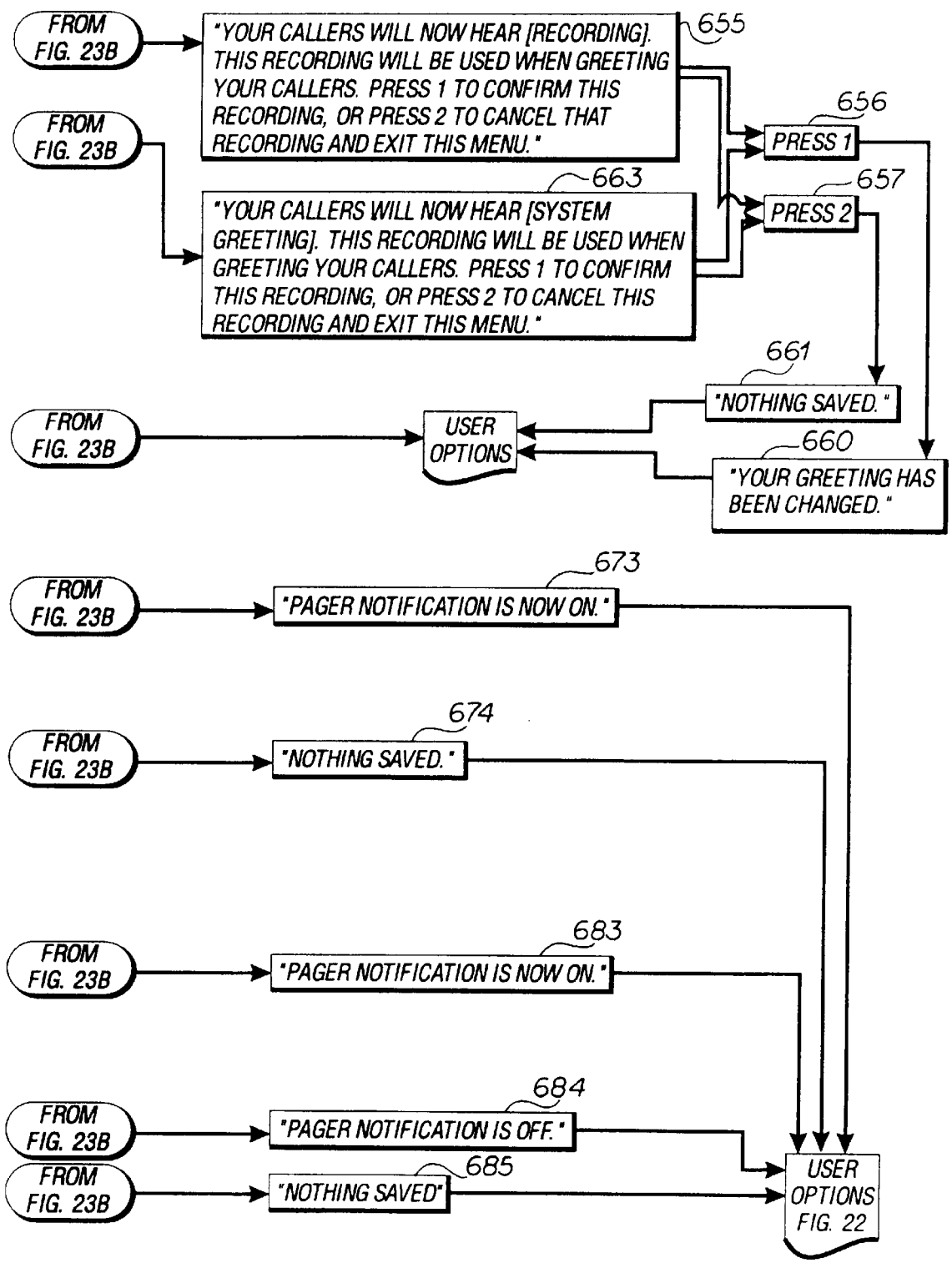

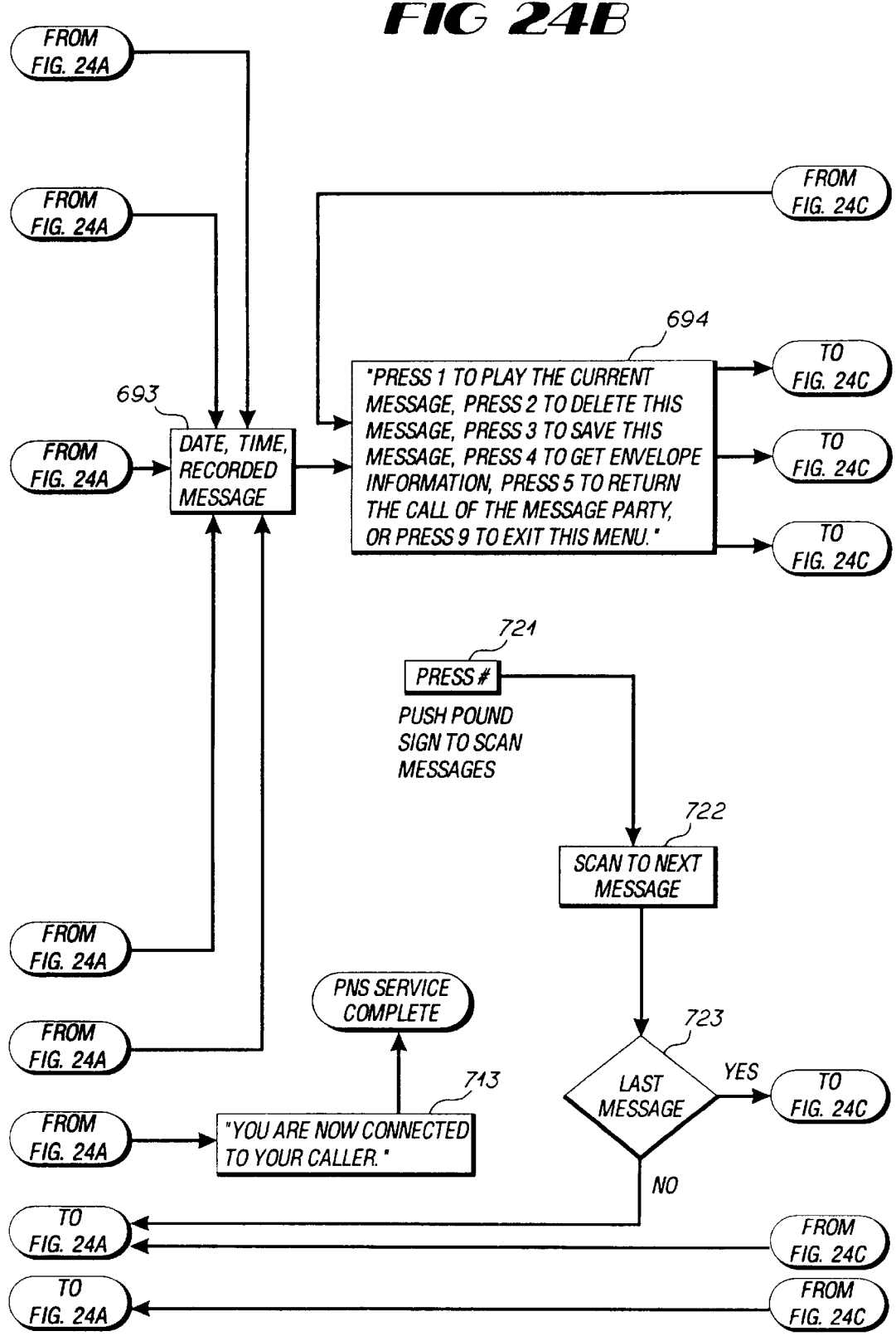

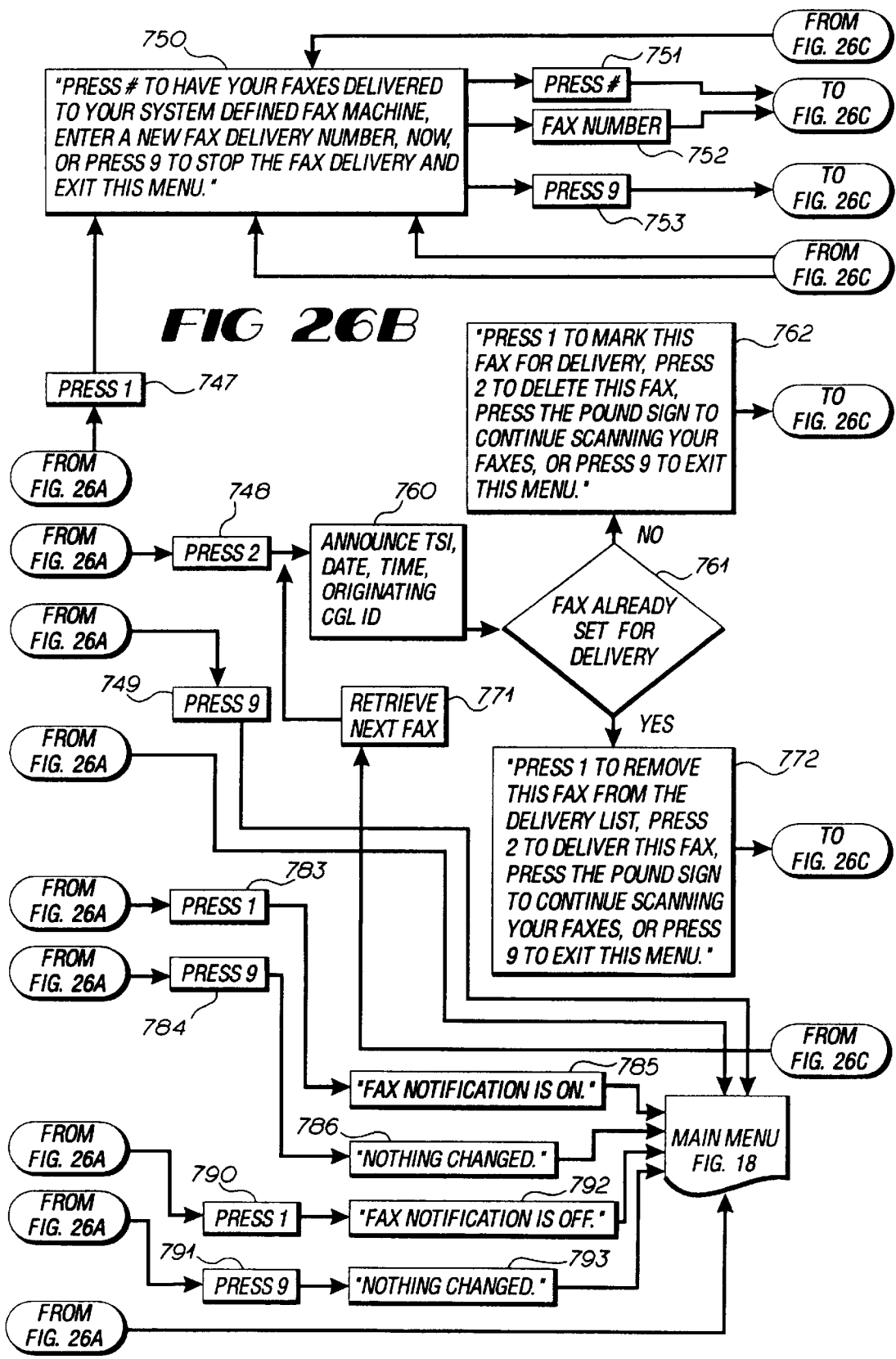

5,857,013

METHOD FOR AUTOMATICALLY RETURNING VOICE MAIL MESSAGES

This is a continuation, of application Ser. No. 08/623,121 filed Mar. 28, 1996, now U.S. Pat. No. 5,717,741, which is a continuation application of application Ser. No. 08/368,088 filed Jan. 3, 1995, which is a divisional of application of application Ser. No. 07/936,3884 filed Aug. 26, 1992 (both abandoned).

TECHNICAL FIELD

The present invention generally relates to communications systems, and more particularly relates to a system for automatically and interactively delivering communications to subscribers at preselected destinations.

BACKGROUND OF THE INVENTION

In this age of communication, the speed of information delivery can affect the outcome of business negotiations and influence national and international politics, as well as affect the well-being of individuals. Communication devices such as wireline and wireless telephones, facsimile transmitters, voice mail systems and pagers are used to speed communications between parties. However, the delivery speed of communications is hampered by the assignation of identification numbers such as telephone numbers to particular locations, rather than to particular individuals. Thus, a caller attempting to deliver a communication to a particular party by telephone will succeed only if the party is located at the site of the called telephone.

If the party is not located at the called site, the caller has the option of trying to deliver the communication to another location by calling a different telephone number. For this option, the caller must possess or obtain other telephone numbers of the telephones at the site where the called party may be located. The caller also has the option of repeatedly calling the first telephone number until the called party returns to the site of the first telephone. This option is, at least, inefficient. The necessity of resorting to either of these options because of the assignment of a telephone number to a location causes delay in delivering communications. Of course, the caller may abandon the attempt to deliver the communication, an option which results in inconvenience and in some cases, negative consequences.

The same delay disadvantages are applicable generally to communication by facsimile transmitters, voice mail systems and pagers, which also are assigned identification numbers by location rather than by person. Moreover, a person who uses multiple communication devices must keep track of and distribute multiple identification numbers for his/her communication devices. For example, an individual who uses a facsimile transmission machine, a voice mail system and a pager and who has an office telephone, a home telephone and a mobile phone must keep track of and distribute at least six different identification numbers. In addition, the person has to keep track of security numbers such as PIN numbers for each device. Anyone trying to reach this person in an emergency would require access to all of these identification numbers and would be lucky to reach the person at the location first contacted.

The prior art has sought to minimize the delay in delivering communications through call forwarding systems. In such a system, a telephone call placed to a first telephone number is forwarded automatically to a second telephone number. A disadvantage of this system is that the first telephone must be used to program the system to forward the call. Thus, if a salesperson wants to have sales calls forwarded from the office to another location such as home or a mobile phone, the office telephone must be used to program the system to forward the call. Upon return to the office, the office telephone must be used to reprogram the system to remove the call forwarding feature. Another disadvantage of call forwarding systems is that the called party may not be located at the site of the second telephone number because the called party has completed the business at that site and is returning to the office or moving to another site. Advanced communication delivery options such redirection to another location, to a voice mail system or to a pager are unavailable generally. Yet another disadvantage of call forwarding systems is the lack of called party selectivity in accepting the forwarded calls. For example, the salesperson does not have the ability to distinguish between sales calls which have been forwarded and administrative or routine calls which also have been forwarded. Thus, the salesperson is disturbed at the forwarded location by all calls made to the office telephone.

Other prior art systems have sought to minimize the delay in communication delivery through the assignment of an identification number based on the person rather than the location of the communication device. These identification numbers are generally known as personal numbers. In personal number systems, efforts at communication with a particular person are directed to the personal number rather than to a plurality of identification numbers associated with a site where the party may be located. One prior art system uses an operator to answer calls made to a personal number. The operator has information regarding the location and telephone numbers of the called party and has instructions regarding the transfer of such calls. The operator forwards information regarding the received telephone call to the called party pursuant to such instructions. Among the disadvantages of this system are the incidence of human error by the operator, the delay in obtaining and dialing the other telephone number, and the high cost of employing the operator as well as the need to provide continuous updates of telephone numbers and instructions to the operator.

In another prior art personal number system, a caller who places a telephone call to a personal number of a particular party is forwarded automatically to a telephone number supplied by the party. However, telephone calls to the party are completed only so long as the party provides the system in a timely manner with a proper destination telephone number.

None of these prior art personal number systems provide features that otherwise speed the delivery of important information such as call screening features or provide communication delivery options such as facsimile transmitters, voice mail systems, or pagers.

Accordingly, there is a need in the art for a method and apparatus that speed the delivery of communications between parties.

Further, there is a need in the art for a method and apparatus that provide a subscriber with a personal number as a contact number for receipt of all communications including wireline, wireless, facsimile transmissions and pagers.

There is also a need in the art for a method and apparatus which minimize the number of identification numbers and security numbers for communication devices associated with an individual.

In addition, there is a need in the art for a method and apparatus that speed the proper delivery of communications by including features such as call announcement, call screening, facsimile transmitters and receivers, voice mail services and pagers.

Furthermore, there is a need in the art for a method and apparatus that speeds the proper delivery of communications in a flexible, readily understandable, easy-to-use and cost efficient manner.

SUMMARY OF THE INVENTION

As will be seen, the present invention satisfies the foregoing criteria. Stated generally, the communications system of the present invention assigns a personal number to each subscriber. In turn, the system receives communication routing information in the form of one or more hierarchical lists of destinations based on the time of day and day of the week from each subscriber. The hierarchy and composition of the destination lists may be changed by the subscriber, and the subscriber may enable an override or make a registration to direct selected communications to a specific destination, as necessary.

Any communication directed to a subscriber's personal number is received by the system and the source of the communication is identified. The identification is made in one of several ways. First, the calling line number of the communication is identified and compared to entries in a database containing correlated calling line number and identity information. Second, the subscriber may have provided the system with identity information corresponding to particular calling lines. For example, the subscriber may have designated persons using certain calling lines as priority callers. In addition, the caller may provide the system with identity information through the input of a particular code. The system recognizes the code as identifying a priority caller. If the system fails to find or the caller does not immediately provide such identity information, the caller is requested by the system to provide such information.

While the source of the communication is being identified, the system selects a first destination from the hierarchical list of destinations. The system will select automatically a mobile phone from the list of destinations if the mobile phone is powered on. In this case, the system assumes the presence of the subscriber at the mobile phone destination.

At the first destination, the system announces the identified source of the communication and requests communication disposition information as to the acceptance, formal rejection or passive rejection, such as a no answer, of the communication. If accepted, the system routes the communication to the first destination. If rejected, the system routes the communication to the default destination selected by the subscriber. If there is no response from the called party at the first destination, this lack of response is considered a passive rejection. The system then requests communication disposition information from the next destination in the destination list according to the hierarchy selected by the subscriber. The system continues to request communication disposition information from each sequential destination on the destination list until the communication is accepted or until the last destination on the destination list is reached, at which point the communication is routed to the last destination.

Advantageously, the present invention allows subscribers to use one personal number as a contact number for receipt of all communications including wireline, wireless, facsimile transmissions and pagers. In addition, the communications are delivered quickly and efficiently to the subscriber.

Furthermore, the communications system of the present invention routes personal number communications to most types of communication devices. Thus, destinations may include office and home telephones, mobile phones, voice mail services, facsimile transmission devices, and both digital and alphanumeric pagers.

In particular, the present invention also provides a voice mail service for use as a subscriber destination. A communication routed to the voice mail service as a destination is accepted automatically. The voice mail service records the calling line number of the caller and the identity of the caller, in addition to the message left by the caller. The service also allows the caller to leave a different call back number other than the originating calling line number. After reviewing a voice mail message from a particular caller, the subscriber may return the call by directing the voice mail service to call the recorded calling line number. In addition, if the caller hangs up without leaving a message on the voice mail service, the voice mail service will inform the subscriber that the caller hung up without leaving a message along with the caller's name as recorded by the caller, provided by the subscriber, or synthesized on the basis of a database entry corresponding to the calling line number identification. The service will also provide the time of day and date of the call to the subscriber.

If the caller hangs up after leaving a message, the system will record the caller's name, the time of day and date of the call, as well as the caller's phone number if dialed from a mobile phone.

If the caller leaves a message and confirms the message, for example by pressing "#" in the preferred embodiment, the caller's calling line number identification is automatically left as the call back number, unless the caller designates a different call back number. The subscriber is also provided with the caller's name, and the time of the day and date of the message.

Advantageously, the subscriber does not have to record separately the calling line of the caller or leave the voice mail service in order to return the call. The subscriber is able to return the call while the message is fresh in mind. When the telephone conference terminates, the voice mail service automatically returns the subscriber to the next recorded message in the voice mail service.

In addition, the present invention alerts a subscriber reviewing voice mail messages of an incoming telephone call. The subscriber has the option of interrupting the review of voice mail messages to take the incoming call. If the subscriber selects this option, the subscriber is connected to the incoming call and, once this communication has been completed, the voice mail service returns the subscriber to the departure point in the voice mail messages. If the subscriber opts to reject the incoming call, the present invention routes the call to the selected default destination.

The voice mail service of the present invention optionally provides subscribers with numeric or alphanumeric paging notification for every voice mail message received. The subscriber is provided with the caller's name, the calling line number identification, and the time and date of the message. In addition, the voice mail service periodically notifies a subscriber having a powered on mobile phone of the existence of unchecked voice mail messages and allows the subscriber to stay on the line to check voice mail messages or to enter the administration routines of the system.

As noted, the present invention routes facsimile transmissions directed to a subscriber's personal number to a selected destination. In particular, a subscriber has the option of choosing the delivery of the facsimile message to a destination associated with a facsimile machine of subscriber's choosing, or of storing facsimile messages in a facsimile message mailbox for retrieval at a later time. The present invention optionally notifies a pager designated by the subscriber upon receipt of a facsimile message. Information such as the number of pages of the facsimile message, the calling line number identification of the facsimile message, and the time and date of the facsimile message can be provided tot he subscriber's pager. In addition, the subscriber may scan the facsimile messages through voice synthesized announcements of facsimile message information provided to the subscriber's pager.

Thus, it is an object of the present invention to provide an improved personal number communications system.

It is also an object of the present invention to provide a subscriber with a personal number as a contact number for receipt of all communications including wireline, wireless, facsimile transmissions and pagers.

It is an additional object of the present invention to provide a personal number which minimizes the number of identification numbers and security numbers for communications devices used by a subscriber.

It is also an object of the present invention to provide a personal number communications system which speeds the proper delivery of communications by including features such as call announcement, call screening, facsimile transmitters and receivers, voice mail services and pagers.

It is a further object of the present invention to provide a personal number communications system which delivers communications to subscribers in an expeditious and efficient manner.

It is yet another object of the present invention to provide a personal number communications system which obviates the need for the purchase of new equipment by subscribers to speedily receive communications.

It is also an object of the present invention to provide a personal number communications system that is flexible, subscriber friendly, easy to administer and cost efficient.

That the present invention and the preferred embodiment thereof overcome the drawbacks set forth above and accomplish the objects of the invention set forth herein will become apparent from the detailed description of the preferred embodiment to follow. dr

DETAILED DESCRIPTION

Figure 1:
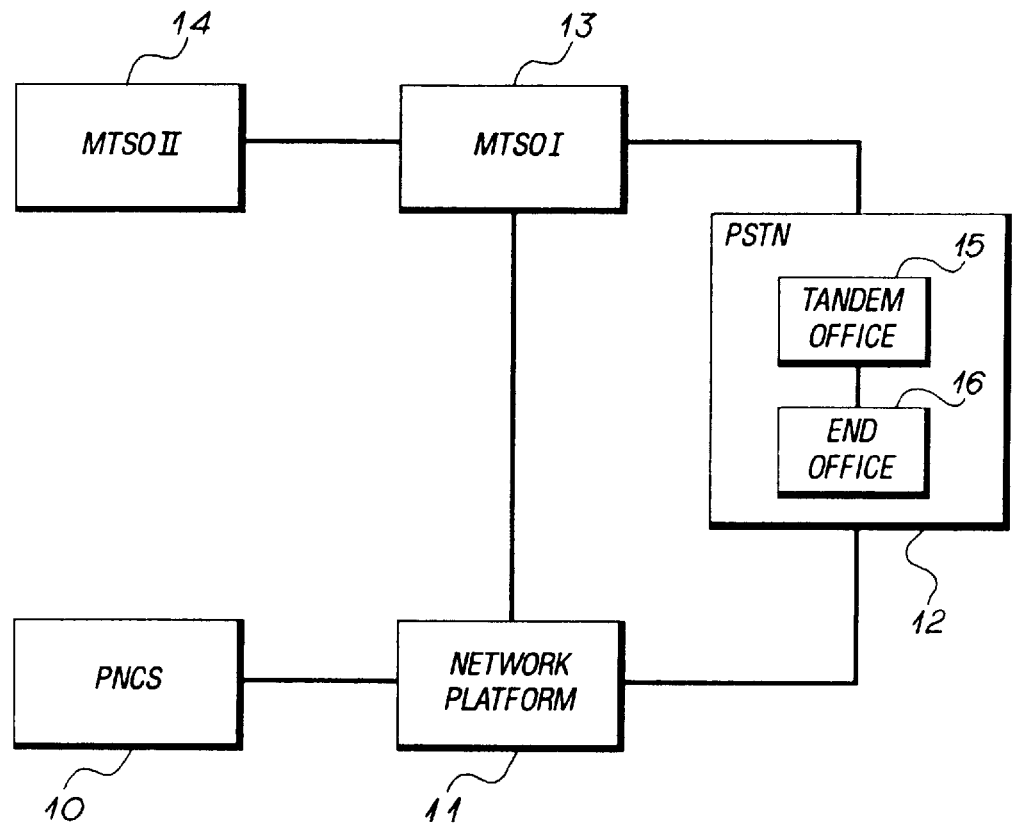
FIG. 1 is a block diagram illustrating the preferred environment of the present invention.

Referring now to the drawings, in which like numerals indicate like elements throughout the several figures, FIG. 1 is a block diagram illustrating the preferred environment of the present invention, which includes a method and an apparatus for a personal number communications system (PNCS) 10. The system operates on a network platform 11 such as a service circuit node, which is interfaced with the public switched telephone network (PSTN) 12 comprising one or more tandem offices 15 and/or end offices 16. In the preferred embodiment, the service circuit node is the BellSouth service circuit node. Service circuit nodes are available from AT&T Network Systems, Chicago, Ill.

Preferably, the interface to the public switched telephone network 12 for the network platform 11 is provided by standard interconnect facilities, such as ISDN, connected to a local exchange carrier (LEC) end office. The LEC end office provides calling line number identification over the ISDN BRI facilities.

The network platform 11 may also be interfaced to at least one mobile telephone switching office (MTSO) for reception and transmission of communications to mobile telephones. In the preferred embodiment, the network platform is interfaced to two MTSO—s 13, 14. A type IIA trunking interface, consisting of twenty-four channels, provides the trunking between the MTSO I 13 and the network platform 11. The MTSO's 13, 14 are linked by a type IIA tie-trunk, and a type IIA trunking interface. Through this interconnection, calls made by subscribers using mobile phones can be routed properly to the network platform 11 by either MTSO. Both MTSO's 13, 14 route incoming calls to the network platform 11 based on the Numbering Plan Area (NPA), End Office Code (NXX) or 1000 block number group, if required. Both MTSO's pass calling line number identification to the network platform via the IIA trunk on all mobile calls originating from within the MTSO switches, and all incoming calls from the local exchange carrier (LEC) tandem office. Preferably, the network platform 11 is connected to LEC end offices and to other carriers interconnected through the LEC Class 4 tandem switching system.

In the preferred embodiment, the network platform 11 is interfaced to a roamer detection module (RDM) (not shown) in each MTSO 13, 14 when subscriber mobile telephones are powered on. Mobile phone registration information is delivered by the roamer detection module to the network platform 11 in a manner well known to those skilled in the art such as through mobile detection software. The network platform may also interface with the MTSO's via standard signaling interface (i.e., IS-41, 557) to detect the status of mobile or wireline subscribers.

Stated generally, the present invention provides a personal number communications system, which assigns a personal number to each subscriber and which stores communication routing information including a hierarchical list of destinations selected by each subscriber. The system receives all communications directed to the personal number and identifies the source of the information. The system routes a particular communication to a selected destination based on several factors including the communication routing information, the nature of the communication and the use of a mobile phone by the subscriber.

In routing the communication, the system follows the hierarchical list of destinations selected by the subscriber. The source of the communication is announced at the destination, and communication disposition information is requested as to the acceptance, formal rejection or informal rejection of the communication. If accepted, the system routes the communication to the first destination. If formally rejected, the system routes the communication to the default destination selected by the subscriber. An informal rejection occurs when there is no response at the destination, or the person at the destination breaks the connection such as by hanging up. If informally rejected, the system requests communication disposition information from the next destination according to the hierarchy selected by the subscriber. The system continues to request communication disposition information from each sequential destination until the communication is accepted, rejected, or until the last destination is reached, at which point the communication is routed to the last destination.

More particularly, the present invention routes all telephone calls made to a subscriber's personal number pursuant to a hierarchical list of destinations provided by the subscriber to the system. In the preferred embodiment, the subscriber provides a hierarchical list of four destinations. The present invention also provides that the destinations in the hierarchical list may be changed or reordered depending upon the day of the week, or the time of day. In the preferred embodiment, subscribers supply a estination list for use on weekdays and a second destination list or use on weekends. Preferably, the system also allows the subscriber to override any of the destination lists for all types of communications or for selected callers.

A subscriber may specify a mobile telephone as a destination. However, communications are routed to a mobile phone only if the mobile phone is powered on or registered. The present invention is able to detect registration and usage of a mobile or cellular phone through the process of autonomous registration, which is well known to those skilled in the art. If the designated mobile phone is powered on, the system assumes the presence of the subscriber at the mobile phone destination. Thus, with one exception, the system automatically selects the mobile phone from the list of destinations for routing the communication if the mobile phone is powered on. The exception is the presence of a subscriber override. The registration of a mobile phone does not take precedence over an override direction (discussed below) entered by the subscriber. Subscribers desiring to use mobile phones, but seeking to avoid autonomous registration of mobile phones must remove the mobile phones from the destination lists used by the system.

The present invention routes a communication to a destination designated as the final destination or default destination if the subscriber cannot be located at the other listed destinations or if the subscriber has formally rejected the communication. Routing the communication to the default destination removes the communication from the network platform. Preferably, the default destination is a voice mail service or another destination where the caller may leave a message.

As noted above, the present invention provides the subscriber with an override capability with respect to the direction of communications to a particular destination. Advantageously, the override feature of the present invention accommodates unforeseen changes in a subscriber's schedule. The subscriber enables the override feature through entry of a code. All communications are then routed to the telephone number from which the subscriber called, or to a different telephone number entered by the subscriber. The override remains until the subscriber resets the established override. In the preferred embodiment, the subscriber has the option of enabling an override for only certain callers such as priority callers.

The present invention provides the subscriber with information relating to the source of the communication before the subscriber is requested to provide communication disposition information. In order to provide such source information, the system identifies the calling line number of the communication and searches for a match in a computer database containing correlated calling line number/source information. In the preferred embodiment, the present invention seeks a match to the calling line number in a reverse white pages directory, which uses the calling party telephone number to provide the identity of the calling party. If there is no match, the system preferably requests the caller to record identification information, such as the name of the caller.

In announcing a communication to a subscriber, the present invention identifies particular callers as priority callers based upon a list of priority numbers supplied to the system by the subscriber. In the preferred embodiment, the subscriber may supply up to ten priority numbers. Together with each priority number, the subscriber supplies a voice identification for each priority caller. When a call is placed to a subscriber's personal number by a priority caller, the system matches the calling line number with the priority number. An announcement of the communication as a priority call and the identity of the priority caller is then made to the subscriber.

The present invention also provides for the identification of priority callers making calls from non-priority telephone numbers. The subscriber selectively supplies priority callers with a code. When calling the subscriber's personal number, the caller enters the code after hearing the initial greeting from the system. The caller is then asked for identification information. Then, the system announces the call to the subscriber as a priority call and identifies the priority caller with the supplied information. In the preferred embodiment, the subscriber has the option of overriding the destination list and designating a particular destination for priority callers only. When a priority override is established all non-priority callers are routed directly to the default destination.

After the system announces the communication to the subscriber, the subscriber is requested to provide communication disposition information by accepting, formally rejecting or informally rejecting the communication. If the subscriber accepts the communication, the parties are connected. If the subscriber rejects the communication, it is routed to the default destination. If there is no response to the system's request, the communication is considered informally rejected, and the system tries the next destination on the hierarchical list provided by the subscriber. The informal rejection feature allows the system to continue the search for the subscriber if the subscriber was not present at the destination attempted.

In addition, the present invention provides a voice mail service which may be designated as a destination for personal number communications. Preferably, the voice mail service of the present invention is designated as the default destination for communications. However, the subscriber may use other voice mail systems with the present invention.

The voice mail service of the present invention functions generally as a conventional voice mail service in recording messages from callers. However, the voice mail service also provides the subscriber with information as to the source of the message. In particular, the voice mail service provides the subscriber with the calling line number of the message source and with correlated information as to the identity of the source. This type of information is generally referred to as envelope information. If the calling line number is unavailable, the message maker is requested to leave a call back number. In addition, the voice mail service announces the number of stored voice messages.

After reviewing a particular voice mail message, the subscriber has five options. The subscriber can re-listen to the message, delete the message, save the message into archives, hear the envelope information, or return the call left by the message maker.

If, after reviewing a particular voice mail message, the subscriber chooses to return the call, the service automatically calls the calling line number recorded in connection with the particular message. Thus, the subscriber can return calls without leaving the voice mail service. In addition, the subscriber does not have to make a special note of the calling number while listening to the message. This step also allows the subscriber to return the call even if the message maker did not leave the telephone number as part of the message. After the call-back conversation is completed, the subscriber is returned to the voice mail service. The subscriber may then continue to check messages and return calls.

In addition, the voice mail service notifies subscribers who are checking voice mail messages of incoming telephone calls. After the voice announcement of an incoming call including calling line number identification, the system requests the subscriber to accept or reject the call. If the call is accepted, the subscriber is connected to the call. If the call is rejected, the call is routed to the voice mail service. After the telephone conference or after the rejection of a call, the subscriber is returned to the point in voice mail where the interruption occurred.

In the preferred embodiment, the present invention provides subscribers with the option of being paged (numeric or alphanumeric) every time a voice mail message is received by the voice mail service of the present invention.

In addition, the preferred embodiment provides announcements to a subscriber's powered on mobile phone of the receipt of voice mail messages. When a subscriber turns on a mobile phone, the voice mail service calls and announces the presence of voice mail messages. The subscriber is presented with a choice of accepting the call, thereby allowing for the retrieval of the voice mail messages, or rejecting the call. The service waits for a predetermined interval, preferably four hours, before again notifying the subscriber of voice mail messages. However, if the subscriber clears all the messages by either deleting or saving the messages to archives, the service then notifies the subscriber only as to any new voice mail messages. Notification messages that go unanswered are retried after a predetermined interval, preferably five minutes.

The voice mail service of the preferred embodiment of the present invention allows for the following: voice message length of 180 seconds, unplayed messages are saved for thirty days, played messages are saved for fifteen days, and a maximum of fifty messages are allowed per mailbox. The storage scheme for voice messages is twenty-four kilobytes sample rate resulting in three kilobyte per second.

The present invention also provides for the designation of a facsimile transmission machine for the receipt of facsimile messages sent to the subscriber's personal number. The present invention allows subscribers to direct facsimile messages to a location, or to store facsimile messages in the facsimile mailbox for retrieval at a later time. If the facsimile messages are stored, the subscriber has the option of scanning the facsimile messages for selected retrieval. A transmit subscriber identification (TSI) process identifies the name of the originating facsimile transmission machine as well as the originating calling line number. This information is provided to the subscriber when reviewing the stored facsimile message. In addition, the time and date of receipt of a particular facsimile message is provided. Upon entry to facsimile message retrieval, the present invention announces the number of stored facsimile messages.

The preferred embodiment provides subscribers with the option of receiving numeric or alphanumeric paging notification for every new facsimile message arriving in the facsimile message mailbox.

Preferably, the present invention provides a maximum of thirty pages of facsimile message storage for up to fifteen days on the system for each subscriber. The storage for one page of facsimile messages averages forty-five kilobytes, ranging from two kilobytes to one hundred kilobytes.

The flow charts in FIGS. 2–26 provide a detailed description of the process steps executed by the personal number communications system 10. As analogy to an electrical circuit diagram, these flow charts are equivalent to a detailed schematic for an electrical circuit where provision of the circuitry for electrical circuit blocks corresponds to provision of actual computer instructions for blocks of the flow chart. Thus, the coding of the process steps of these flow diagrams into instructions for suitable commercially available computers is a mere mechanical step for a routineer skilled in the programming art.

In the preferred embodiment, the system software is coded in the service logic language within a UNIX environment. Further, the system software comprises different data structures which contain the subscriber's configuration data as well as customer data. The preferred system data structure enables information to be global among subscribers and enables the system to retrieve cross-references for any subscriber.

Figure 2:
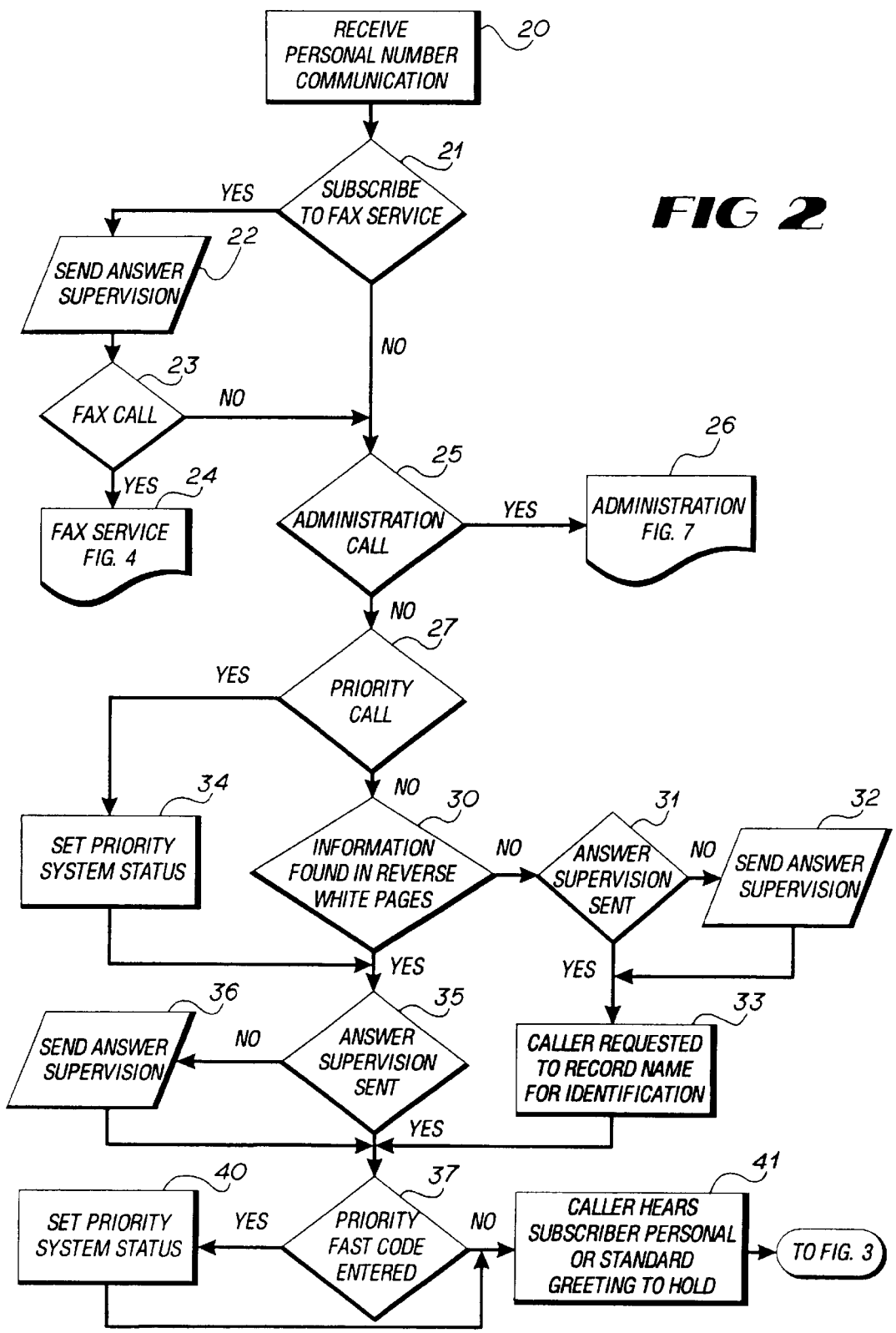
FIGS. 2–26 are flow charts illustrating steps of particular methods of operation of the preferred embodiment of the present invention.

FIG. 2 is a flow chart illustrating the general method of routing communications directed to a personal number of a subscriber of the preferred embodiment of the present invention.

FIG. 2 is entered at step 20 when the personal number communications system 10 receives a personal number communication, that is, a call to a personal telephone number. The service provided by the system is initiated when a call for a subscriber terminates to the network platform 11. In step 21, the system checks to see whether the subscriber subscribes to a facsimile (fax) service. If the subscriber does subscribe to a facsimile service, the system sends answer supervision in step 22. In step 23, the system determines whether the communication is a facsimile call. If it is a facsimile call, the facsimile call is directed to the facsimile service in step 24. The facsimile service procedures are discussed in connection with the flow chart illustrated in FIG. 4.

Referring again to step 23, if the communication is not a facsimile call, in step 25 the system checks whether the call is an administration call. If the call is an administration call, it is directed to administration in step 26. The administration procedures of the present invention are discussed in connection with FIG. 7. If the call is not an administration call, the system checks whether the call is a priority call in step 27. If the call is not a priority call, the source of the call is determined by checking the calling line number identification with a database, such as the reverse white pages, in step 30. If the source information is not found, a check is made in step 31 to determine whether answer supervision has been sent. If not previously sent, answer supervision is sent in step 32. If or once answer supervision has been sent, in step 33 the caller is requested to record his/her name for identification. Step 33 is followed by step 37, which is discussed below.

If the source information is found in step 30, then step 35 is executed.

Referring again to step 27, if the call is a priority call, the priority system status is set in step 34. In step 35, a check is made to determine whether answer supervision has been sent. If not, answer supervision is sent in step 36. In step 37, a check is made as to whether a priority fast code has been entered.

If so, the priority system status is set in step 40. In step 41, the caller hears a greeting and is requested to hold. The greeting may be a subscriber personal greeting or a standard greeting provided by the system.

Figure 3A:
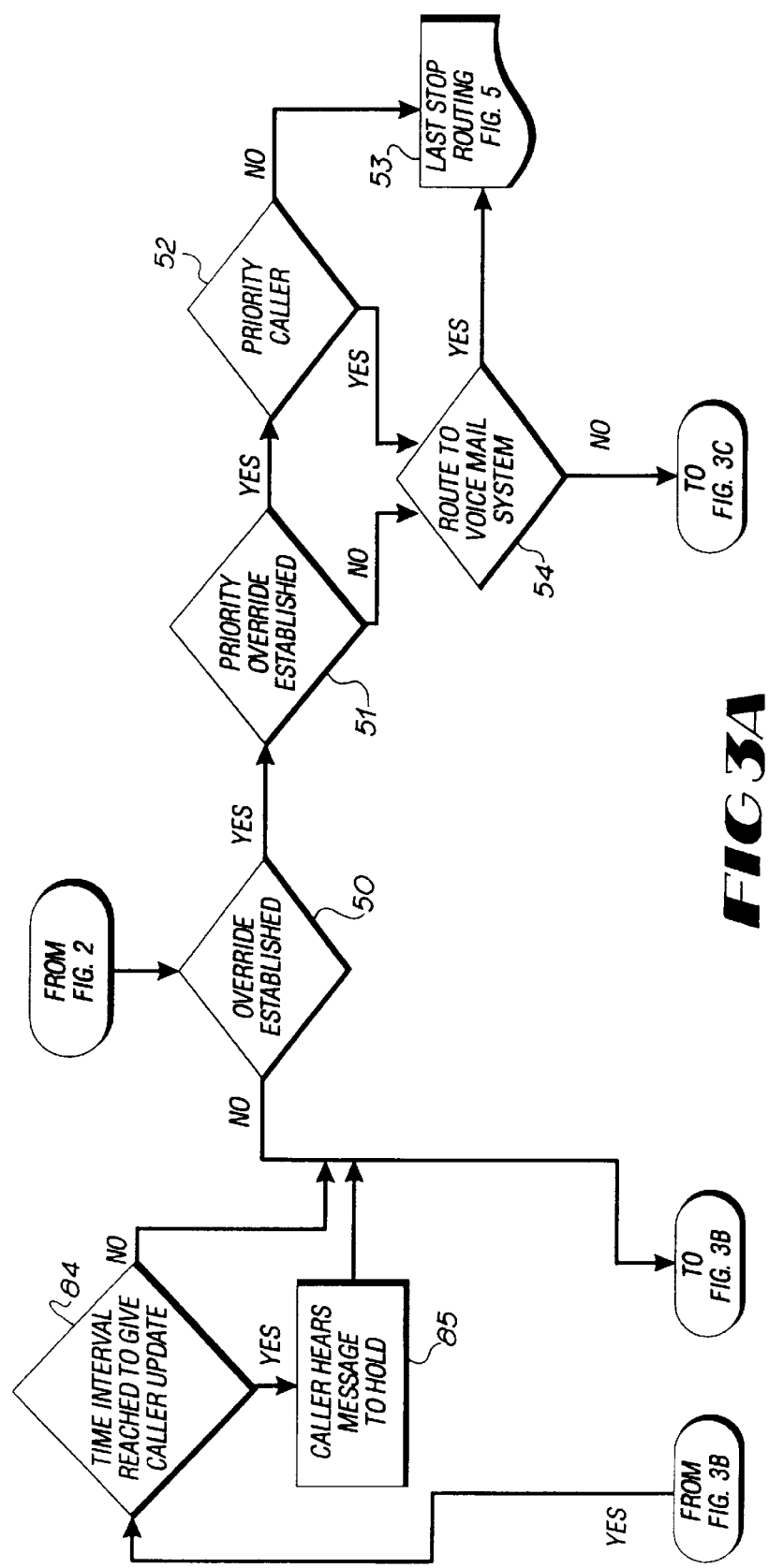
Figure 3B:
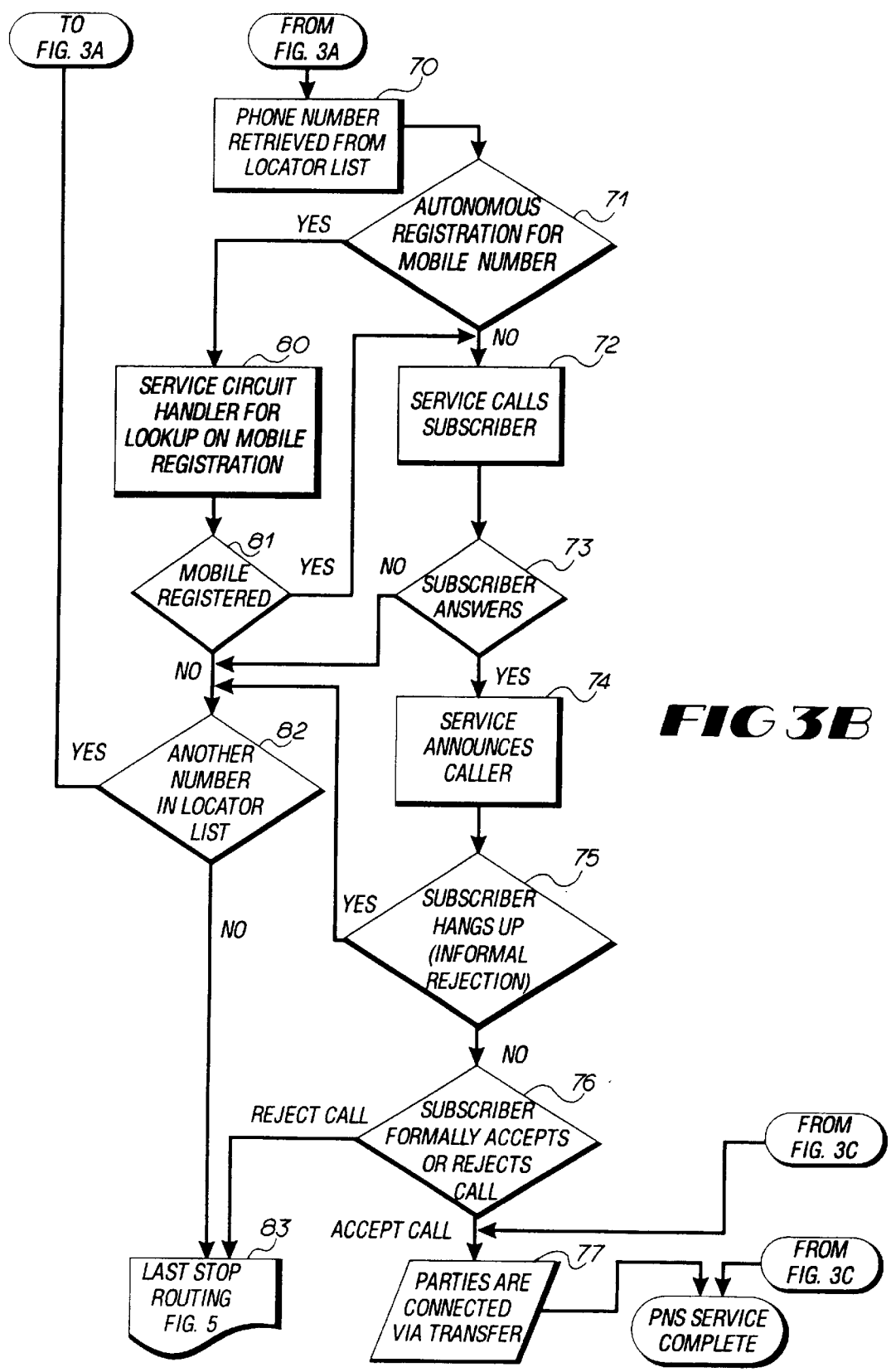
Figure 3C:
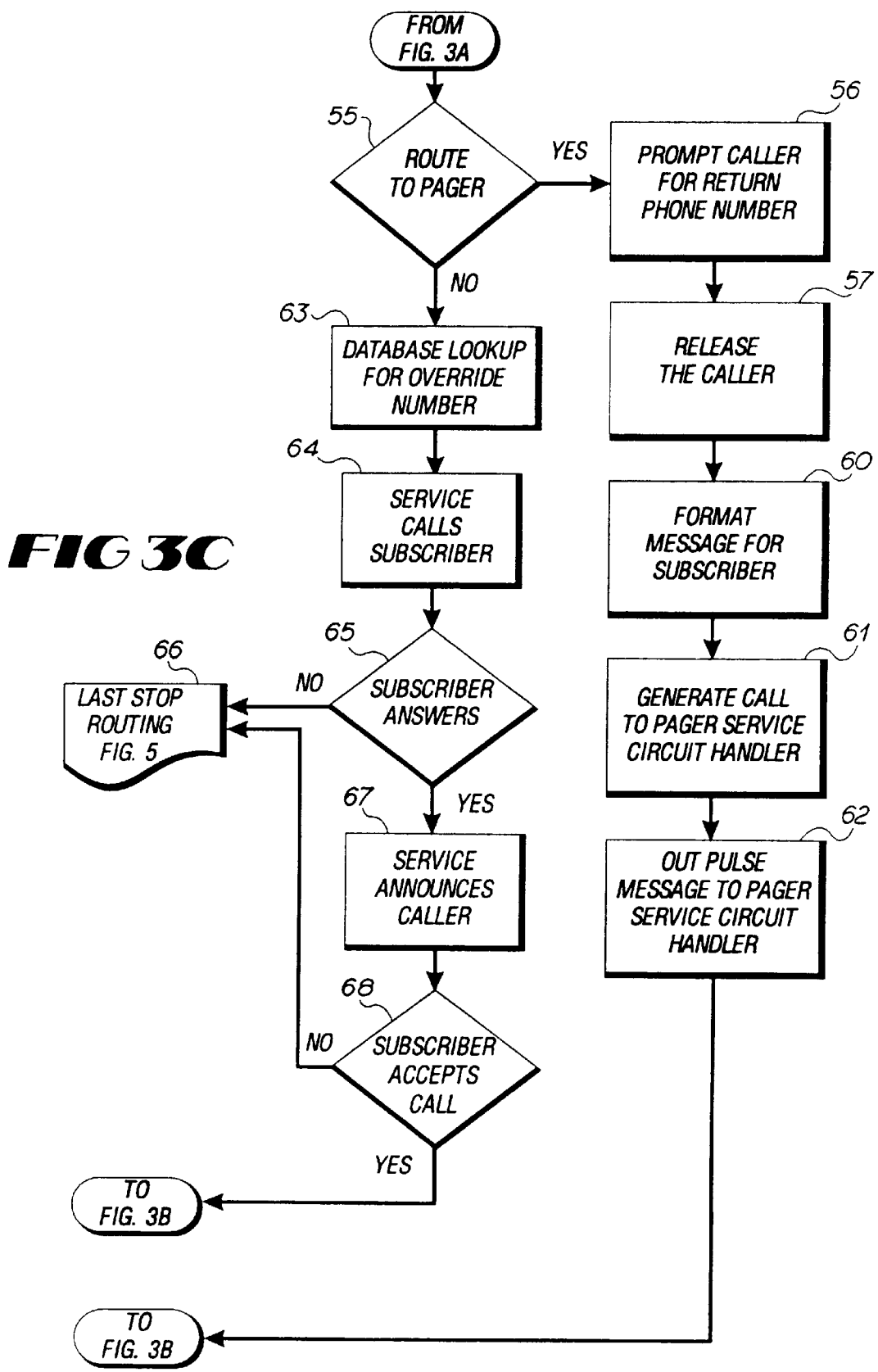

The general method of routing communications in the preferred embodiment is continued in FIG. 3.

A subscriber can enable an override or a priority override to route calls to a particular destination. When a priority override is established, all non-priority callers are routed directly to the default destination. In step 50, the system checks whether an override has been established. If an override has been established, in step 51 the system checks for a priority override. If a priority override has been established, in step 52 the system checks to determine whether the caller is a priority caller. If the caller is not a priority caller, in step 53 the system directs the communication to the default destination discussed in connection with FIG. 6. A default destination is also referred to as a last stop.

Referring again to steps 51 and 52, if priority override has not been established in step 51 or if the caller is a priority caller in step 52, in step 54 the system checks to determine whether the call is to be routed to the voice mail system. If so, the call is routed to the default destination in step 53. If the call is not to be routed to the voice mail system, in step 55 a check is made to determine whether the call should be routed to the pager. If so, in step 56 the caller is prompted for a return telephone number. In step 57, the system releases the caller. In step 60, the system formats the message for the subscriber. In step 61, the system generates a call to the pager service circuit handler. In step 62, the system sends, such as by outpulsing, a message to the pager service circuit handler, and the routing of the communication is considered complete.

Referring again to step 55, if the communication is not to be routed to the pager, in step 63 the system consults the database for the override destination number. In step 64, the system calls the subscriber. In step 65, the system checks to determine whether the subscriber has answered. If the subscriber does not answer, in step 66 the system directs the communication to the default destination. If the subscriber answers in step 65, in step 67 the system announces the caller. In step 68, the system checks to determine whether the subscriber accepted the call. If the subscriber does not accept the call, the system proceeds to step 66 and the call is routed to the default destination. If the subscriber accepts the call, the system proceeds to step 77 and the parties are connected via transfer. Step 77 is discussed in the following paragraph.

Referring again to step 50, if no override has been established, in step 70 the system retrieves a destination number from the hierarchical list (Locator List or Reach List) of destinations provided by the subscriber. In step 71, the selected destination is checked for autonomous registration of a mobile number. If there is no autonomous registration, the system calls the subscriber in step 72 at the number retried from the hierarchical list. In step 73, the system waits for the subscriber to answer. If the subscriber answers, the system announces the caller in step 74. In step 75, the system checks to determine whether the subscriber has hung up. Such a disconnection is considered an informal rejection, also called a bypass. If the subscriber has not informally rejected the call, the subscriber accepts or rejects the call in step 76. If the subscriber accepts the call, in step 77 the parties are connected via transfer, and the system considers the routing of the communication complete. If the subscriber rejects the call, the call is directed to the default destination in step 83, discussed in the following paragraph.

Referring again to step 73, if the subscriber does not answer, in step 82 the system tries another number on the hierarchical list of destinations. Similarly, in step 75, if the subscriber informally rejects the call, in step 82 the system will try another number on the hierarchical list of destinations.

Referring again to step 71, if autonomous registration exists for the mobile number retrieved from the list of destinations, in step 80 the system consults the service circuit handler on mobile registration. In step 81, the system checks whether the mobile phone is registered. If it is registered, the system calls a subscriber pursuant to step 72. If the mobile phone is not registered, in step 82 the system checks to see whether there is another number on the locator list. If not, the system routes the communication to the default destination in step 83. If there is another number on the destination list, in step 84 the system checks to see whether the time interval has expired so as to give the caller an update. If the time interval has not expired, the system returns to step 70 to retrieve a destination number. If the time interval has expired, in step 85 the system provides the caller with a message to hold. Then, the system proceeds to step 70 to retrieve a phone number from the destination list.

The personal number communications system preferably includes a facsimile service for subscriber use. The facsimile service consists of a facsimile node residing on the network platform 11. The facsimile service works in conjunction with the personal number concept utilizing the same access phone number for the subscriber's personal number. The network platform is able to detect the two types of facsimile initialization sequences which are standard in facsimile protocols.

In the preferred embodiment, the facsimile service works only with automated facsimile transmission machines. Upon receipt, a facsimile call is immediately distinguished, and the system starts the facsimile initialization process. Callers who first attempt to call the system, and then start the facsimile transmission machine after the system answers, are unsuccessful. The system recognizes this type of communication as a voice call. The facsimile detection process completes in the first seconds after the communication is answered by the network platform 11.

The system preferably checks the subscriber's configuration to determine whether to store the facsimile message for later retrieval or to deliver the facsimile message to the subscriber's facsimile transmission machine. When the subscriber's configuration is set for delivery, the facsimile calls are transferred directly to the subscriber's facsimile transmission machine. If the subscriber has facsimile storage enabled, the incoming facsimile message will be stored in the facsimile mailbox of the particular subscriber. Once the facsimile is transferred to the subscriber's facsimile machine or stored for later retrieval, the system preferably pages the subscriber to provide notification of the facsimile receipt. A formatted message consisting of the information pertaining to the facsimile message received by the system will be sent in a paged message. The system is able to either send an alphanumeric page or the standard numerical page. The page format consists of a simple message stating that the facsimile message was received through the subscriber's personal number. The alphanumeric page contains the subscriber's personal number or name, the number of current facsimile messages stored on the subscriber's mailbox, or that the facsimile message was delivered to the subscriber's facsimile machine, the originating calling line number identification, and the TSI information. The numeric page consists preferably of numeric symbols representing various information pertaining to the facsimile message. In the preferred embodiment the numeric page contains the numbers "88888" denoting a facsimile message has been stored in the subscriber's mailbox.

Figure 4:
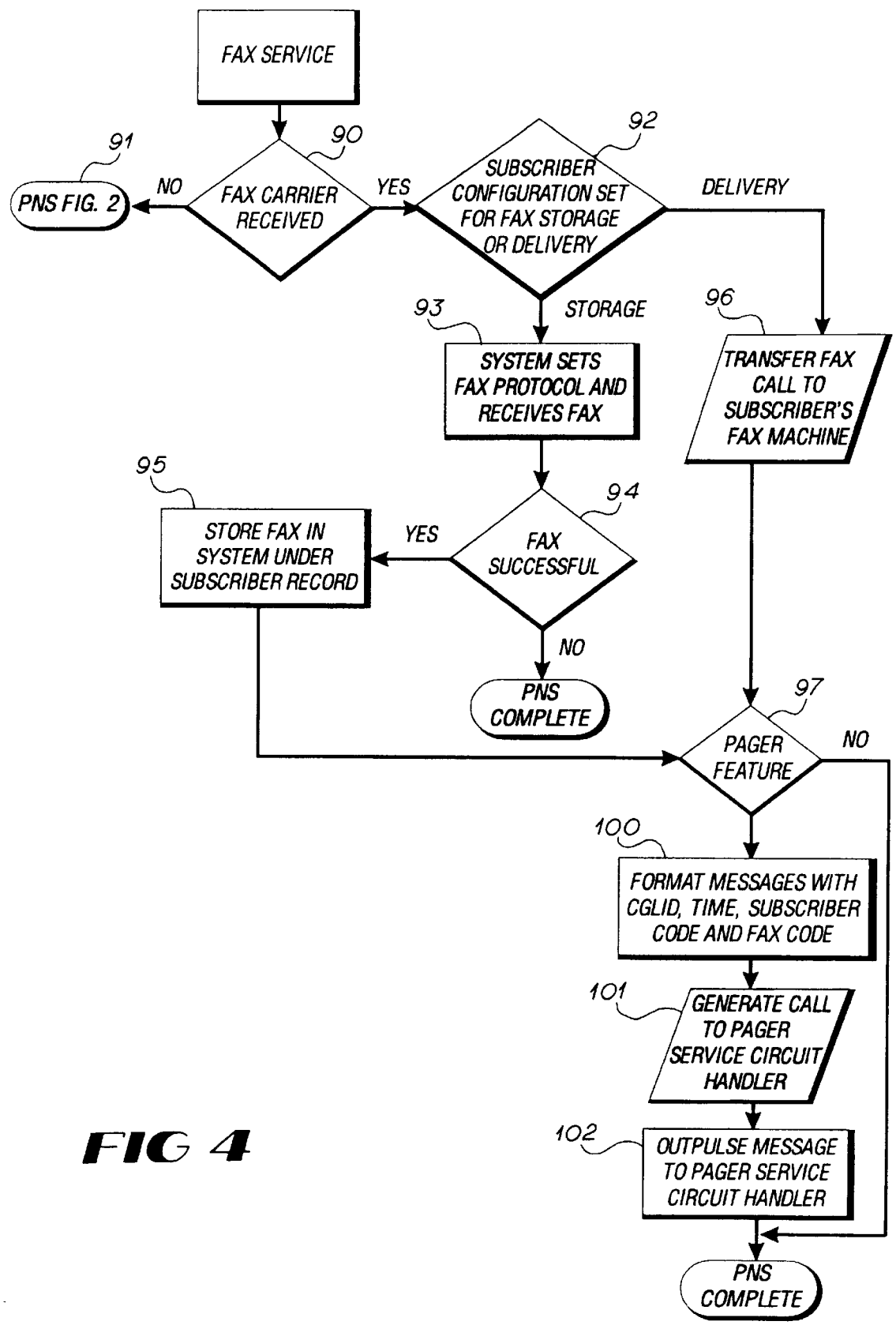

FIG. 4 is a flow chart illustrating the general method of routing facsimile communications. At step 90, the system checks whether a facsimile carrier has been received. If not, in step 91 the system follows the general method of routing communications as described in the flow charts of FIGS. 2 and 3. If a facsimile carrier has been received, in step 92 the system checks the setting of the subscriber's configuration to determine whether the facsimile message is to be stored or delivered. If the facsimile message is to be stored, in step 93 the system sets the facsimile protocol and receives the facsimile message. In step 94, the system checks whether the transmission of the facsimile message has been successful. If not, the system considers the communications routing complete. If the transmission of the facsimile message has been successful, in step 95 the system stores the facsimile message under the subscriber's record. The facsimile routing continues with step 97 discussed below.

Referring again to step 92, if the subscriber configuration is set for facsimile delivery, in step 96 the system transfers the facsimile call to the subscriber's facsimile transmission machine. In step 97, the system checks to determine whether the pager feature is enabled. If not, the system considers the communications routing complete. If the pager feature is enabled, in step 100 the system formats the message together with information relating to the calling line number identification (CLID), the time, the subscriber code and the facsimile code. In step 101, the system generates a call to the pager service circuit handler. In step 102, the system outpulses a message to the pager service circuit handler, and the system considers the communications routing complete. It should be understood that the term "outpulses" is used in a generic sense that includes pulsing, sending tone signals, and sending other types of signals to dial a telephone number and/or transfer telephone number information.

The preferred embodiment of the present invention offers a subscriber four options for handling calls that are formally rejected or that are informally rejected, i.e., the subscriber is not found. First, the subscriber may transfer all such calls to another location such as an answering service, an answering machine, a pager, an office number where a receptionist is present, or just another location where the subscriber may be found. In this first option, the caller is notified that he/she is being transferred to the subscriber's default or last stop destination, and the transfer is completed. If the telephone line at the default destination is busy, the system notifies the caller that the subscriber is unavailable and terminates the call.

As a second option, the subscriber may route calls to a pager as the default destination. Callers are requested to input a number where the subscriber may contact the caller. Once the caller or the system ends the call, the system provides the subscriber a pager notification.

The third option for completing unanswered or rejected calls is to transfer the calls to the subscriber's own voice mail system, which is not part of the network platform 11.

The fourth option for completing unanswered or rejected calls is to transfer the calls to the voice mail service of the present invention, discussed below in connection with FIG. 6.

Figure 5:
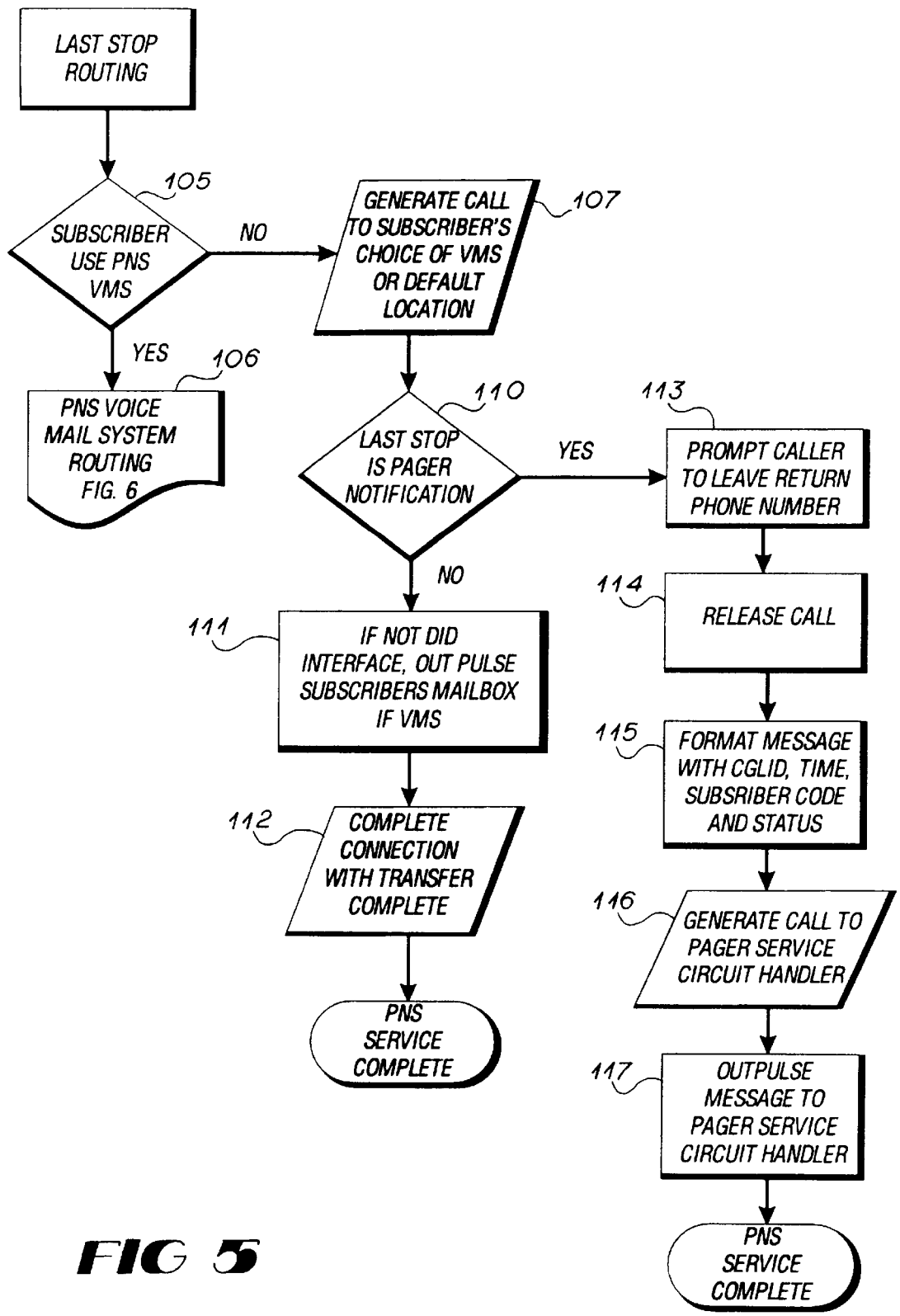

FIG. 5 is a flow chart illustrating the general method of routing communications to the default destination designated by a subscriber. In step 105, the system determines whether the subscriber uses the personal number service (PNS) voice mail service (VMS) of the present invention as a default destination. If so, in step 106 the system routes the communication to the voice mail service as discussed in connection with FIG. 6. If the subscriber does not use the voice mail service of the present invention, in step 107 the system generates a call to the subscriber's choice of voice mail systems (VMS) or to the default destination. If the default destination has been specified by the subscriber, then, in step 110 the system checks if the default destination is a pager notification. If not, in step 111 the system outpulses to gain access to the subscriber's own mailbox. In step 112, the system completes the connection, and considers the communication routing complete.

Referring again to step 110, if the default destination is a pager, in step 113 the caller is prompted to leave a return telephone number. Once the caller has completed the call, such as by entering a telephone number or hanging up, in step 114 the system releases (terminates) the call. In step 115, the system formats the message with information relating to the calling line number identification (CLID), time, subscriber code, and status. In step 116, the system generates a call to the pager service circuit handler. In step 117, the system outpulses a message to the pager service circuit handler, and the system considers the communications routing complete.

It will be understood that the pager service circuit handler sends a message to the subscriber's pager which advises the subscriber that a call was placed to the subscriber. As noted above, the fourth option for completing unanswered or rejected calls is to direct the calls to the voice mail service of the present invention as the default destination. This voice mail service preferably resides on the network platform 11. The system records the originating calling line number identification (CLID) as well as information pertaining to priority call status. The caller may leave a voice message and mark the urgency of the message. The voice mail service of the present invention provides subscribers with the option of receiving numeric or alpha numeric paging notification for calls delivered to the voice mail service. Preferably, the subscriber pager option is administered through the touch-tone interface. The page format for the voice mail service includes a message that a voice mail message was stored on the voice mail service. The alphanumeric page contains the acronym PNS to reference that the personal number is sending the page. The page also includes the number of current messages stored in the subscriber's mailbox, the originating calling line number identification, and the correlated database information, also referred to as the reverse white pages information, when available. The numeric page consists of numeric symbols representing information about the originating caller. In the preferred embodiment, the numeric page contains the numbers "77777" to denote that a new message has been received on the voice mail service of the present invention.

Figure 6A:
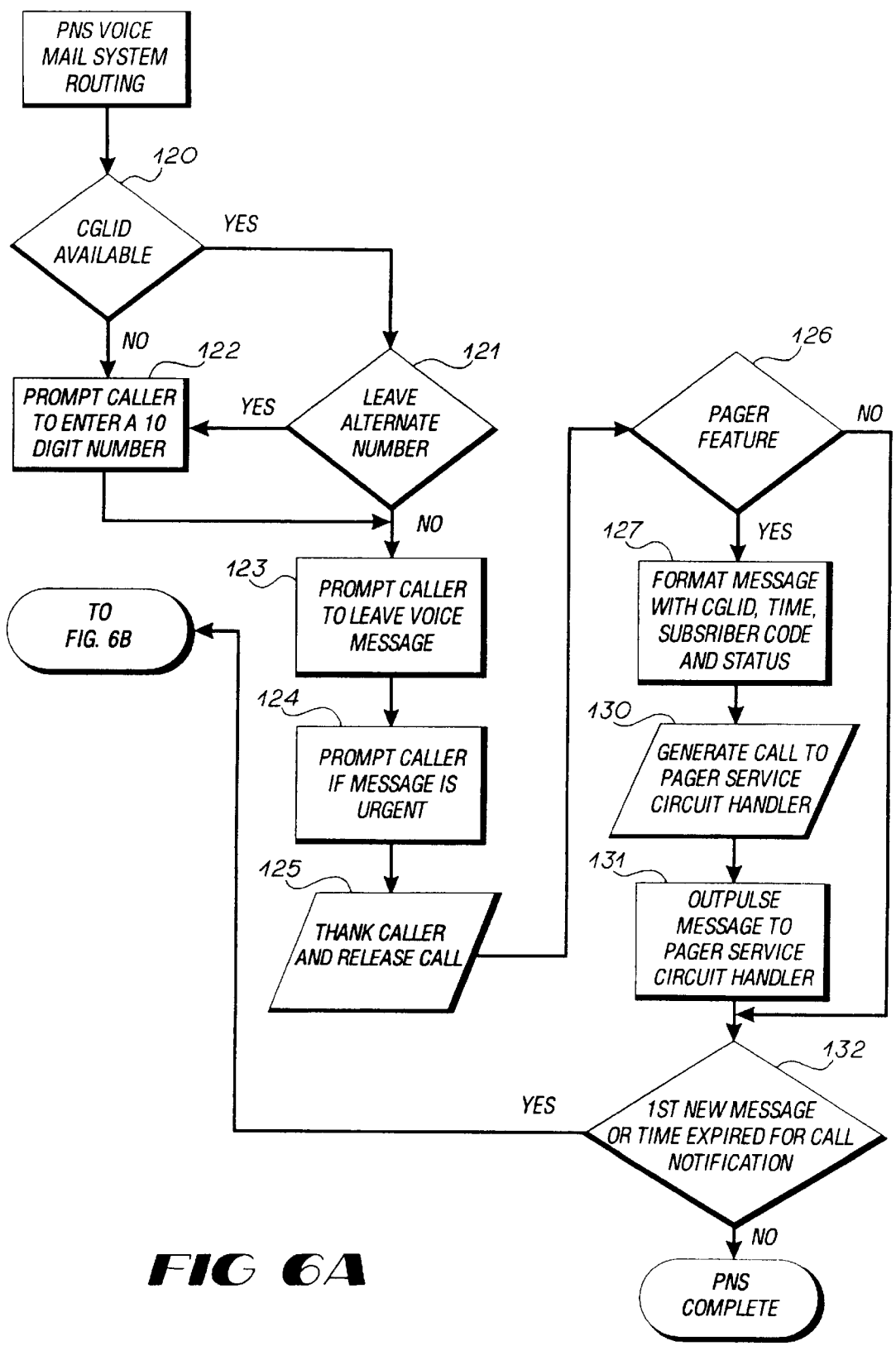

FIG. 6 is a flow chart illustrating the general method of routing communications to the personal number service (PNS) voice mail service (VMS) of the present invention. In step 120, the system checks to determine whether the calling line number identification (CLID) is available. If so, in step 121 the system checks to determine whether to prompt the caller to leave an alternate number. If so, in step 122 the system prompts a caller to enter a ten digit number.

Referring again to step 120, if the calling line number identification is unavailable, in step 122 the system prompts the caller to enter a ten digit number, and the system proceeds to step 123 discussed below.

Referring again to step 121, if an alternate number prompt is not to be provided, the system proceeds to step 123. The caller is prompted in step 123 to leave a voice message. In step 124, the caller is prompted to indicate whether the message is urgent. The caller keys in a predetermined code to indicate that the call is urgent. In step 125, the system thanks the caller and releases the call. In step 126, the system checks for a pager feature. If there is no pager feature, the system proceeds to step 132 discussed below. If there is a pager feature, in step 127 the system formats the message with calling line number identification (CLID), time, subscriber code and status. In step 130, the system generates a call to the pager service circuit handler. In step 131, the system outpulses a message to the pager service circuit handler. In step 132, the system checks whether the message is a first new message or whether the time has expired for call notification. If neither condition is satisfied, the system considers the communication routing complete. If either condition is satisfied, in step 133 the system checks whether the subscriber's mobile phone is turned on and idle. If the conditions are unsatisfied, in step 134 the system schedules a retry to check the mobile phone. In the preferred embodiment, the system retries after one minute. If the subscriber's mobile phone is on and idle, in step 135 the system provides a voice mail service notification call to the subscriber on the mobile phone.

In step 136, the system checks for the subscriber's answer to the call. If there is no answer, the system repeats step 134 and schedules a retry for checking the mobile phone. If the subscriber answers the call, in step 137 the system announces to the subscriber that messages are present in the voice mail service of the present invention. In step 140, the system requests the subscriber for call disposition information. If the subscriber rejects the call, in step 141 the system schedules the next notification for calling the subscriber regarding voice mail service, and the system considers the communication routing complete. If the subscriber accepts the call in order to retrieve messages, in step 142 the system generates a new call to the mobile phone. In step 143, the subscriber is provided with voice mail messages through the voice message retrieval process as discussed in connection with FIG. 13.

The administration operations for the personal number communication system 10 consist of five menus: call routing, call announcement, user options, voice mail retrieval, and facsimile message retrieval. Subscribers reach the administration menus in the preferred embodiment by one of two methods. By the first method, the subscriber calls his/her personal number and presses the "*" key after the service has answered. The system requests the subscriber's pass code. After successful entry of the pass code, the main administration menu options are available. A second and more direct access method is provided to subscribers for the override feature. To enable the override feature, subscribers press the "#"key after the service has answered. Once the pass code is successfully entered, the user is routed directly to the override options menu under the call routing menu.

Figure 7:
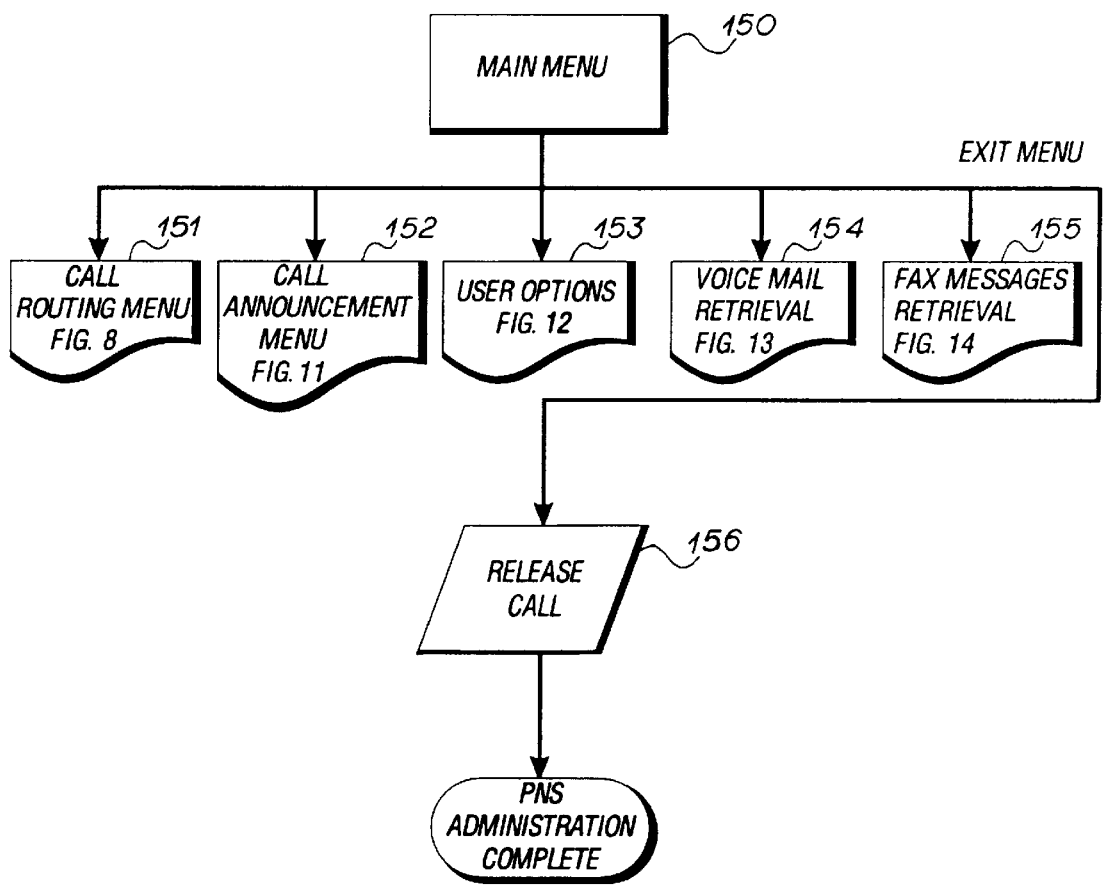

FIG. 7 is a block diagram illustrating the relationship of the administration menus. The main menu 150 comprises a call routing menu 151, a call announcement menu 152, a user options menu 153, a voice mail retrieval menu 154, and a facsimile message retrieval menu 155. After a subscriber uses any one of the menus, the system releases the call as shown by the release call diagram 156, and system administration is complete.

Figure 8A:
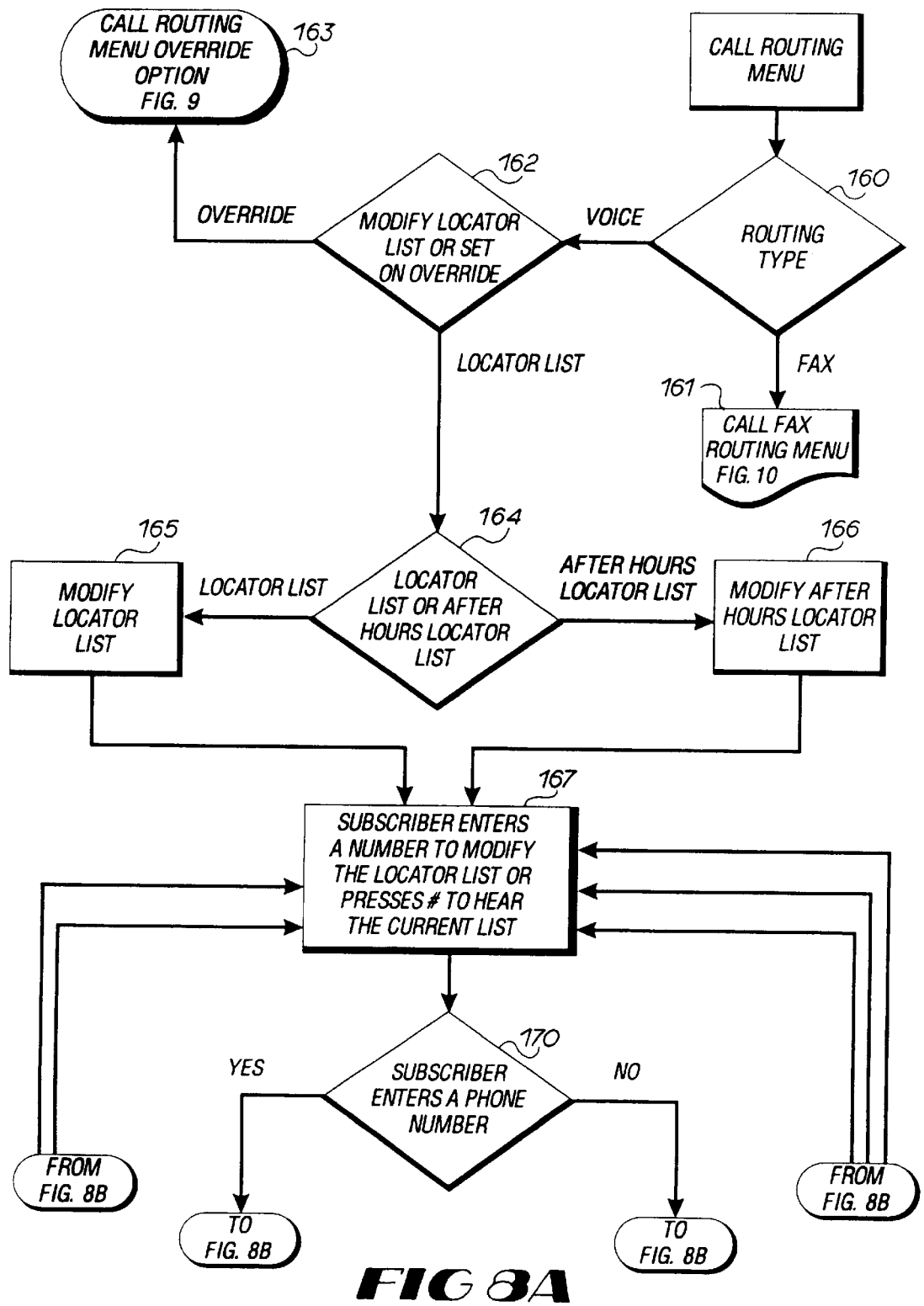
Figure 8B:
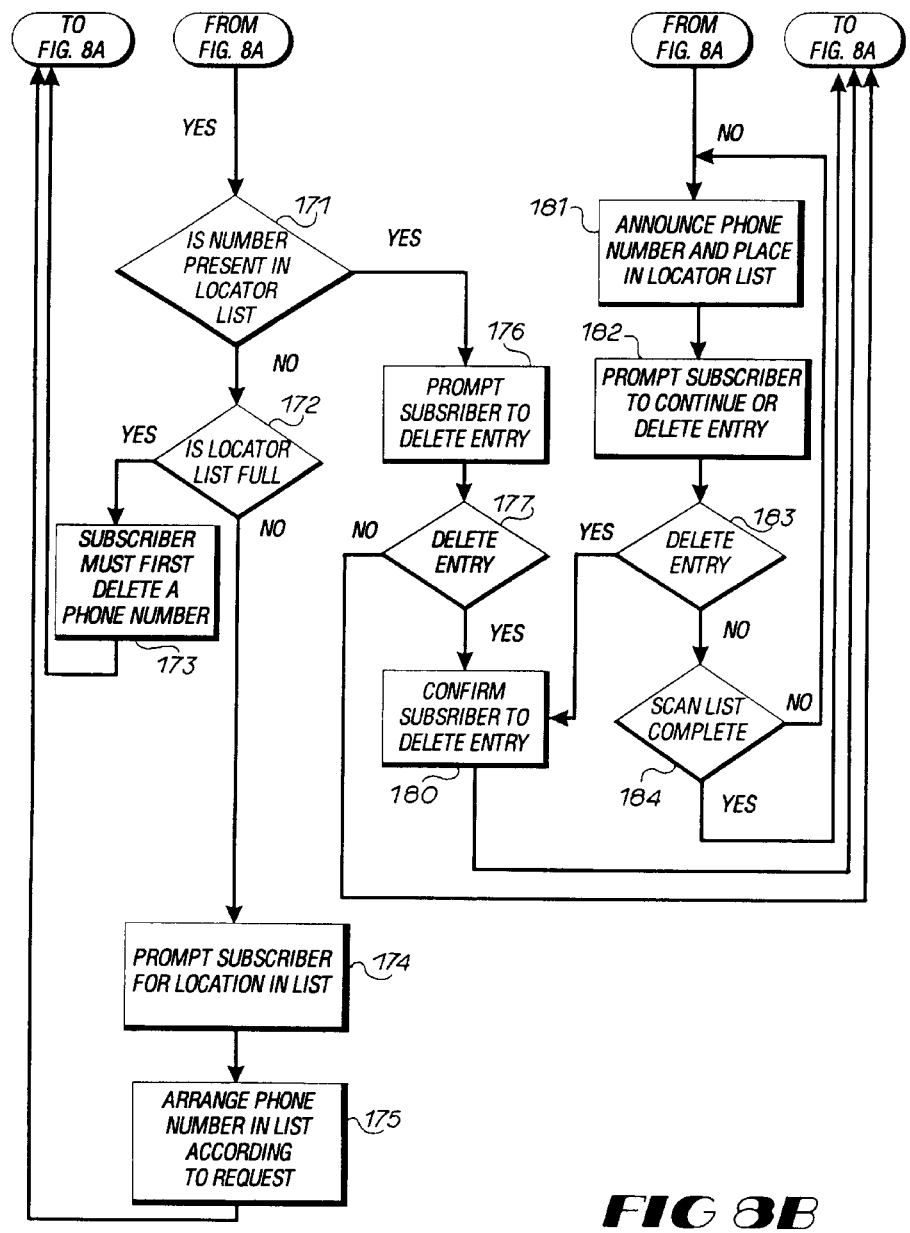
Figure 9B:
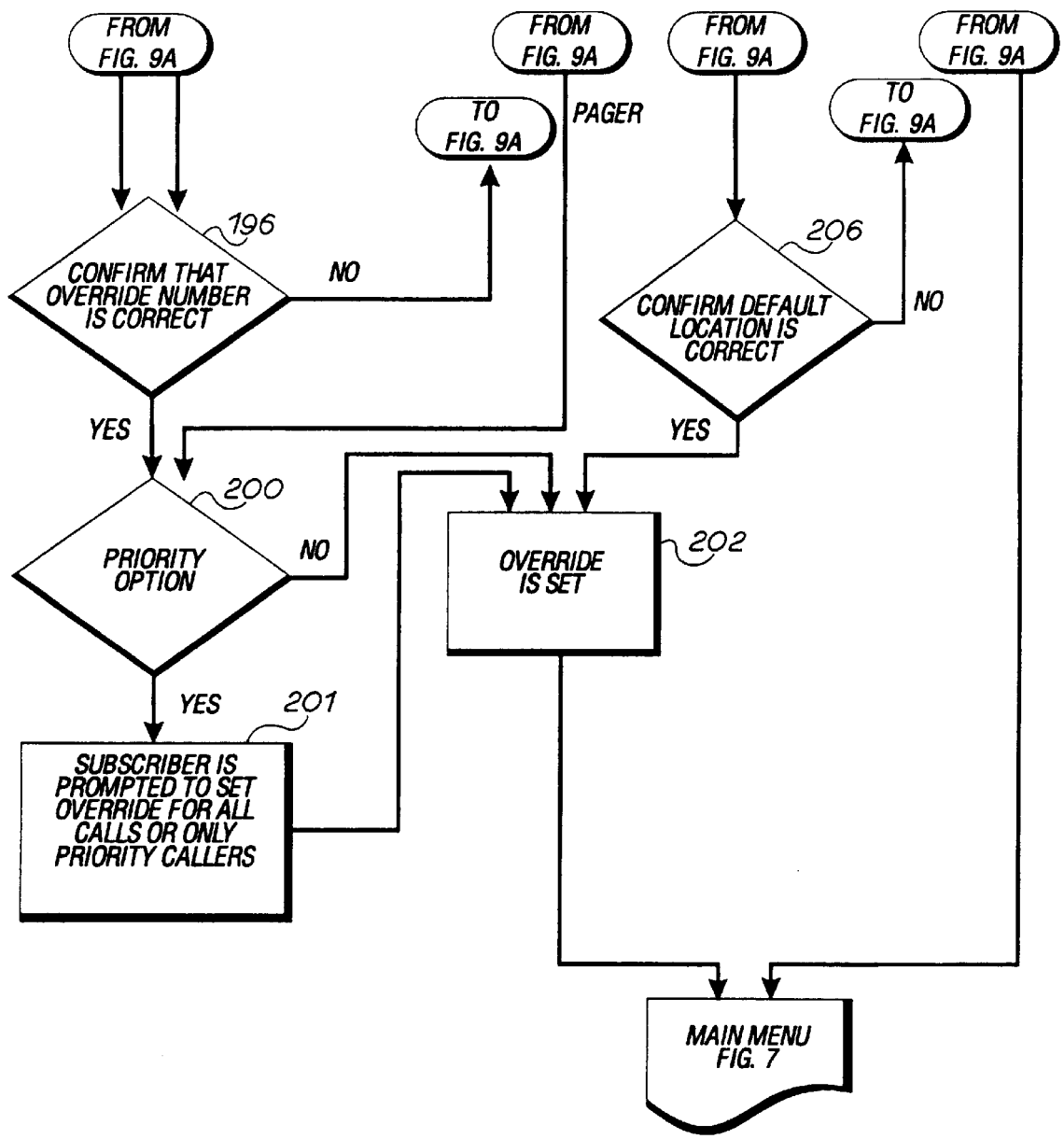

FIGS. 8 and 9 are flow charts illustrating the general method of call routing menu operations. In step 160, the system checks the routing type. If the routing type is facsimile, in step 161 the system routes to the facsimile routing menu described in connection with FIG. 10. If the routing type is voice, in step 162 the system checks whether the destination list (Locator List or Reach List) is to be modified or whether an override is to be set.

If an override is to be set, in step 163 the system transfers to the call routing menu-override options menu as described in connection with FIG. 9. If the destination list is to be modified, in step 164 the system checks whether the destination list or the after hours destination list is to be modified. If the destination list is to be modified, in step 165 the system proceeds with modifying the destination list. If the after hours destination list is to be modified, in step 166 the system proceeds to modify the after hours destination list.

Both steps 165 and 166 are followed by step 167 wherein the subscriber enters a number to modify the destination list or to hear the current version of the destination list. In step 170, the system checks the subscriber's phone number entry. If the subscriber entered a phone number, in step 171 the system checks for the number in the destination list. If the number is not in the destination list, in step 172 the system checks whether the destination list is full. If the destination list is full, in step 173 the system advises the subscriber that the list is full and one of the present numbers must be deleted before the new number can be entered and requests the subscriber to delete a phone number. The system then proceeds to step 167 wherein the subscriber enters a number to modify the destination list or presses a number to hear the current version of the list. Referring again to step 172, if the destination list is not full, the system in step 174 prompts the subscriber for a designation of a location in the hierarchy of the list for the new number. In step 175, the system arranges the destination list according to the subscriber's requests. The system then proceeds to step 167, wherein the subscriber enters a number to modify the destination list or presses a number to hear the current version of the list.

Referring again to step 171, if the number entered by the subscriber is in the destination list, in step 176 the system prompts the subscriber to delete an entry in the list. In step 177, the system checks for the deleted entry. If the entry has not been deleted, the system proceeds to step 167, supra. If the entry has been deleted, in step 180 the system confirms the deletion of the entry with the subscriber, and returns to step 167, supra.

Referring again to step 170, if the subscriber does not enter a phone number, in step 181 the system announces the telephone number of the source of the subscriber's call and places the number in the destination list. In step 182, the system prompts the subscriber to continue or to delete the entry. In step 183, the system checks for deletion of the entry. If the entry has been deleted, in step 180 the system confirms the deletion with the subscriber. If the entry has not been deleted, in step 184 the system scans the destination list for completeness. If the list is incomplete, the system repeats steps 181 through 183. If the list is complete, the system returns to step 167, supra.

FIG. 9 is a flow chart illustrating the general method of the call routing-override option menu. In step 190, the system checks whether an override has been established. If there is no established override, in step 191 the system prompts the subscriber to decide between setting an override or reviewing more options. In step 192, the system checks for the subscriber's decision. If an override is to be set, in step 193 the system checks whether calling line number identification (CLID) is available. If such information is available, in step 194 the system prompts the subscriber to leave the calling line as the override. In step 196, the system confirms that the override number is correct by presenting the telephone number to the subscriber and asking the subscriber to verify the telephone number. If the override number is correct, in step 200 the system checks for a priority option. If there is a priority option, in step 201 the system prompts the subscriber to set an override for all calls or only for priority callers. In step 202, the selected override is set, and in step 203 the system returns to the main menu.

Referring again to step 200, if there is no priority option, the system proceeds to step 202 in setting the override. Referring again to step 193, if the calling line number identification is unavailable, in step 195 the system requests the subscriber to input an override number and then proceeds to step 196. In step 196, if the subscriber advises that the override number is incorrect, the system proceeds to step 195 and requests the subscriber to input an override number.

Referring again to step 192, if the user requests that more options be supplied, in step 204 the system prompts the subscriber to set an override to pager, default, or another location. In step 205, the system checks for such information. If such information includes another location, the system proceeds to step 193 and the steps thereafter, in checking for calling line number identification. If the information in connection with step 205 includes pager information, the system proceeds to step 200 in checking for priority options. If the information in step 205 is default information, the system proceeds to step 206 and checks for confirmation that the default location is correct. If the default location is incorrect, in step 204 the system prompts the subscriber to set such information. If the default confirmation is correct, an override is set in step 202.

Referring again to step 190, if an override has been established, in step 207 the system prompts the subscriber to cancel or to view more options. In step 210, the system checks whether the subscriber requested more options or cancelled the override. If the subscriber requested more options, in step 204 the subscriber is prompted to set an override for the pager, default or another location, and the system follows the steps thereafter. If the subscriber has cancelled the override, in step 211 the system cancels the override location, and returns to the main menu in step 203.

Figure 10:
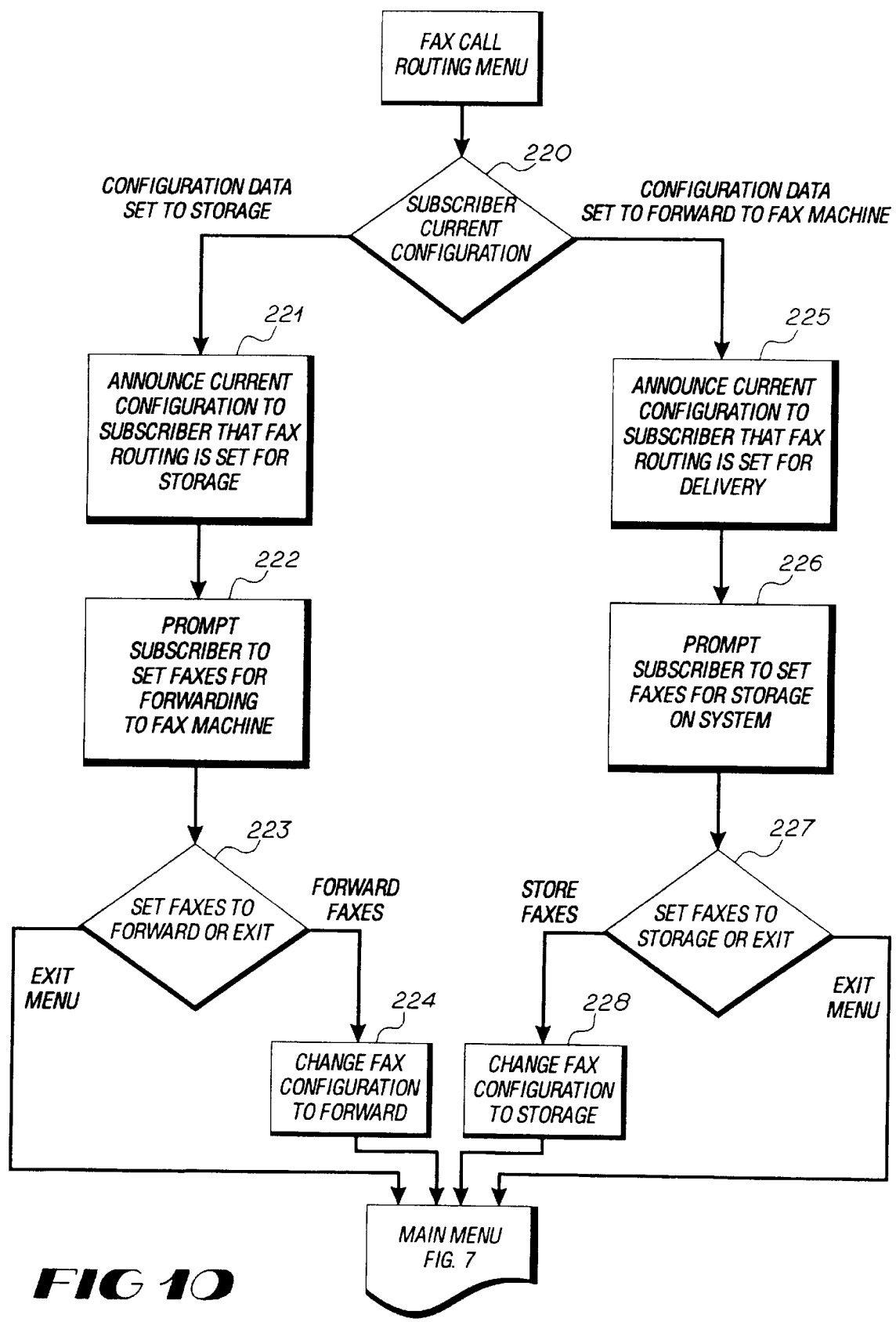

FIG. 10 is a flow chart illustrating the general method of the facsimile call routing menu. In step 220, the system checks the subscriber's current configuration. If the configuration data is set for storage, in step 221 the system announces the current configuration to the subscriber, that is, that the facsimile routing is set for storage. In step 222, the system prompts the subscriber to set facsimile messages for forwarding to the facsimile machine. In step 223, the system checks whether facsimile messages have been set to forward or to exit. If the facsimile messages have been set to exit, the system returns to the main menu. If facsimile messages have been set to forward, in step 224 the system changes the facsimile configuration to forward, and returns to the main menu.

Referring again to step 220, if the configuration data has been set to forward to the facsimile machine, in step 225 the system announces the current configuration to the subscriber, that is, that the facsimile routing is set for delivery to the facsimile machine. In step 226, the system prompts the subscriber to set facsimile messages for storage on system. In step 227, the system checks whether the facsimile messages have been set to storage or exit. If the facsimile messages have been set to storage, in step 228 the system changes the facsimile configuration to storage, and then returns to the main menu. If the facsimile messages have been set to exit menu, the system returns to the main menu.

In the preferred embodiment, the call announcement menu enables the subscriber to change the call announcement feature and to modify the priority list of callers. As noted, the call announcement feature announces the identity of the original caller when calls are delivered to the subscriber. This is completed through the reverse white pages data, when available for the original caller, or by recording the caller's name and replaying this recording for the subscriber. This allows the subscriber to screen the incoming calls. The call announcement menu provides the subscriber with an option to turn off the call announcement feature. When the feature is turned off, the system simply asks the party receiving the call if he/she is indeed the subscriber. The subscriber presses a specified key to answer that he/she is the correct party to receive the call and the system transfers the call to him/her. The answering party is requested to hang up the phone when the subscriber is not present at the location. The system can then continue to look for the subscriber at other possible destinations.

When call announcement screening is enabled, the party answering the call has three options. The first option is to accept the call from the screened calling party such as by pressing the "1" key. Once this option has been selected, the parties are connected through the transfer capability on the network platform. The second option is to reject the call such as by pressing the "9" key. This causes the calling party to be sent directly to the last stop or default destination. Finally, the third option is to informally reject the call by hanging up, which is interpreted by the system as an indication that the subscriber is not present at that location. This is also referred to as bypassing the call, which also occurs if the call to that location is not answered. This option allows the service to continue in the search for the subscriber at other destinations.

In the preferred embodiment, the system allows for a more enhanced call announcement capability which can be set and adjusted using the call announcement menu. For example, the system can be set to announce automatically the identity of a caller designated as a priority caller by the subscriber. The subscriber provides the system with a list of priority callers. The subscriber enters a phone number for each person on the list followed by a recorded name for each person. The recorded name identifies the priority caller when the call is screened. The priority list may be viewed or changed using the call announcement menu. A subscriber can either enter a phone number to modify the priority list, or scan the present entries in the priority list. If the subscriber enters a new phone number, the system requests the subscriber to record a name for identifying this number. When this party calls the personal number, the recorded name that the subscriber has stored in the priority list will be played for the purpose of identifying the calling party to the subscriber. Preferably, the subscriber also has the ability to delete telephone numbers from the priority list. Before deleting a number from the priority list, the system checks with the subscriber to confirm such deletion. Confirmation made by the subscriber to delete the entry will cause the service to remove this priority number from the list.

Figure 11B:
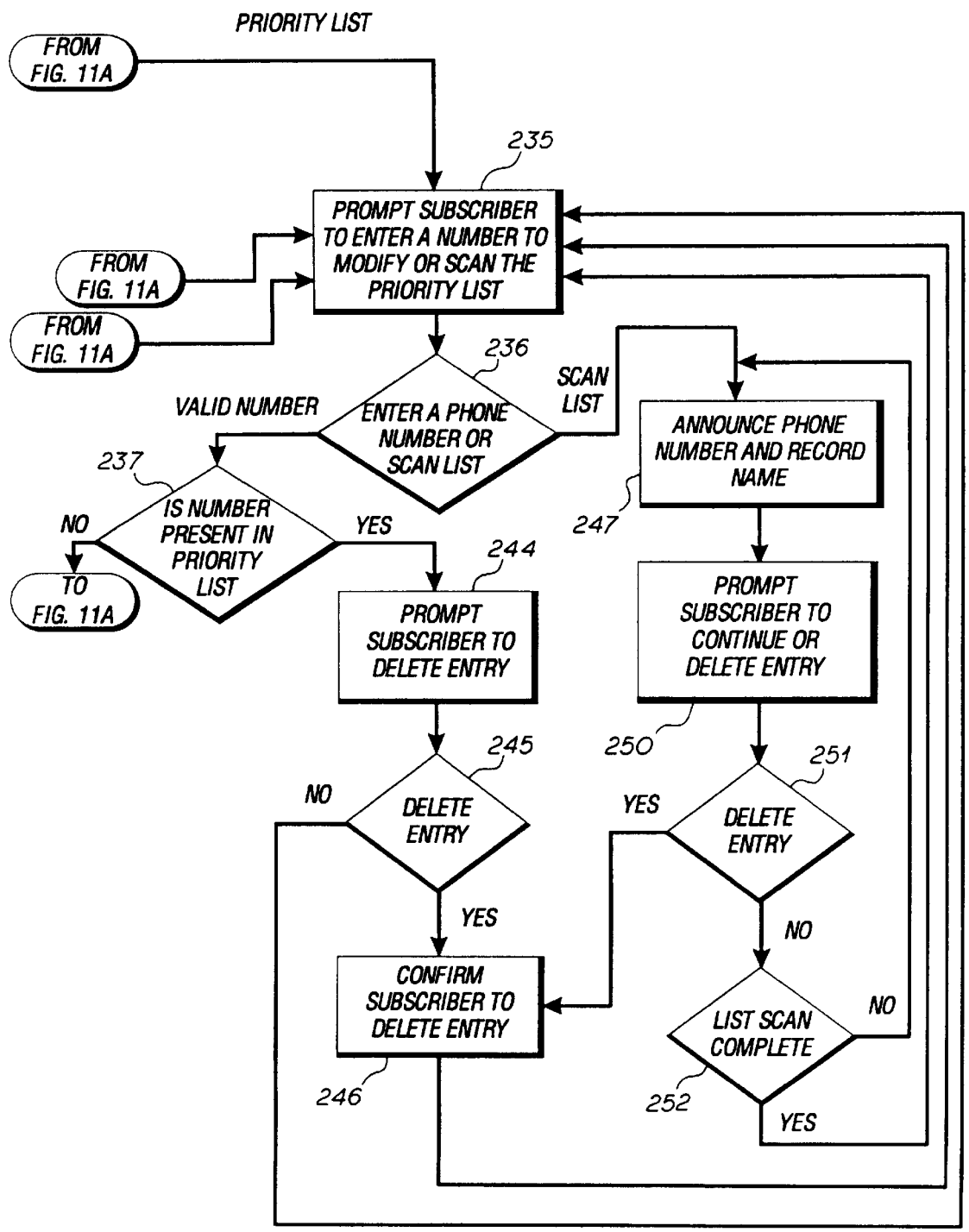

FIG. 11 is a flow chart illustrating the general method of the call announcement menu. In step 230, the system checks whether the subscriber desires to exit the menu, to change the call announcement, or to modify the priority list of callers. If the subscriber desires to exit the menu, the system returns to the main menu. If the subscriber desires to change the call announcement, in step 231 the system announces the current configuration of the call announcement feature as to whether it is enabled or disenabled. In step 232, the system prompts the subscriber to toggle the feature. In step 233, the system checks whether the subscriber has requested that the feature be changed or whether the subscriber desires to exit the menu. If the subscriber desires to exit, the system returns to the main menu. If the subscriber desires to change the feature, in step 234 the system changes the feature option enablement status for call announcement.

Referring again to step 230, if the subscriber desires to modify the priority list of callers, in step 235 the system prompts the subscriber to enter a number to indicate whether the subscriber wishes to modify or to scan the priority list. In step 236, the system checks whether the subscriber has entered a phone number or has requested to scan the list. If the subscriber has entered a phone number and it is valid, in step 237 the system checks whether the number is present in the priority list. If not, in step 240 the system checks whether the priority list is full. If the priority list is full, in step 241 the system prompts the subscriber to delete a phone number, and returns to step 235, discussed above. If the priority list is not full, in step 242 the system prompts the subscriber to record an identifying name. In step 243, the system stores the entry in the priority list, and returns to step 235, discussed above. If the number entered in step 236 is an invalid number, then step 236 is repeated. Referring again to step 237, if the number entered by the subscriber is in the priority list, in step 244 the system prompts the subscriber to delete the entry. In step 245, the system checks for deletion of the entry. If the entry has not been deleted, the system returns to step 235, discussed above. If the entry has been deleted, in step 246 the system confirms with the subscriber the deletion of the entry, and returns to step 235, discussed above.

Referring again to step 236, if the subscriber chooses to scan the list of priority callers, in step 247 the system announces a phone number and the record name associated therewith. In step 250, the system prompts the subscriber to continue or to delete the entry. In step 251, the system checks whether the entry has been deleted. If it has been deleted, the system confirms the deletion of the entry in step 246 and steps thereafter. If the entry has not been deleted, in step 252 the system checks for list scan completion. If the subscriber has completed scanning the list, the system returns to step 235, discussed above. If the subscriber has not completed the scanning of the list, the system returns to step 247, discussed above.

In the preferred embodiment, the user options menu gives the subscriber the ability to modify personal data associated with the system. The user options menu enables the subscriber to record the subscriber's name, select a pass code, and choose a standard greeting or record the subscriber's own greeting. The preferred embodiment requires the subscriber to record his/her name. Once the name is recorded, the subscriber must confirm the recording. The system then uses this recording in greeting the subscriber's callers.

In the preferred embodiment, the customer chooses a pass code to be used to access the system. The subscriber may select a new pass code under the user options menu. The subscriber chooses the option for setting a pass code. The subscriber then is asked to enter a new four digit pass code followed by a confirmation of the pass code.

The preferred embodiment provides a choice of greetings to greet callers. The subscriber may choose a system greeting by selecting the option for system greeting. Preferably the system greeting ends with the recorded subscriber's name. Instead, the subscriber may choose the option for recording his/her own greeting.

Figure 12A:
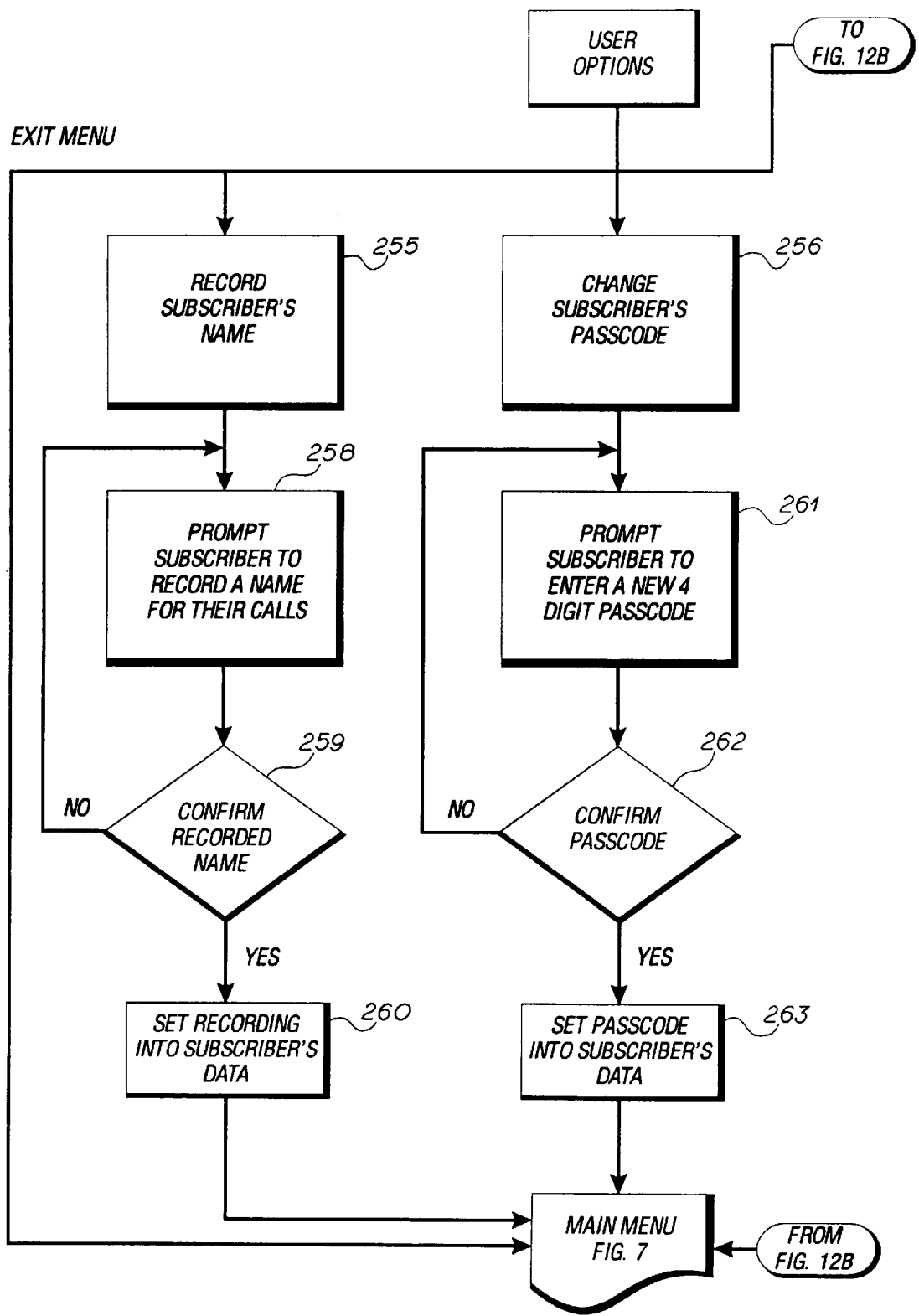
Figure 12B:
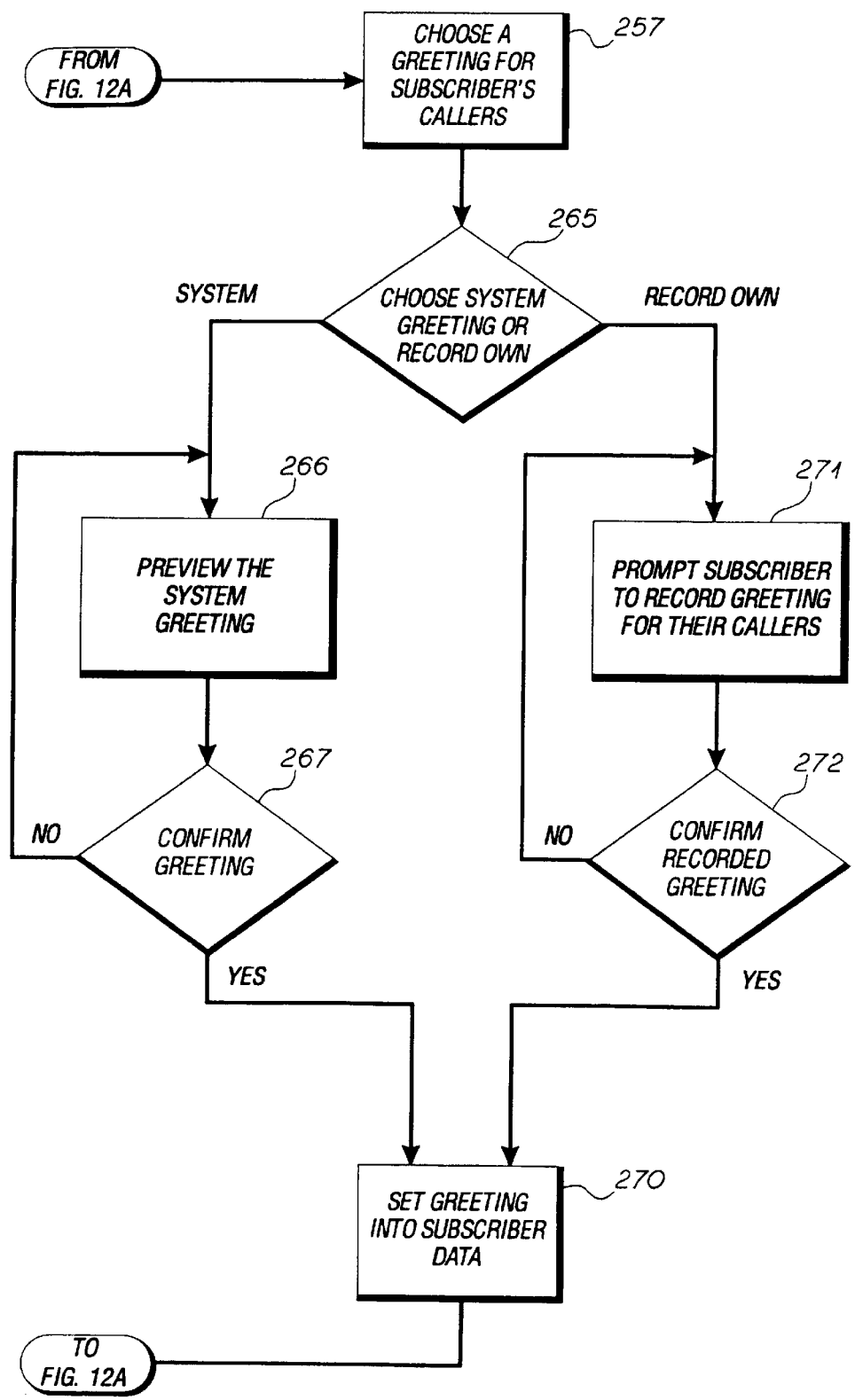
Figure 13A:
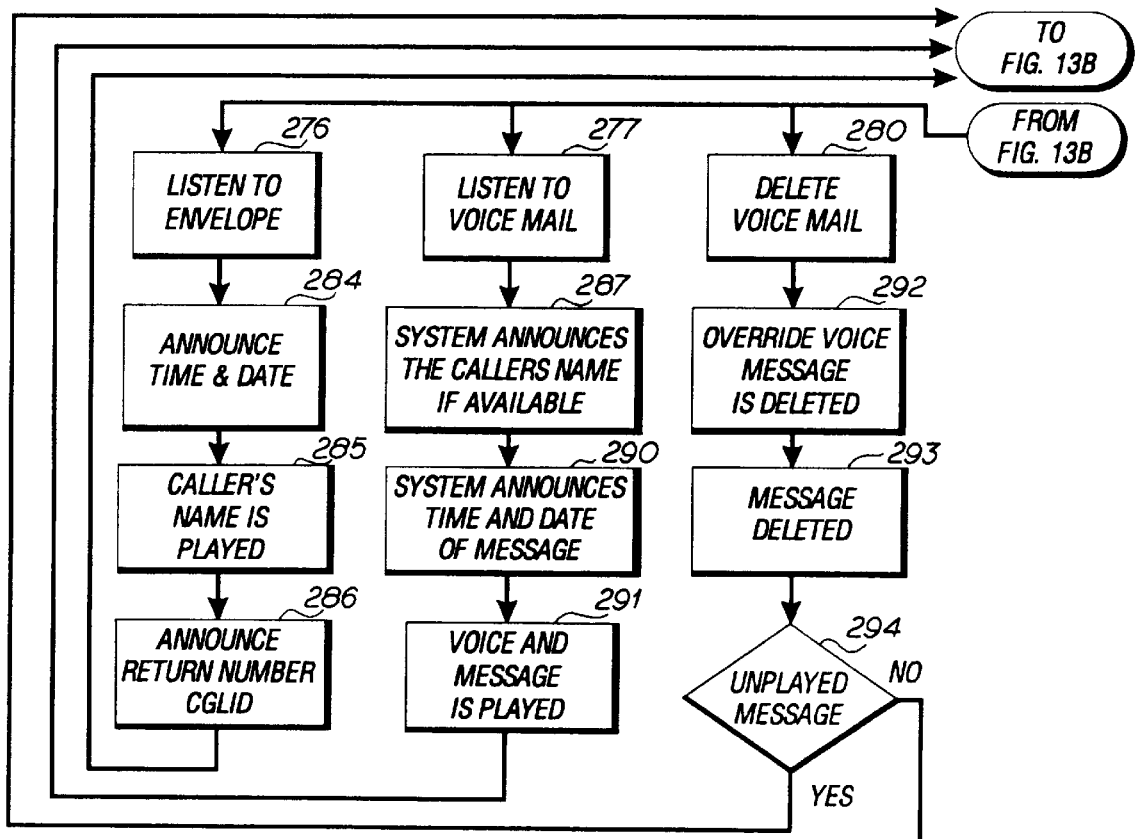
Figure 13A:
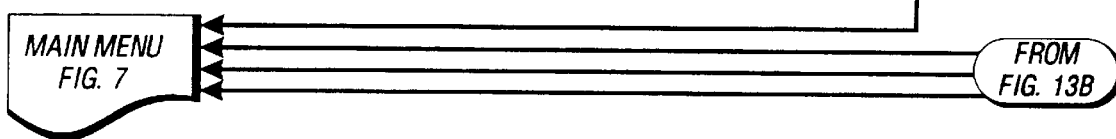
Figure 13B:
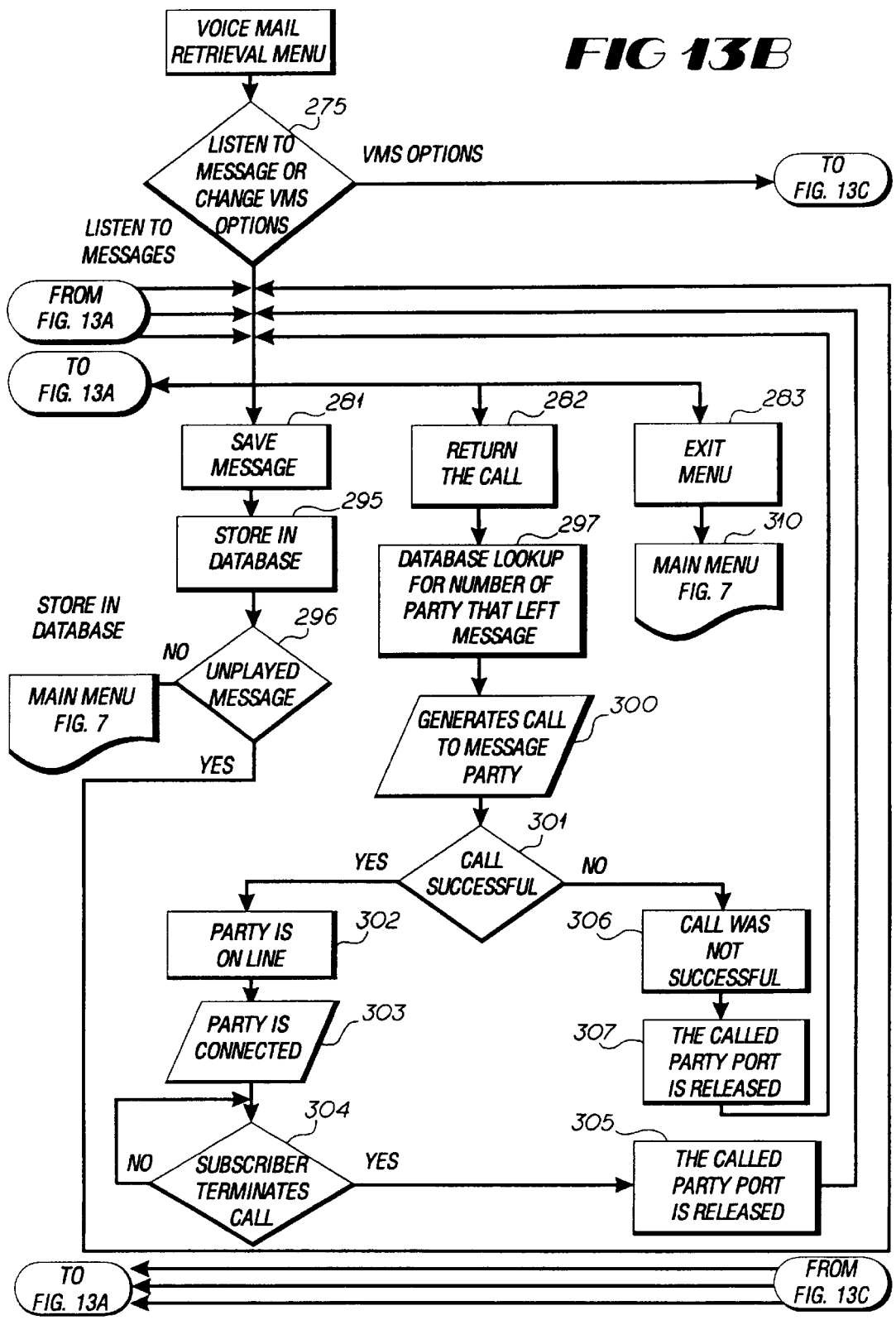
Figure 13C:
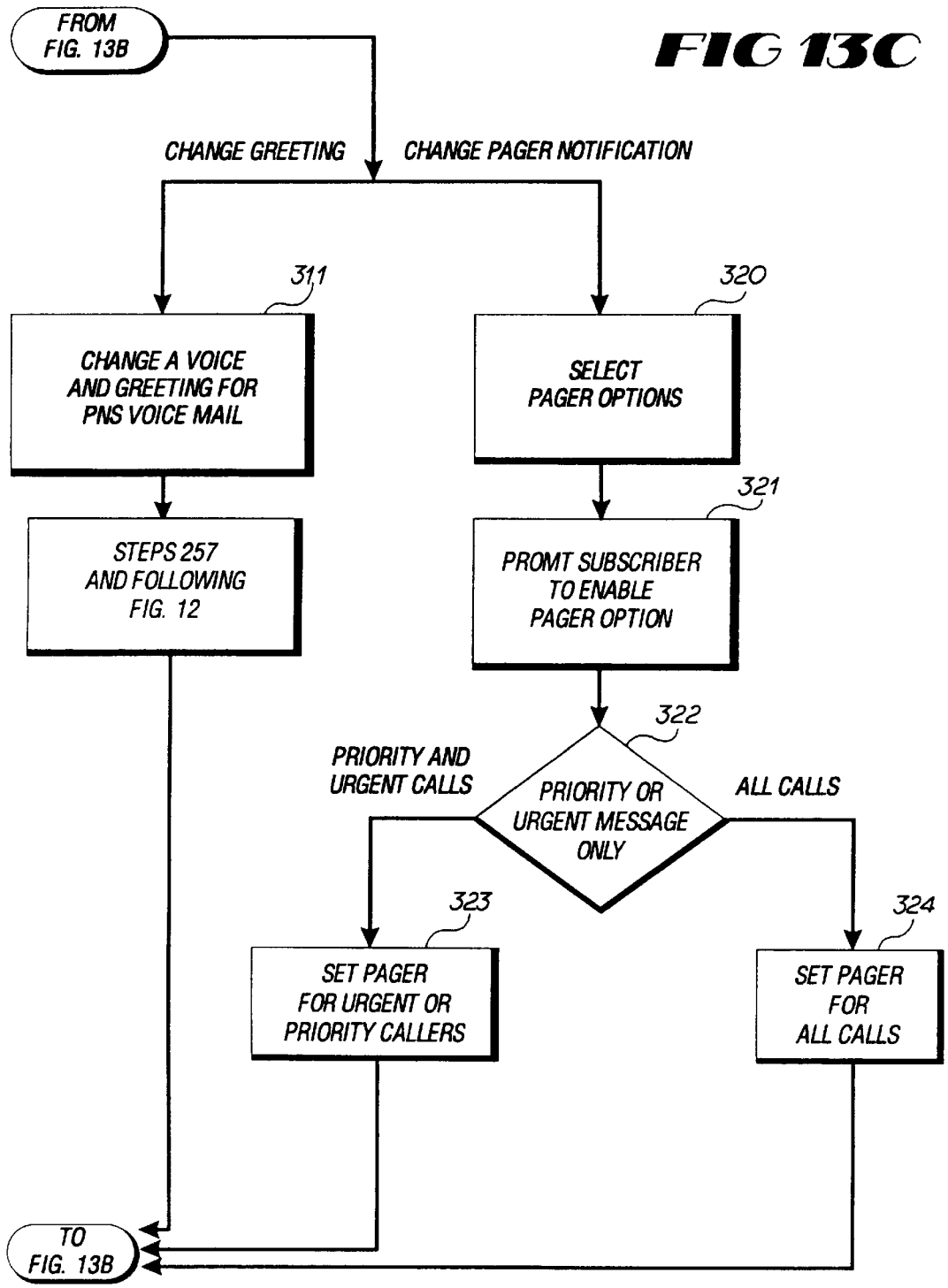

FIG. 12 is a flow chart illustrating the general method of the user options operation menu. In this menu, the subscriber has an initial choice of three options: record subscriber's name 255; change subscriber's pass code 256; or choose a greeting for subscriber's callers 257. If the subscriber chooses the first option, record subscriber's name 255, in step 256 the system prompts the subscriber to record a name for his/her calls. In step 257, the system confirms the recorded name with the subscriber. If the recorded name is unconfirmed, the system returns to step 256. If the recorded name is confirmed, in step 260 the system sets the recording into the subscriber's data and returns to the main menu.

If the subscriber chooses the second option, change subscriber's pass code 256, in step 261 the system prompts the subscriber to enter a new four digit pass code. In step 262, the system confirms the pass code with the subscriber. If the pass code is unconfirmed, the system returns to step 261. If the pass code is confirmed, in step 263 the system sets the pass code into the subscriber's data, and returns to the main menu.

If the subscriber chooses the third option, choose a greeting for subscriber's callers 257, in step 265 the system checks whether the subscriber chooses to record a system greeting or to record his/her own greeting. If the subscriber chooses the system greeting, in step 266 the system previews the system greeting. In step 267, the system confirms the greeting with the subscriber. If the greeting is unconfirrned, the system returns to step 266. If the greeting is confirmed, in step 270 the system sets the greeting into the subscriber data.

Referring again to step 265, if the subscriber chooses to record his/her own greeting, in step 271 the system prompts the subscriber to record the greeting. In step 272, the system confirms the recorded greeting. If the greeting is unconfirmed, the system returns to step 271. If the recorded greeting is confirmed, the system sets the greeting into subscriber data in step 270, and returns to the main menu.

In the preferred embodiment, in addition to the three options presented in the user options menu, the subscriber is given the option of exiting the options menu and returning to the main menu.

The preferred embodiment of the present invention has a voice mail retrieval service. Callers may leave a voice message and mark the urgency thereof. The retrieval menu allows a subscriber to listen to a message, listen to the originating calling line number identification, delete the message, save the message or return the call to the originator of the given message. The subscriber also has the option of recording a voice mail greeting as well as selecting the particular pager options as defined in the system.

There are five options that are available when reviewing voice messages: listen to the message; delete the message; save the message into archives; hear the envelope information; or return the call of the party who left the message. The subscriber is requested to listen to the message once before any other action can take place on the message.

The fifth option, returning the call to the party originating the message, allows the subscriber to return messages without leaving the voice mail service. This option records the calling line number identification of the originating (messaging) party. The messaging party or caller also has the option of giving an alternate phone number to have the subscriber return his/her call. If the return call option is selected by the subscriber the system reads this phone number and places the call to the telephone number of the messaging party. After the conversation, the subscriber is returned to the same place in the voice mail retrieval menu as his/her point of departure. If the called party did not answer, the subscriber is automatically returned to the voice mail retrieval menu.

The system preferably provides a subscriber with the option of recording his/her own voice message for the voice mail service. The subscriber can access this feature by selecting the option for recording a greeting. The subscriber then records a greeting and then confirms the recording. The system gives the subscriber the option of cancelling the personal greeting, which results in the voice mail service using the default system greeting. Preferably, the system also provides the subscriber with the ability to be paged after a voice message has been left on the network platform. The subscriber is given a choice when selecting the pager notification. A subscriber must decide if all calls should provide pager notification or if only priority calls should be provided. The subscriber who has voice mail service may select that only urgent messages left by the original caller provide pager notification.

The voice mail service of the present invention notifies a subscriber checking messages of incoming calls via voice announcements. Thus, the subscriber can retrieve messages without missing important calls. When the call is received into the system, the subscriber is provided with an announcement of who is calling and a choice of accepting or rejecting the call. If the call is accepted, the parties are connected and, once the call is completed, the subscriber is returned to the departure point of the voice mail service. If the call is rejected, the subscriber is returned to the departure point in the voice mail service, and the caller is routed to the voice mail service.

In the preferred embodiment, the voice mail service of the present invention provides a means of message notification other than the pager. When a subscriber turns on his/her mobile phone, the system calls the subscriber if messages are present on the voice mail service and announces that new messages are present. The subscriber then has three choices: accepting the call and retrieving his/her messages; rejecting the call; or hanging up. Whether the subscriber accepts or rejects the call, once the call has been answered, the system will not notify the subscriber again of his/her messages for a four hour interval. If the subscriber clears all new messages by either deleting them or saving them to archives, the system will notify the subscriber once any new messages are left on the voice mail service of the present invention. Notification calls that are not answered by the subscriber are retried after a five minute interval.

FIG. 13 is a flow chart illustrating the general method of the voice mail retrieval menu.

FIG. 13 is entered at step 275 with the system checking the subscriber's preference with regard to listening to messages or changing voice mail service options. If the subscriber decides to listen to messages, the subscriber has six options: listen to envelope information 276; listen to voice mail 277; delete voice mail 280; save message 281; return the call 282; or exit the menu 283. If the subscriber chooses to listen to envelope information 276, in step 284 the system announces the time and date of the message. In step 285, the system plays the caller's name. In step 286, the system announces the calling line number identification, and returns to step 275.

Referring again to step 275, if the subscriber chooses the second option, listen to voice mail 277, in step 287 the system announces the caller name, if available. In step 290, the system announces the time and date of the message. In step 291, the voice message is played, and the system returns to step 275.

Referring again to step 275, if the subscriber chooses the third option, delete voice mail 280, in step 292 the system deletes the current voice message. In step 293, the message is deleted. In step 294, the system checks for an unplayed message. If there is an unplayed message, the system returns to step 275. If there is no unplayed message, the system returns to the main menu.

Referring again to step 275, if the subscriber chooses the fourth option, save message 281, in step 295 the system stores the message in a database. In step 296, the system checks for an unplayed message. If there is no unplayed message, the system returns to the main menu. If there is an unplayed message, the system returns to step 275.

Referring again to step 275, if the subscriber chooses the fifth option, return the call 282, in step 297 the system checks the database for a number of the party that left the message. In step 300, the system generates a call to the message party. In step 301, the system checks whether the call was successful. If the call was successful, in step 302 the party is on the line. In step 303, the parties are connected. In step 304, the system checks whether the subscriber has terminated the call. If not, the system loops back to continue checking whether the subscriber has terminated the call. When the subscriber terminates the call, in step 305 the system releases the called party port and returns to step 275. Referring again to step 301, if the call to the message party is unsuccessful, in step 306, the call is determined to be unsuccessful. In step 307 the called party port is released, and the system returns to step 275.

Referring again to step 275, if the subscriber chooses the sixth option, exit menu 283, in step 310 the system returns to the main menu.

Referring again to step 275, if the subscriber chooses to change voice mail service options, the subscriber may change the greeting or may change the pager notification. If the subscriber chooses to change the greeting the system executes step 257 and the following steps of FIG. 12, and then returns to the main menu.

If the subscriber decides to change the pager notification, in step 320 the system prompts the subscriber to select pager options. In step 321, the system prompts the subscriber to enable pager options. In step 322, the system checks whether priority or urgent messages only are to be included as part of the pager notification. If priority and urgent messages only are to be included, in step 323 the system sets the pager for the urgent or priority callers, and returns to the main menu. If all calls are to be included, in step 324 the system sets the pager for all calls and returns to the main menu.

The preferred embodiment of the present invention provides the subscriber with the feature of sending pager notifications for facsimile messages received by the network platform. The facsimile message service allows pager notification for facsimile messages stored in the subscriber's mailbox or facsimile messages delivered to his/her facsimile machine. The pager notification can be turned on or off by the subscriber using the facsimile message retrieval menu. The facsimile message retrieval menu also gives the subscriber the ability to select delivery of facsimile messages. The menu enables the subscriber to scan the current stored facsimile messages, set all facsimile messages for delivery, delete a particular facsimile message or set a facsimile message for delivery. The scan process announces the transmit subscriber identification (TSI) information of the facsimile message and the originating calling line number identification. The subscriber may then delete this facsimile message from the subscriber's facsimile message mail box or mark the facsimile message for delivery. The subscriber also has the ability to select that all stored facsimile messages are marked for delivery. Once the facsimile messages have been selected for delivery, the subscriber must input the location of the facsimile message delivery. The subscriber may choose the subscriber's normal route, that is, to the subscriber's facsimile message machine, or the subscriber may choose to enter a different facsimile number so that the facsimile message is sent to a different facsimile machine. The service then will deliver the facsimile messages with a maximum of two automatic facsimile retries in cases of failure.

Figure 14A:
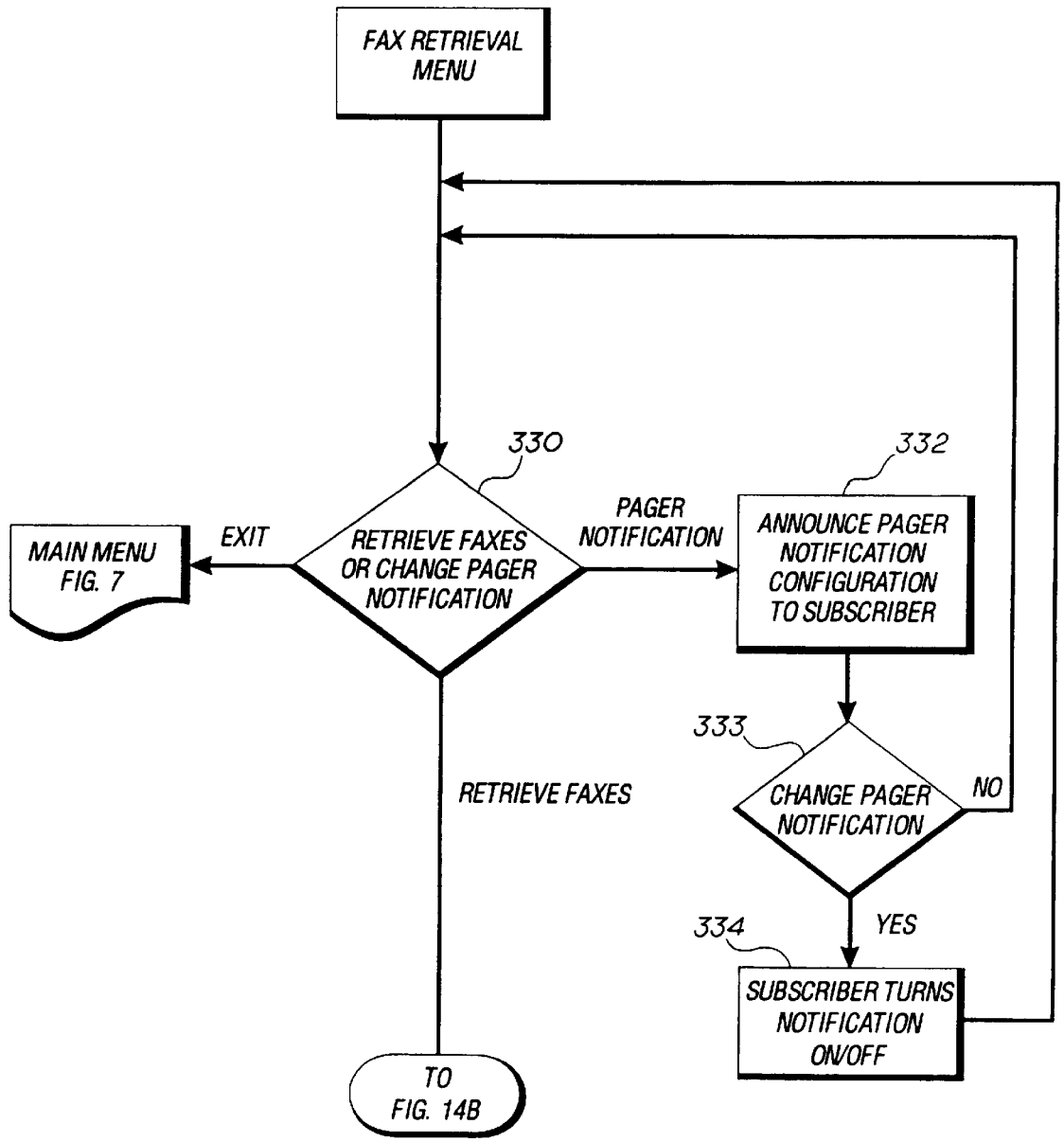
Figure 14B:
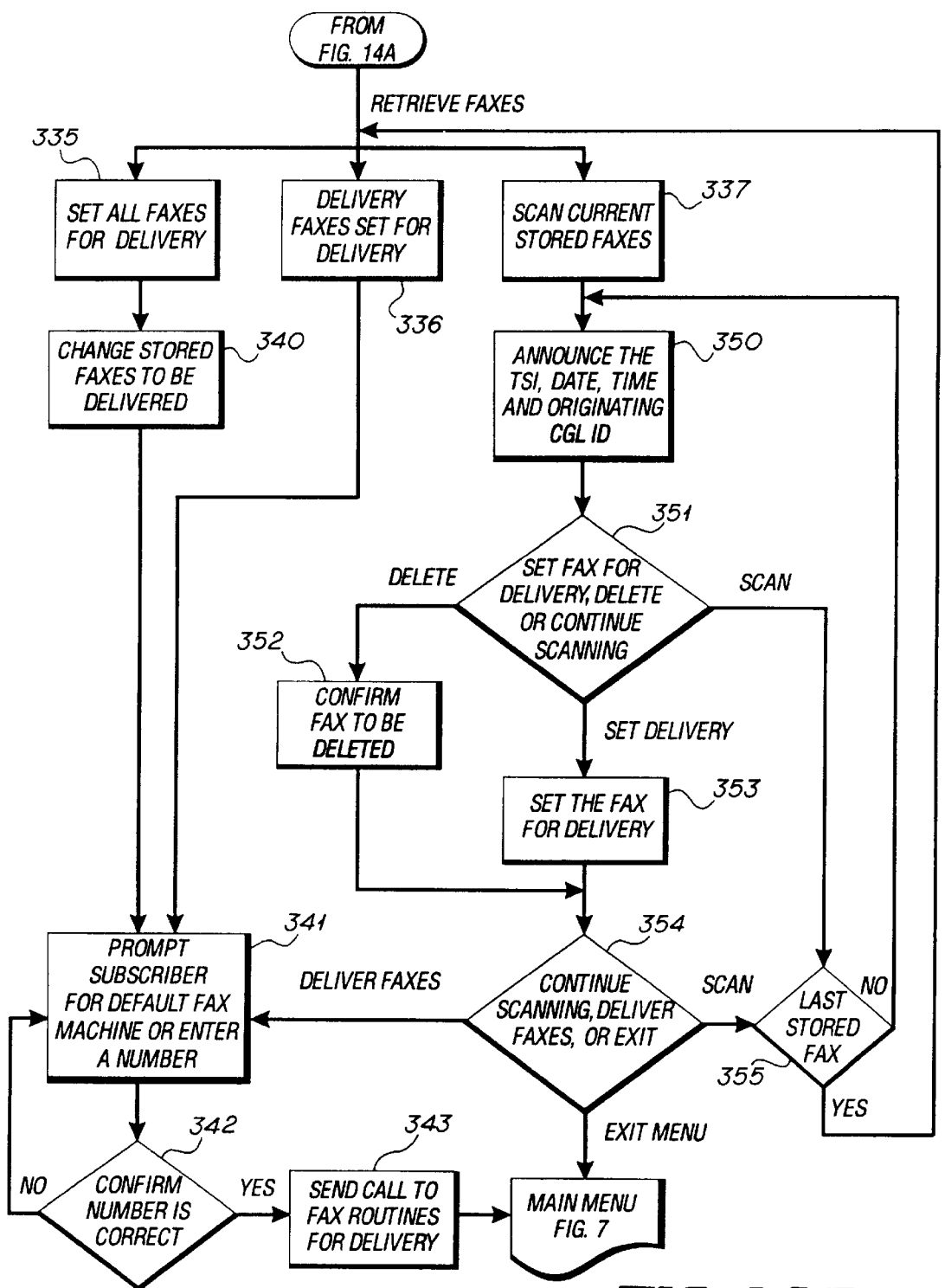

FIG. 14 is a flow chart illustrating the general method of the facsimile message retrieval menu.

FIG. 14 is entered at step 330 when the system checks with the subscriber as to exiting the menu, retrieving facsimile messages, or entering pager notification options. If the subscriber chooses to exit the facsimile message retrieval menu, the system returns to the main menu. If the subscriber chooses to enter pager notification options, in step 332 the system announces the pager notification configuration to the subscriber. In step 333, the system queries the subscriber as to changing the pager configuration. If the subscriber decides not to change the pager configuration, the system returns to step 330. If the subscriber decides to change the pager notification, in step 334 the system prompts the subscriber to turn on/off the notification, and the system returns to step 330.

If the subscriber chooses to retrieve facsimile messages in step 330, the system preferably provides three options: set all faxes for delivery 335; deliver facsimile messages set for delivery 336; or scan current stored facsimile messages 337. If the subscriber chooses the first option, set all facsimile messages for delivery 335, in step 340 the system chances stored facsimile messages to facsimile messages to be delivered. In step 341, the system prompts the subscriber for a default facsimile machine number or to enter a number. In step 342, the system confirms the number is correct. If the number is unconfirmed, the system returns to step 341. If the number is confirmed, in step 343 the system sends the call to facsimile routines for delivery, and the system returns to the main menu. If the subscriber chooses the second option, deliver facsimile messages set for delivery 336, in step 341 the system prompts the subscriber for a default facsimile machine number or to enter a number, and then executes the steps following thereafter.

If the subscriber chooses the third option, scan current stored facsimile messages 337, in step 350 the system announces the TSI, date, time and originating calling line number identification (CLID). In step 351, the system sets the facsimile message for one of three options: delete; set delivery; or scan. If the delete option is chosen, in step 352 the system confirms that the facsimile message is to be deleted before deleting the facsimile message. In step 354, the system checks whether it is to continue scanning, delivering facsimile messages, or to exit. If the system is to deliver facsimile messages, the system proceeds to step 341 and prompts the subscriber for a default facsimile machine number or to enter a number, and then executes the steps thereafter. If the subscriber chooses to exit the menu, the system proceeds to the main menu. If the subscriber chooses to continue scanning, in step 355 the system checks whether the facsimile message is the last stored facsimile message. If it is the last stored facsimile message, the system returns to the retrieve facsimile message options, discussed above. If the facsimile message is not the last stored facsimile message, the system returns to step 350 and steps thereafter.

Referring again to step 351, if the subscriber chooses to set the facsimile message for delivery, in step 353 the system sets the facsimile message for delivery. Thereafter, the system proceeds to step 354, discussed above, regarding the continuation of facsimile message delivery, facsimile message scanning or exiting the menu.

FIGS. 15–26 are flow charts illustrating the general method of user interface of the preferred embodiment of the present invention.

Figure 15A:
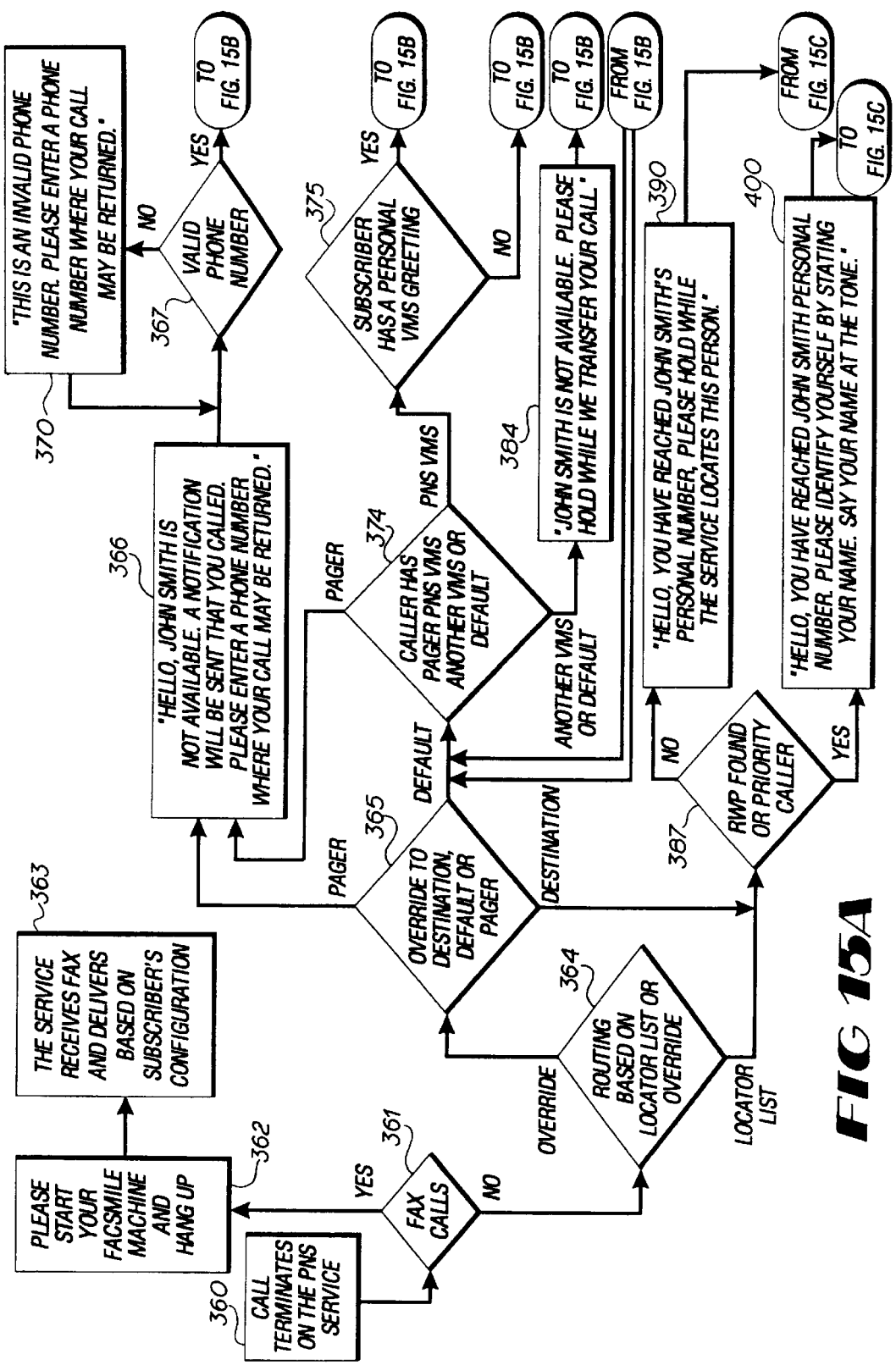

FIG. 15 is a flow chart illustrating the user interface for the call routing process, and is entered at step 360 when a call terminates on the network platform. In step 361, the system checks whether the call is a facsimile message. If so, in step 362 the system makes the following announcement: "Please start your facsimile machine and hang up." In step 363, the system receives the facsimile message and delivers it based on the subscriber's configuration. If the call is not a facsimile message, in step 364 the system checks for routing based on the destination list or an override. If an override is present, in step 365 the system checks whether the override is to a destination, a default, or a pager. If the override is to a pager, in step 366 the system announces: "Hello, John Smith is not available. A notification will be sent that you called. Please enter a phone number where your call may be returned." In step 367, the system checks whether the phone number entered is a valid phone number. If not, in step 370 the system makes the following announcement: "This is an invalid phone number. Please enter a phone number where your call may be returned." The system then returns to step 367. If a valid phone number is entered, the system announces in step 371: "Thank you for calling. John Smith will be notified of your call." In step 372, the system notifies the subscriber through a page, and in step 373 completes the service.

Referring again to step 365, if the override is to a default destination, in step 374 the system checks the default destination for one of three configurations: pager; the voice mail system of the present invention; or another voice mail service or other default. If the default destination is a pager, the system proceeds to step 366 and the steps thereafter. If the default destination is the voice mail service of the present invention (PNS VMS), in step 375 the system checks whether the subscriber has a personal voice mail greeting. If so, in step 376 the system plays the personal voice mail greeting together with the following statement: "When you are done leaving your message press the pound sign." In step 377, the system announces the calling line number identification and also makes the following announcement: "If this phone number is the correct place to return your call, press the pound sign; otherwise, enter a new phone number, now." In step 380, the system makes the following announcement: "Press 1 to mark your message urgent, otherwise press 9 for normal delivery." If the subscriber chooses to mark the message urgent, in step 381 the system marks the message as urgent. In step 382, the system makes the following announcement: "Thank you for calling, your message will be delivered." The service is then completed in step 373. If the message has been marked for other delivery, the system makes the announcement of step 382.

Referring again to step 375, if the subscriber does not have a personal voice mail greeting, in step 383 the system makes the following announcement: "John Smith is not available. Please record a message at the tone. When you are done leaving your message, press the pound sign." The system then proceeds with step 377 and the steps following, as described above.

Referring again to step 374, if the caller has designated a separate voice mail system or other destination as the default destination, in step 384 the system makes the following announcement: "John Smith is not available. Please hold while we transfer your call." In step 385, the system transfers the call off the network platform, and the service is completed in step 386.

Referring once again to step 365, if the override is to a destination on the locator list, the system follows the same steps as if the routing was based on a destination in the locator list as checked in step 364. Thus, if the routing of the call is based on the locator list or an override to a destination on the locator list, the system proceeds to system 387. At this step, the system checks whether the source identification or reverse white pages information has been found, or whether the caller is a priority caller. If the caller is a priority caller, in step 390 the system makes the following announcement: "Hello, you have reached John Smith's personal number, please hold while the service locates this person." In step 391, the system attempts to locate the subscriber while the caller hears ringing tones. In step 392, the system checks whether it has found the subscriber. If so, the system makes the following announcement in step 393: "Hello John Smith, this is your personal number service. I have [caller name] holding. Press 1 to accept this call, press 9 to reject this call, or hang up now if John Smith is not presently at this location." If the subscriber rejects the call by pressing 9, the call is sent to the default destination pursuant to steps 374 and so on. If the call is accepted in step 394, the system connects the parties, and system service is completed in step 395. If the call is bypassed, in step 396 the system checks whether it is to call another location. If it is not to call another location, the system routes the call to the default destination as in steps 374 and so on. If the system is to call another location, in step 397 the system makes the following announcement: "Please hold while the service tries another location." The system then returns to step 391.

Referring again to step 387, if the system has not found source identification information for the call, in step 400 the system makes the following announcement: "Hello, you have reached John Smith's personal number. Please identify yourself by stating your name. Say your name at the tone." In step 401, the system records the caller's name. In step 402, the system makes the following announcement: "Thank you, please hold while the service locates this person." The system then proceeds to step 391.

Figure 16:
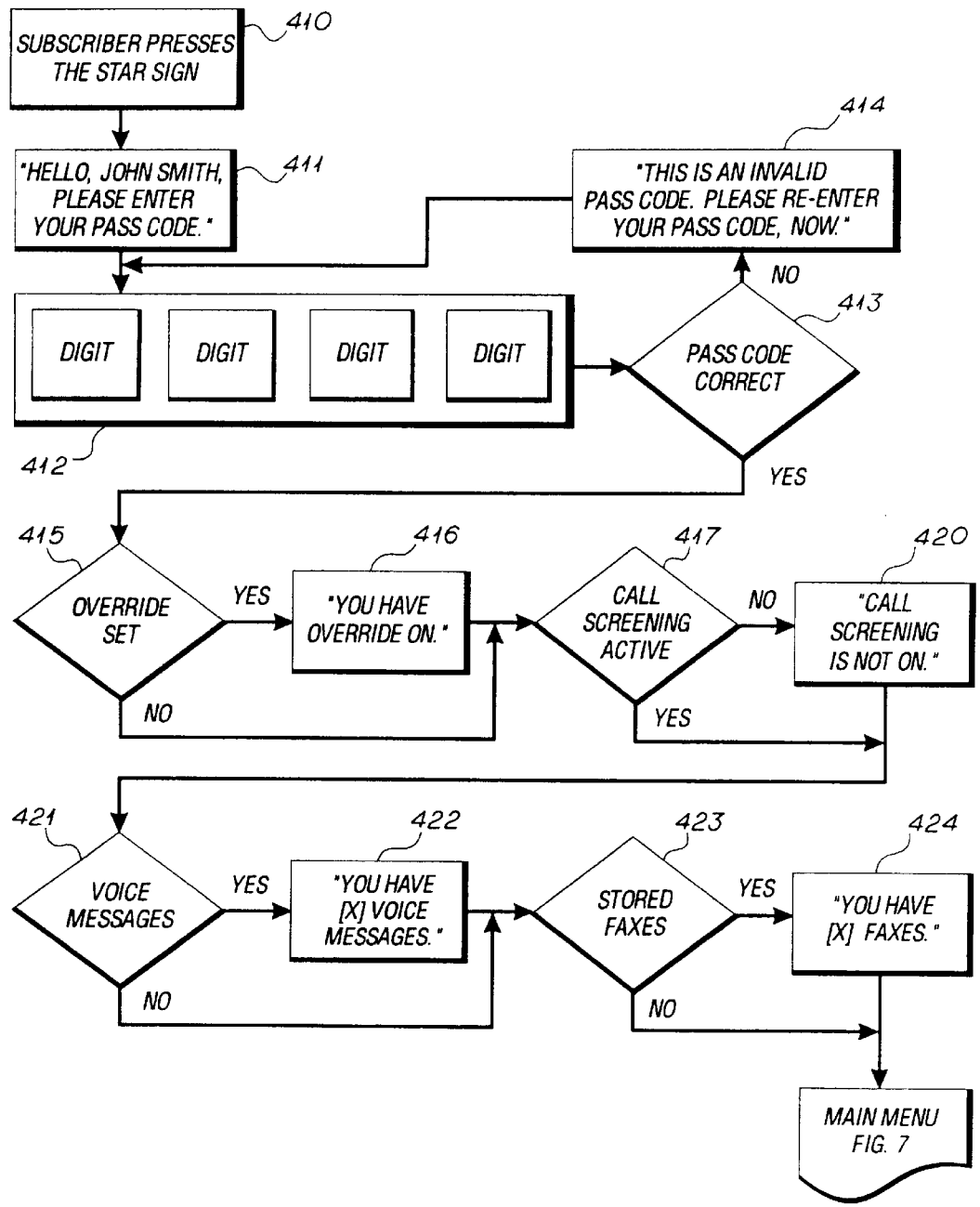

FIG. 16 is a flow chart illustrating the user interface for the administration menu entry, and is entered at step 410 when the subscriber presses the "*" sign. In step 411, the system makes the following announcement: "Hello, John Smith, please enter your pass code." In step 412, the pass code is entered. In the preferred embodiment, four digits are allotted for the subscriber's pass code. In step 413, the system checks as to the correctness of the pass code. If the pass code is incorrect, in step 414, the system makes the following announcement: "This is an invalid pass code. Please re-enter your pass code, now." The system then returns to step 412. If the pass code is correct, in step 415, the system checks whether the override is set. If the override is set, in step 416 the system makes the following announcement: "You have override ON." The system then proceeds to step 417. If the check in step 415 is negative, the system proceeds to step 417. In step 417, the system checks whether call screening is active. If call screening is inactive, in step 420, the system makes the following announcement: "Call screening is not ON." The system then proceeds to step 421. If the check in step 417 is positive, the system proceeds to step 421. In step 421, the system checks for voice messages. If there are voice messages, in step 422 the system makes the following announcement: "You have [x] voice messages." The system then proceeds to step 423. If there are no voice messages, the system proceeds to step 423. A check is made in step 423 to determine if there are any stored facsimile messages. If there are stored facsimile messages, in step 424 the system makes the following announcement: "You have [x] faxes." The system then proceeds to the main menu. If there are no stored facsimile messages, the system proceeds to the main menu.

Figure 17:
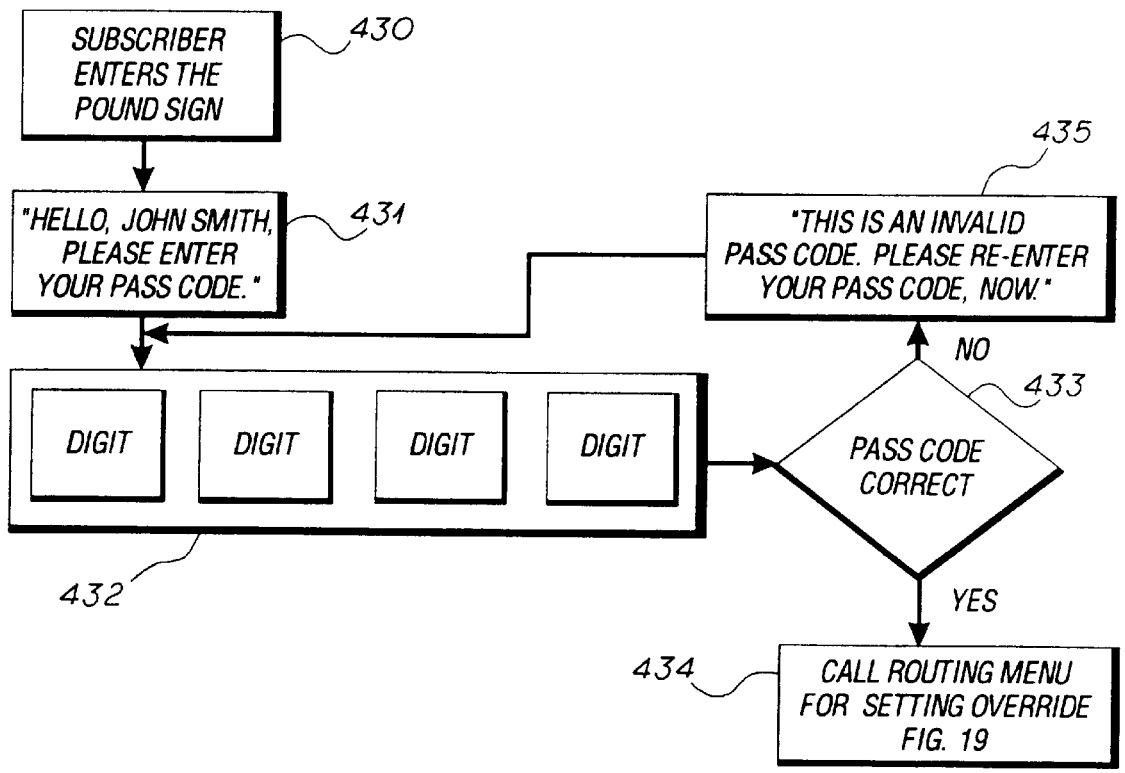

FIG. 17 is a flow chart illustrating the general method of user interface in connection with administration menu entry for quick access to the override feature.

FIG. 17 is entered at step 430 when the subscriber enters the "#"sign. In step 431, the system makes the following announcement: "Hello, John Smith, please enter your pass code." In step 432, the pass code is entered. In the preferred embodiment, the pass code is allotted four digits. In step 433, the system checks for the correctness of the pass code. If the pass code is correct, in step 434 the system calls up the call routing menu of FIG. 19 for setting the override feature. If the pass code is incorrect, in step 435 the system makes the following announcement: "This is an invalid pass code. Please re-enter your pass code, now." The system then returns to step 432.

Figure 18:
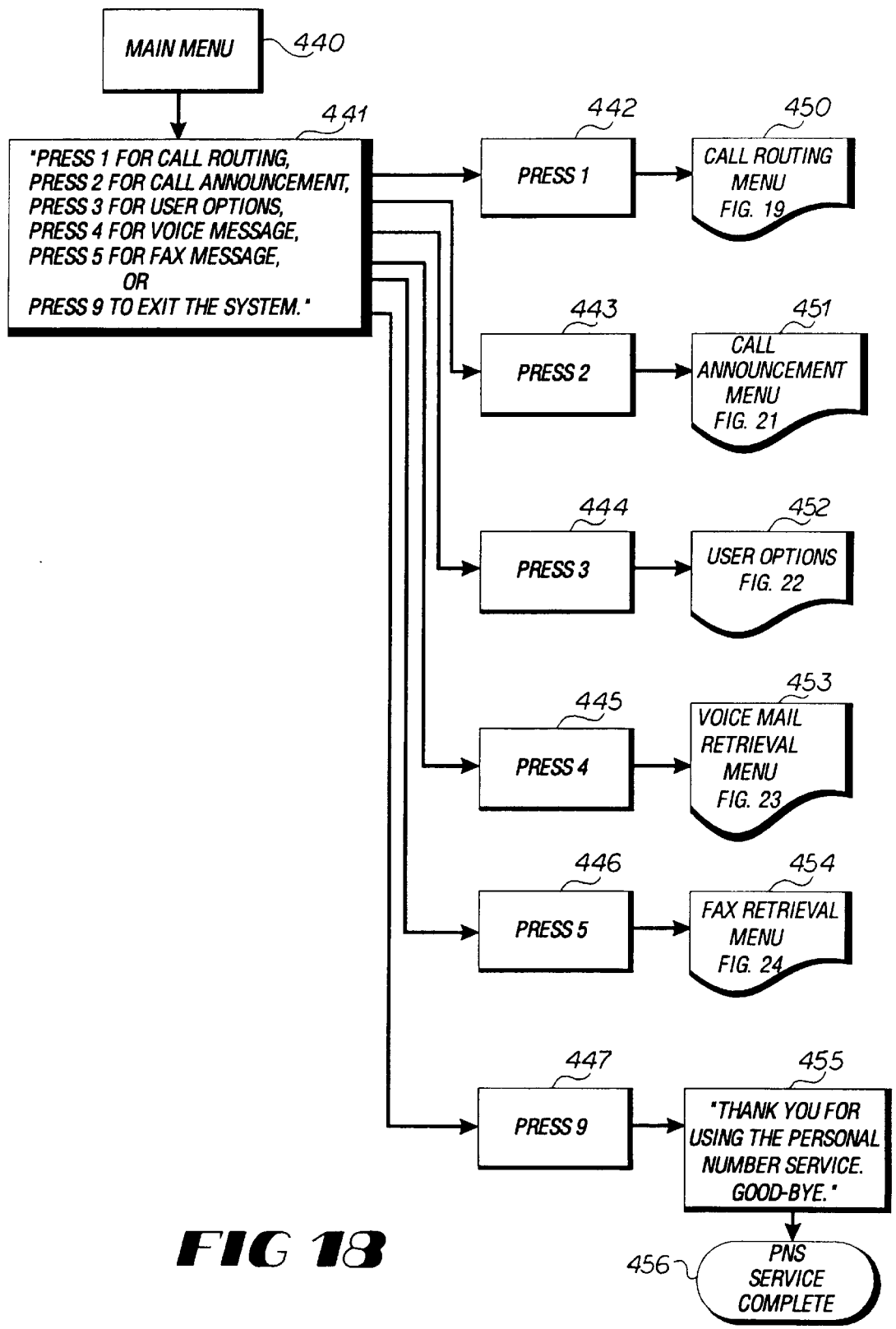

FIG. 18 is a flow chart illustrating the general method of the user interface in connection with the administration main menu.

FIG. 18 is entered at step 440 when the main menu is presented. In step 441, the system makes the following announcement: "Press 1 for Call Routing, Press 2 for Call Announcement, Press 3 for User Options, Press 4 for Voice Message, Press 5 for Fax Message, or Press 9 to Exit the system." Thus, the system presents the subscriber with six options: press 1, 442; press 2, 443; press 3, 444; press 4, 445; press 5, 446; and press 9, 447. If the subscriber presses 1, in step 450 the system presents the Call Routing Menu of FIG. 19. If the subscriber presses 2, in step 451 the system presents the Call Announcement Menu of FIG. 21. If the subscriber presses 3, in step 452 the system presents the User Options Menu of FIG. 22. If the subscriber presses 4, in step 453 the system presents the Voice Mail Retrieval Menu of FIG. 23. If the subscriber presses 5, in step 454 the system presents the Facsimile Message Retrieval Menu of FIG. 24. If the subscriber presses 9, in step 455 the system makes the following announcement: "Thank you for using the personal number service. Good Bye." The system then proceeds with completing the service in step 456.

Figure 19A:
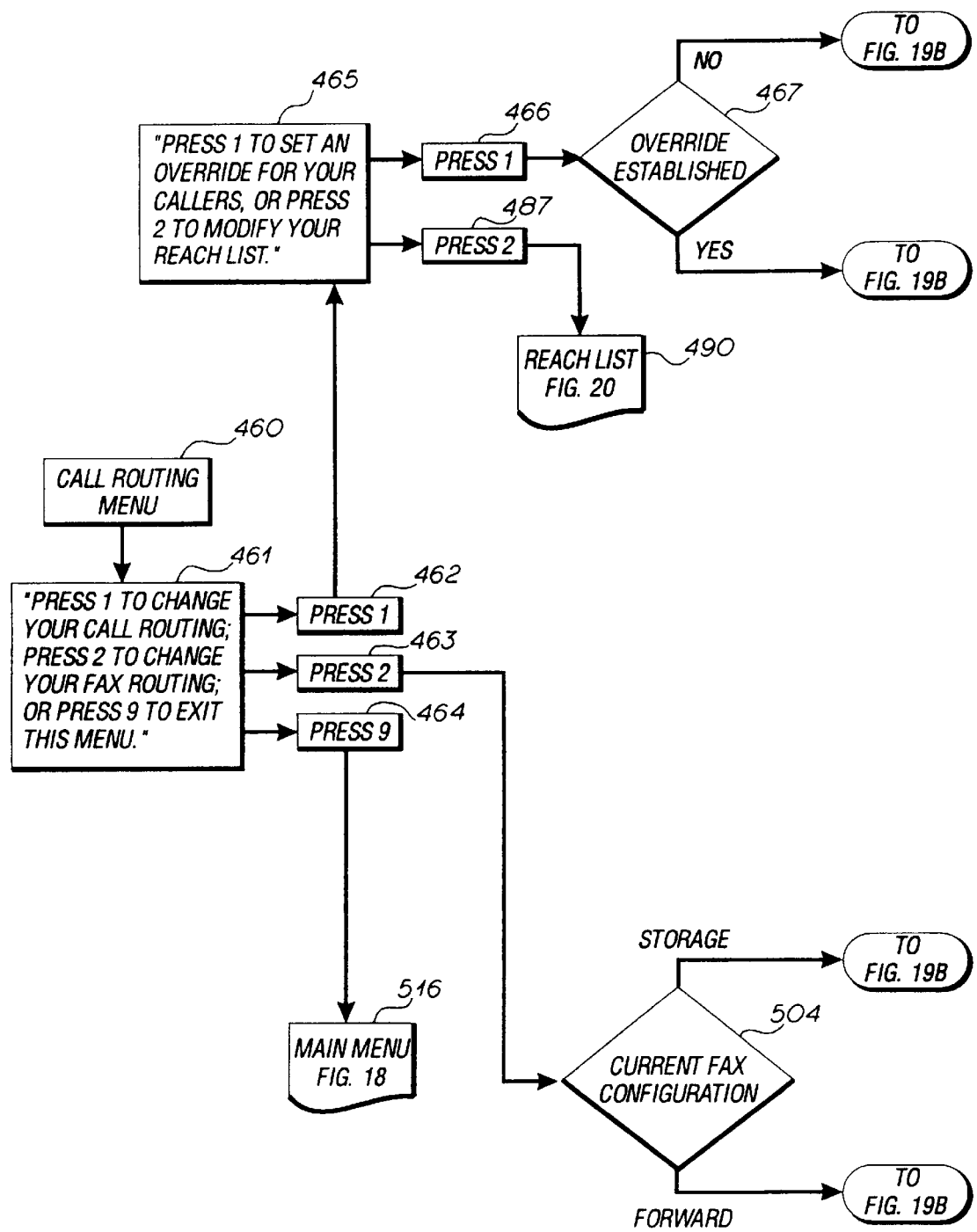
Figure 19B:
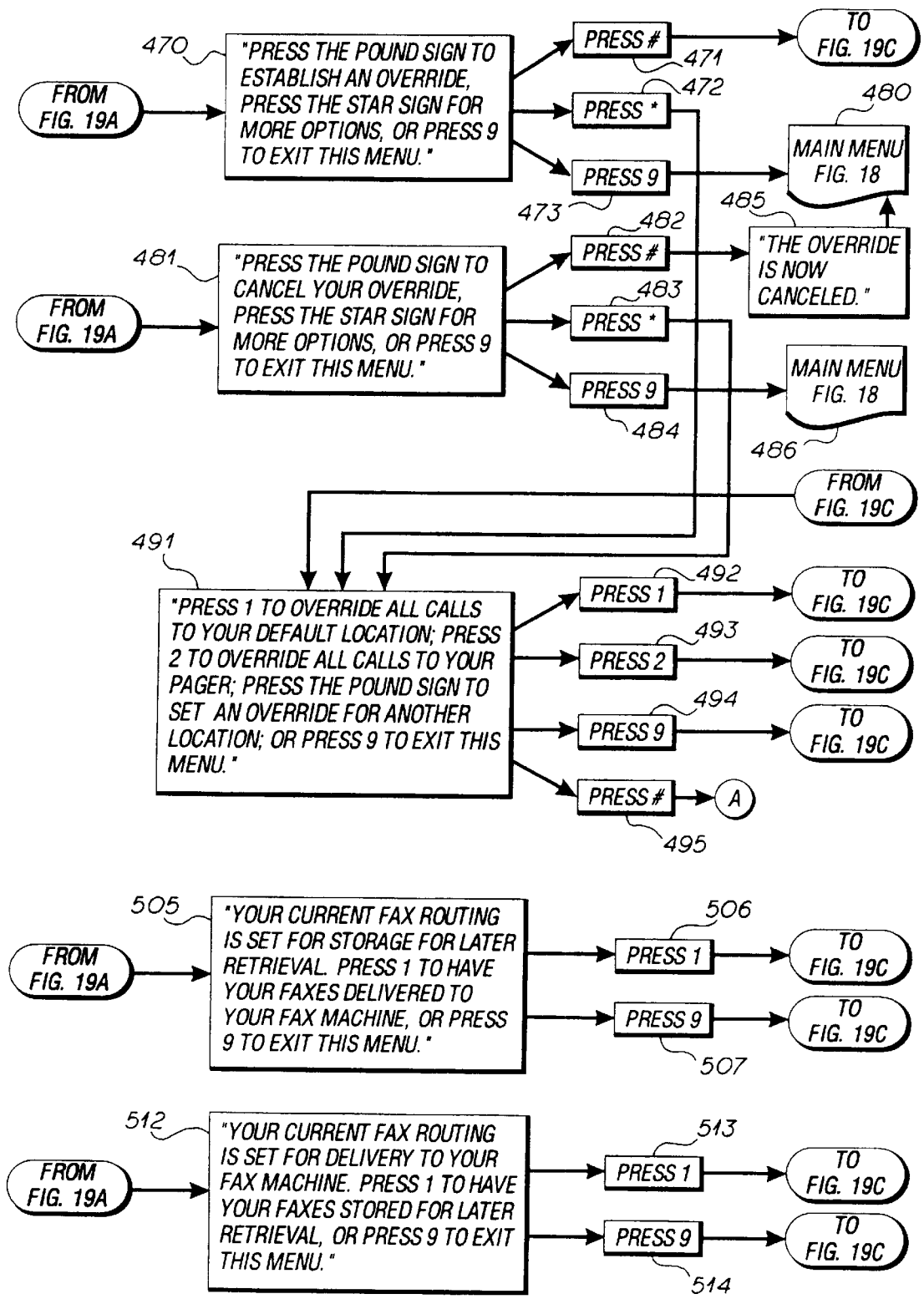
Figure 19C:
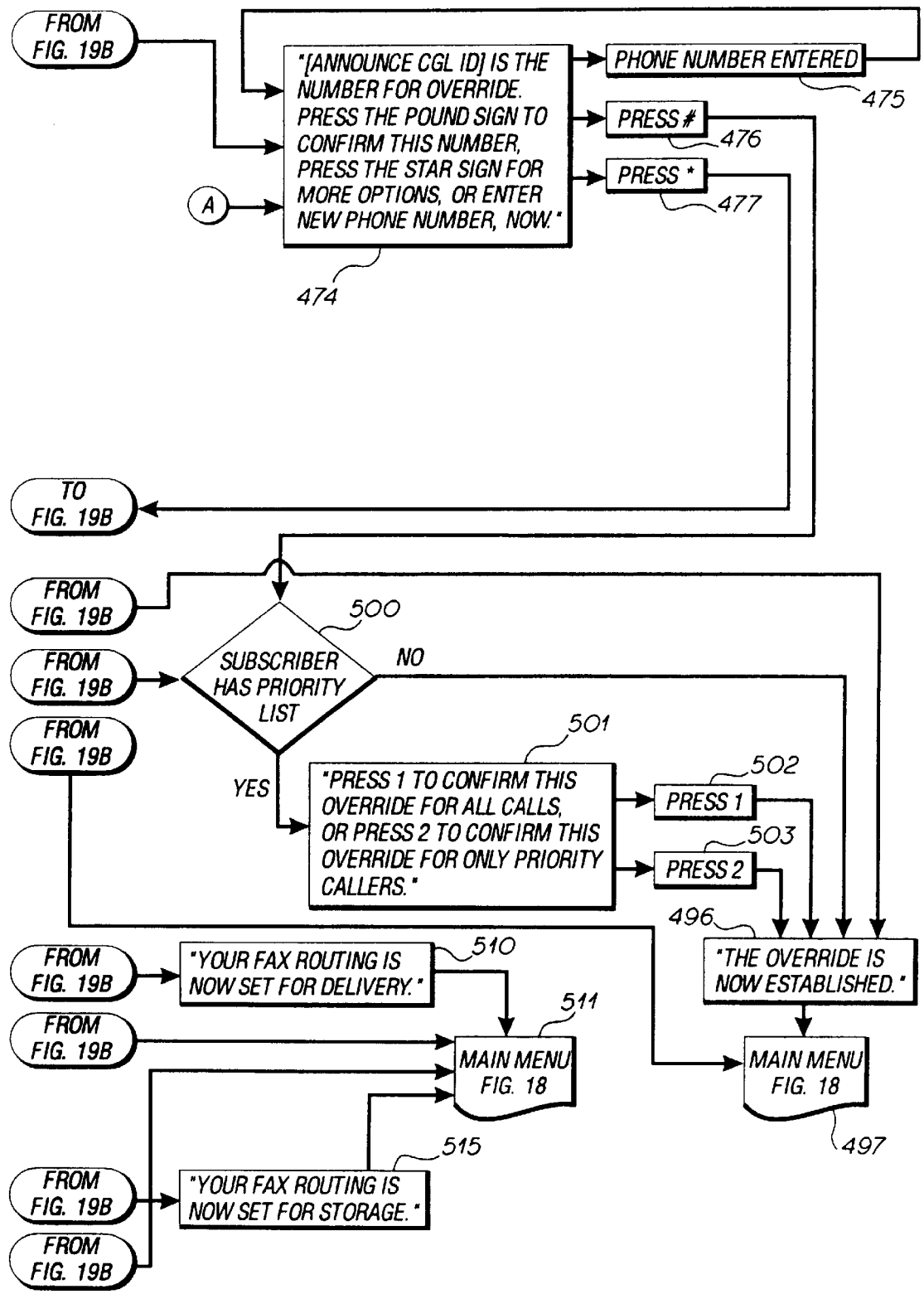

FIG. 19 is a flow chart illustrating the general method of user interface in connection with the call routing menu.

FIG. 19 is entered at step 460 with the presentation of the call routing menu. In step 461, the system makes the following announcement: "Press 1 to change your call routing; Press 2 to change your fax routing; or Press 9 to exit this menu." Thus, the subscriber is presented with three options: change call routing-press 1, 462; change fax routing-press 2, 463; or exit menu-press 9, 464.

If the subscriber chooses to change call routing, in step 465 the system makes the following announcement: "Press 1 to set an override for your callers, or Press 2 to modify your Reach List (destination list)." If the subscriber chooses to set an override, in step 466 the system recognizes the choice, and in step 467 checks whether an override has been established. If no override has been established, in step 470 the system makes the following announcement: "Press the pound sign to establish an override, Press the star sign for more options, or Press 9 to exit this menu." Thus, the subscriber is presented with three options: establish an override-press "#", 471; more options-press 472; or exit menu-press 9, 473. If the subscriber chooses to establish an override, in step 474 the system makes the following announcement: "[calling line number identification] is the number for override. Press the pound sign to confirm this number, press the star sign for more options, or enter a new phone number, now." Thus, the subscriber is presented with three options: new phone number, 475; confirm the override number-press "#", 476; or more options-press "*", 477. If the subscriber chooses to enter a new phone number, the system repeats step 474. If the subscriber chooses to confirm the override number, the system proceeds to step 500, discussed below. If the subscriber chooses more options, the system proceeds to step 491.

Referring again to step 470, if the subscriber chooses more options in step 472, the system proceeds to step 491. If the subscriber chooses to exit the menu in step 473, the system returns to the main menu in step 480.

Referring again to step 467, if an override is established, in step 481 the system makes the following announcement: "Press the pound sign to cancel your override, Press the start sign for more options, or Press 9 to exit this menu." Thus, the subscriber is presented with three options: cancel override-press "#", 482; more options-press "*", 483; or exit menu-press 9, 484. If the subscriber chooses to cancel the override, in step 485 the system makes the following announcement: "The override is now cancelled." The system then returns to the main menu in step 480. If the subscriber chooses to review more options in step 483, the system proceeds to step 491. If the subscriber chooses to exit the menu, the system proceeds to the main menu in step 486.

In step 491, the system makes the following announcement: "Press 1 to override all calls to your default location; press 2 to override all calls to your pager; press the pound sign to set an override for another location; or press 9 to exit this menu." Thus, the subscriber is presented with four options: override to default location-press 1, 492; override to pager-press 2, 493; exit menu-press 9, 494; or override to another location-press "*", 495. If the subscriber chooses to override to the default destination, in step 496 the system makes the following announcement: "The override is now established." The system returns to the main menu in step 497. If the subscriber chooses to override to the pager, in step 500 the system checks whether the subscriber has a priority list. If the subscriber does not have a priority list, the system then proceeds to step 496 as described above. If the subscriber has a priority list, in step 501 the system makes the following announcement: "Press 1 to confirm this override for all calls, or press 2 to confirm this override for only priority callers." Thus, the subscriber is presented with two options: override for all calls-press 1, 502; override for only priority callers-press 2, 503. In either case, the system then proceeds to step 496 as discussed above.

Referring again to step 491, if the subscriber chooses to exit the menu, the system proceeds to the main menu in step 497. If the subscriber chooses to set an override for another location, the system returns to step 474, discussed above.

Referring again to step 465, if the subscriber chooses to modify the Reach List (hierarchical list of destinations), the system proceeds to the Reach List interface (FIG. 20) in step 490.

Referring again to step 461, if the subscriber chooses to change facsimile message routing, in step 504 the system checks for the current facsimile configuration. If the current facsimile configuration is set for storage, in step 505 the system makes the following announcement: "Your current fax routing is set for storage for later retrieval. Press 1 to have your faxes delivered to your fax machine or press 9 to exit this menu." Thus, the subscriber is presented with two options: facsimile message delivery,-press 1, 506; exit menu-press 9, 507. If the subscriber chooses facsimile message delivery, in step 510 the system makes the following announcement: "Your fax routing is now set for delivery." The system then proceeds to the main menu in step 511. If the subscriber chooses to exit the menu, the system proceeds directly to the main menu in step 511.

Referring again to step 504, if the current facsimile message configuration is set to forward, in step 512 the system makes the following announcement: "Your current fax routing is set for delivery to your fax machine. Press 1 to have your faxes stored for later retrieval or press 9 to exit this menu." Thus, the subscriber has two options: store faxes-press 1, 513; exit menu-press 9, 514. If the subscriber chooses to store faxes, in step 515 the system makes the following announcement: "Your fax routing is now set for storage." The system then proceeds to the main menu in step 511. If the subscriber chooses to exit the menu, the system proceeds to the main menu in step 511.

Referring again to step 461, if the subscriber chooses to exit the menu, the system proceeds directly to main menu in step 516.

Figure 20A:
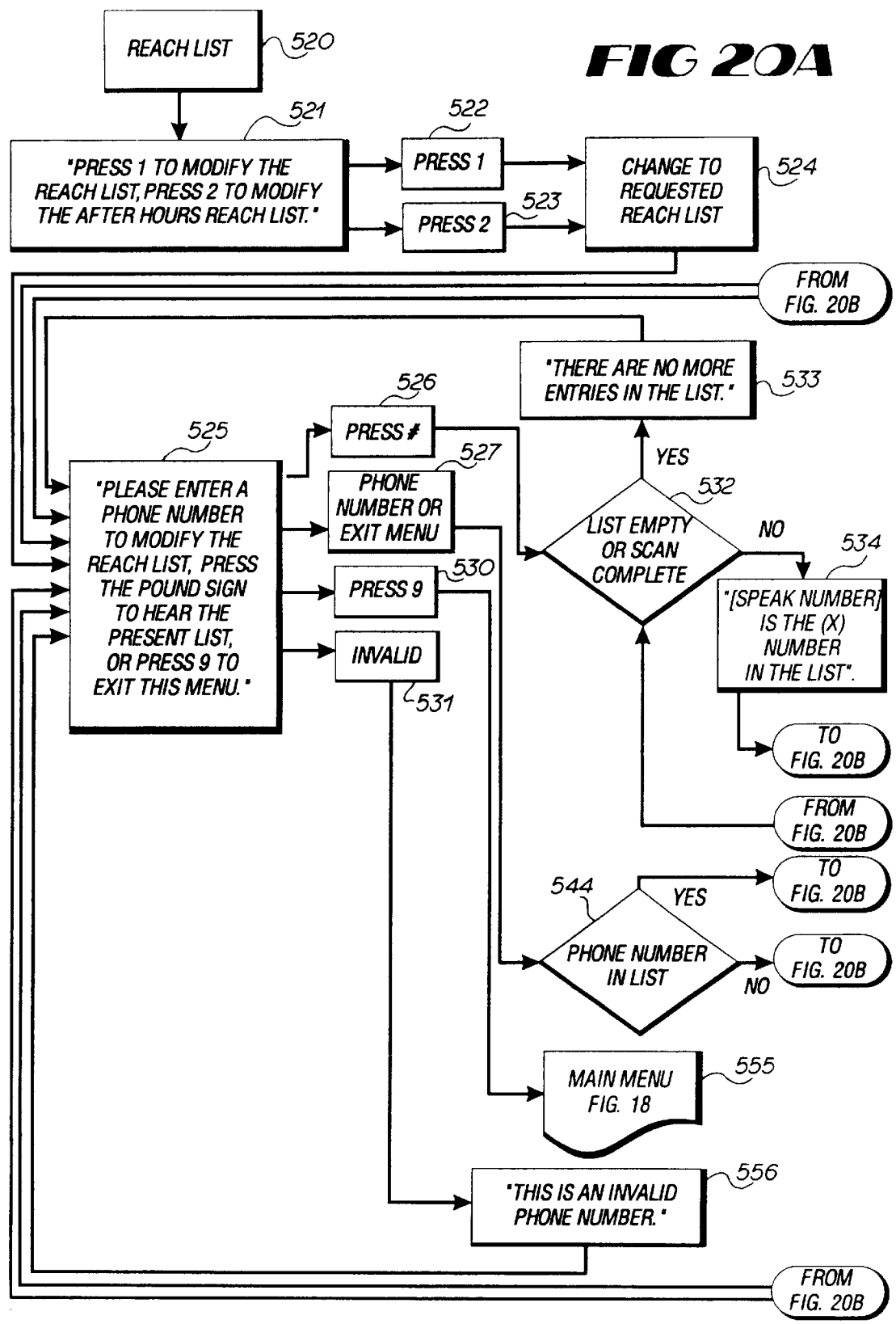
Figure 20B:
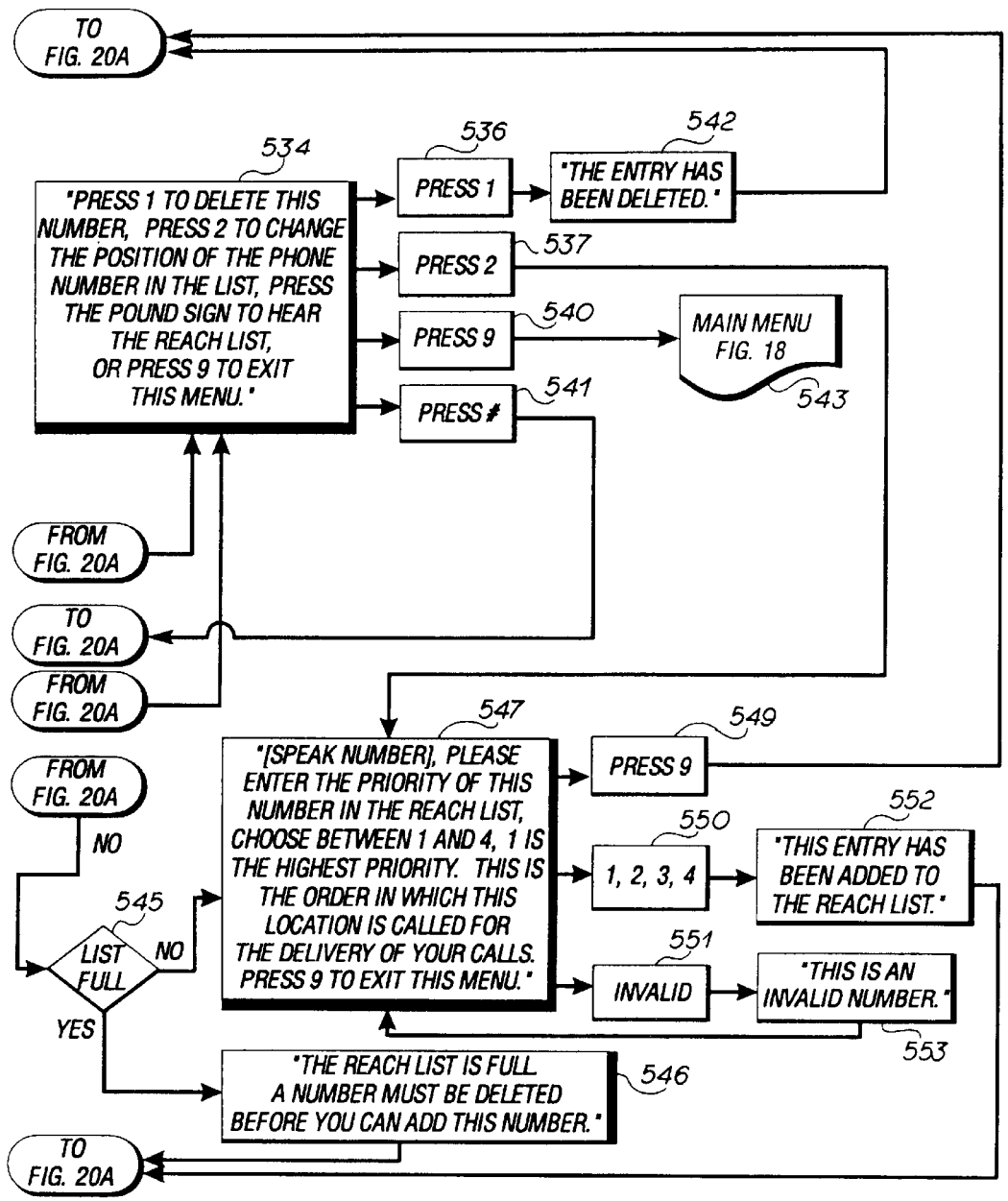

FIG. 20 is a flow chart illustrating the general method of the user interface in connection with the hierarchical list of destinations. In the preferred embodiment, the destination list is also referred to as the Reach List.

FIG. 20 is entered at step 520 when the Reach List menu is presented. In step 521, the system makes the following announcement: "Press 1 to modify the Reach List, press 2 to modify the after hours Reach List." Thus, the subscriber is presented with two options: modify Reach List-press 1, 522; or modify after hours Reach List-press 2, 523. In either case, the system begins the process of making the changes in step 524. Then, in step 525 the system makes the following announcement: "Please enter a phone number to modify the Reach List, press the # sign to hear the present list, or press 9 to exit this menu." Thus, the subscriber is presented with three options: hear present list-press "#", 526; enter phone number, 527; or exit menu-press 9, 530. If the subscriber chooses to hear the present list, in step 532 the system checks to make sure the scan is complete or the list is empty. If the scan is complete, in step 533 the system makes the following announcement: "There are no more entries in this list." The system then returns to step 525. If the scan is incomplete, in step 534 the system makes the following announcement: "[Speak number] is the [x] number in the list." The system then proceeds to step 535 where it makes the following announcement: "Press 1 to delete this number; press 2 to change the position of the phone number in the list; press the pound sign to hear Reach List, or press nine to exit this menu." Thus, the subscriber is presented with four options: delete number-press 1, 536; change position of number-press 2, 537; exit menu-press 9, 540; or hear the Reach List-press "#", 541. If the subscriber chooses to delete the number, the system makes the following announcement in step 542: "The entry has been deleted." The system then returns to step 525. If the subscriber chooses to change the position of the phone number in the list, then the system proceeds to step 547, discussed below. If the subscriber chooses to exit the menu, the system returns to the main menu in step 543. If the subscriber chooses to hear the Reach List, the system returns to step 532.

Referring again to paragraph 525, if the subscriber enters a valid phone number, in step 544 the system checks to see whether the phone number is in the list. If so, the system proceeds to step 535. If the phone number is not in the list, in step 545 the system checks whether the list is full. If the list is full, in step 546 the system makes the following announcement: "The Reach List is full. A number must be deleted before you can add this number." The system then returns to step 525. If the list is not full, the system makes the following announcement in step 547: "[Speak number], please enter the priority of this number in the Reach List, choose between one and four; one is the highest priority. This is the order in which this location is called for the delivery of your calls. Press 9 to exit this menu." Thus, the subscriber is presented with two options: exit menu-press 9, 540; or enter a priority number, 550. If the subscriber chooses to exit the menu, the system returns to step 525. If the subscriber enters a valid priority number, the system in step 552 makes the following announcement: "This entry has been added to the Reach List." The system then returns to step 525. If the subscriber enters an invalid priority number, in step 553 the system makes the following announcement: "This is an invalid number." The system then returns to step 547.

Referring again to step 525, if the subscriber decides to exit the menu, in step 555 the system proceeds to the main menu. If the subscriber enters an invalid number, then in step 556, the system makes the following announcement: "This is an invalid phone number." The system then returns to step 525.

Figure 21B:
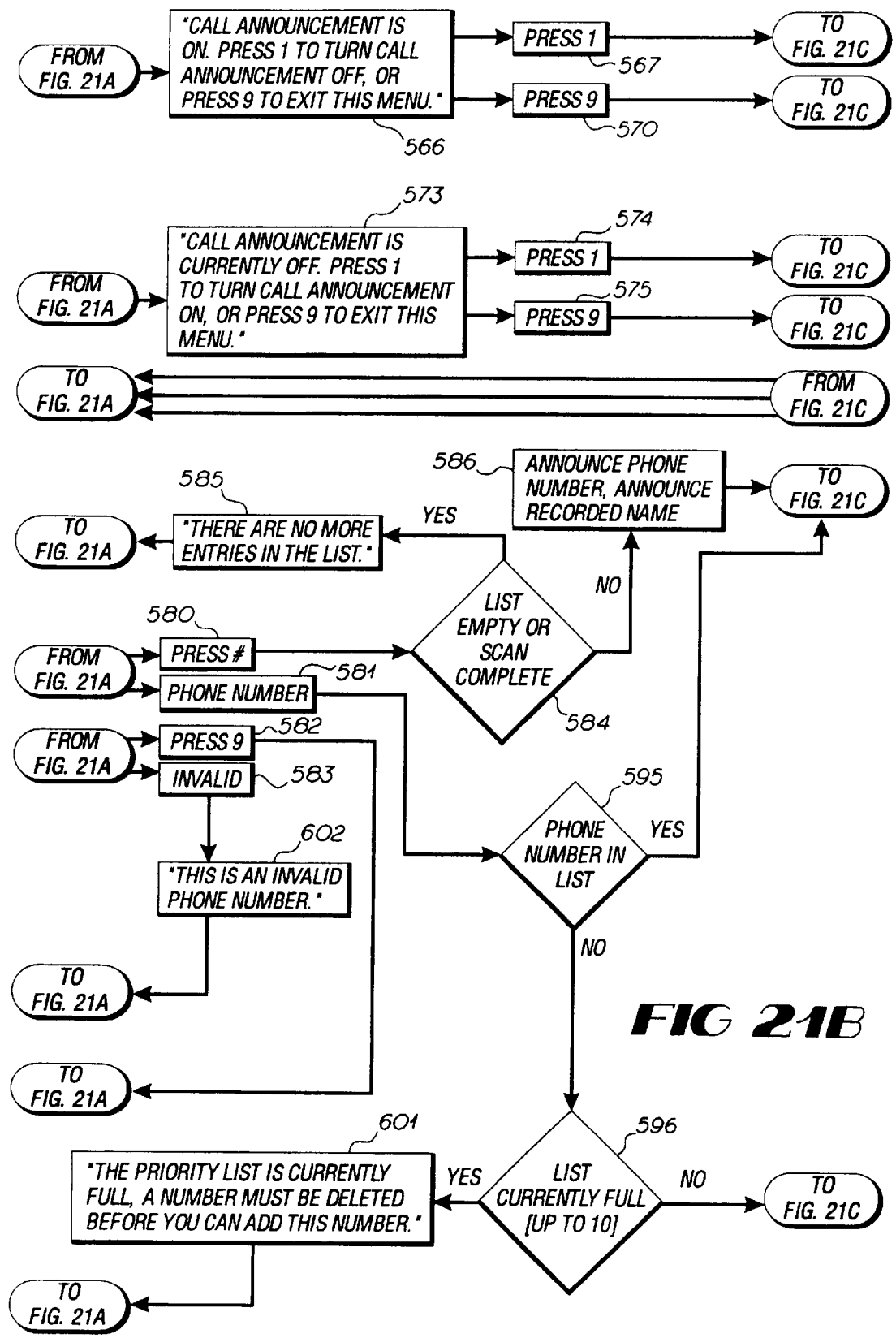
Figure 21C:
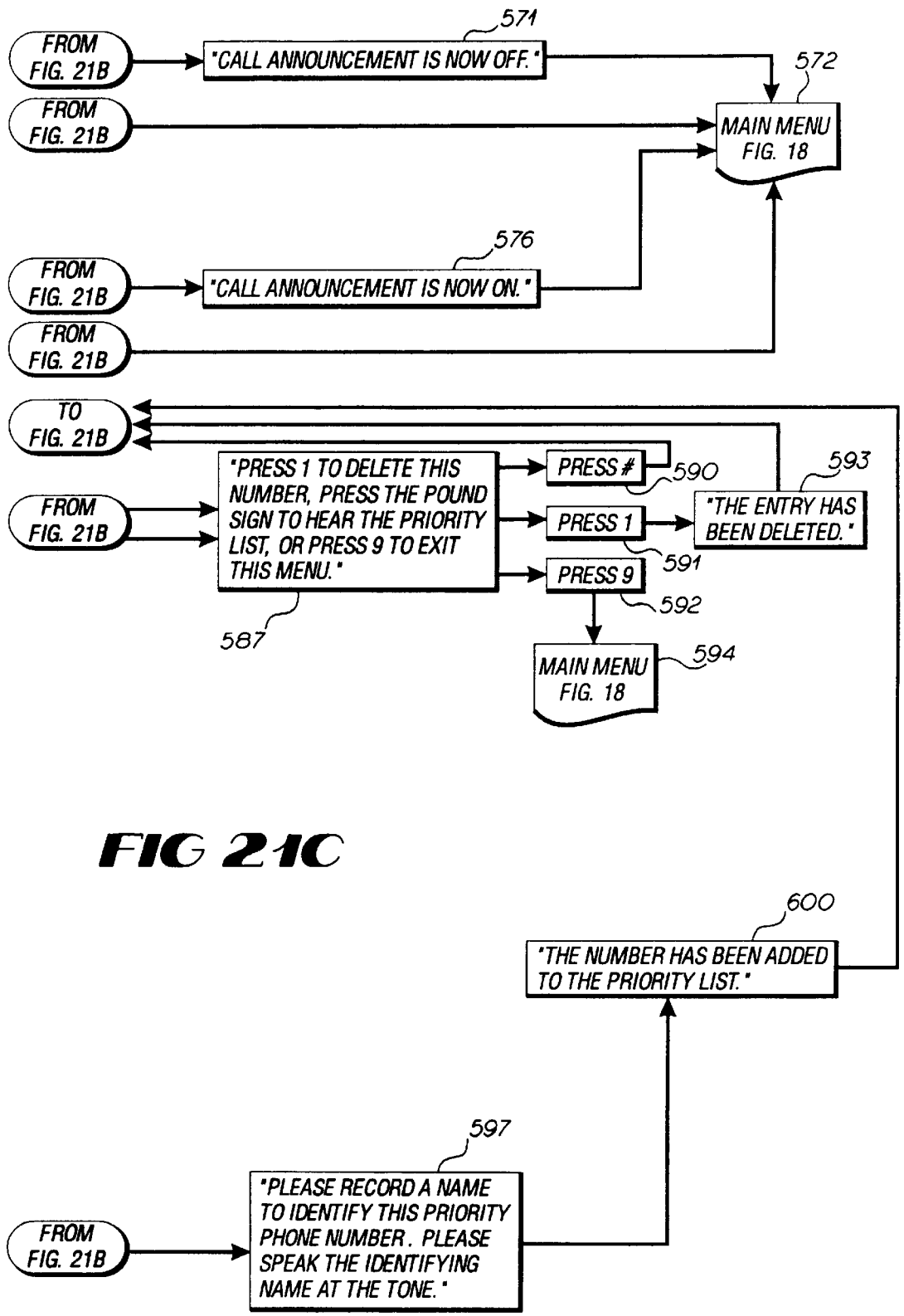

FIG. 21 is a flow chart illustrating the general method of user interface in connection with the call announcement menu.

FIG. 21 is entered at step 560 when the call announcement menu is represented to the subscriber. In step 561, the system makes the following announcement: "Press 1 to change call announcement, press 2 to modify the priority list, or press 9 to exit this menu." Thus, the subscriber is presented with three options: change call announcement-press 1, 562; modify priority list-press 2, 563; or exit menu-press 9, 564. If the subscriber chooses to change the call announcement, in step 565 the system checks whether call announcement is active. If so, in step 566 the system makes the following announcement: "Call announcement is on. Press 1 to turn call announcement off, or press 9 to exit this menu". Thus, the subscriber is presented with two options: turn call announcement off, 567; or exit menu, 570. If the subscriber chooses to turn call announcement off, in step 571 the system makes the following announcement: "Call announcement is now off." The system then proceeds to the main menu in step 572. If the subscriber chooses to exit the menu, the system proceeds to the main menu in step 572.

Referring again to step 561, if the subscriber chooses the second option, modify priority list, in step 577 the system makes the following announcement: "Please enter a number to modify the priority list. Press the pound sign to hear the present list, or press 9 to exit this menu." Thus, the subscriber has three options: hear present list-press #, 580; modify priority list, 581; exit menu-press 9, 582. If the subscriber chooses to hear the present list, in step 584 the system checks whether the list is empty or the scan is complete. If both conditions are satisfied, in step 585 the system makes the following announcement: "There are no more entries in the list." The system then returns to step 577. If the list is not empty or the scan is incomplete, in step 586 the system announces the phone number and announces the recorded name. In step 587, the system makes the following announcement: "Press 1 to delete this number, press the pound sign to hear the priority list, or press 9 to exit this menu." Thus, the subscriber has three options: hear priority list-press #, 590; delete number-press 1, 591; or exit menu-press 9, 592. If the subscriber chooses to hear the priority list, the system returns to step 577. If the subscriber chooses to delete the number, in step 593 the system makes the following announcement: "The entry has been deleted." The system then returns to step 577. If the subscriber chooses to exit the menu, the system returns to the main menu (FIG. 18).

Referring again to step 577, if the subscriber chooses the second option, modify priority list, in step 595 the system checks whether the phone number entered by the subscriber is already in the list. If so, the system proceeds to step 587. If not, in step 596 the system checks whether the priority list is currently full. In the preferred embodiment, a subscriber may designate up to ten priority callers. If the list is not full, in step 597 the system makes the following announcement: "Please record a name to identify this priority phone number. Please speak the identifying name at the tone." In step 600, the system makes the following announcement: "The number has been added to the priority list." The system returns to step 577.

Referring again to step 596, if the list is full, in step 601 the system makes the following announcement: "The priority list is currently full. A number must be deleted before you can add this number." The system then returns to step 561, discussed above.

Referring again to step 577, if the subscriber chooses the third option, exit menu, the system returns to the main menu (FIG. 18) in step 603.

Referring again to step 577, if the subscriber enters an invalid number in seeking to modify the priority list in step 583, in step 602 the system makes the following announcement: "This is an invalid phone number." The system then returns to step 577.

Referring again to step 561, if the subscriber chooses the third option, exit menu, the system returns to the main menu (FIG. 18) in step 603.

Figure 22A:
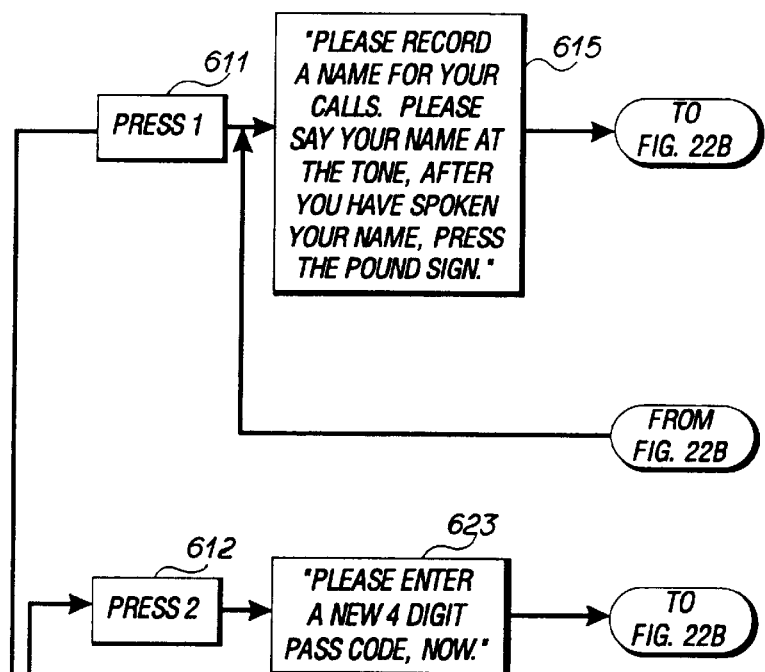
Figure 22A:
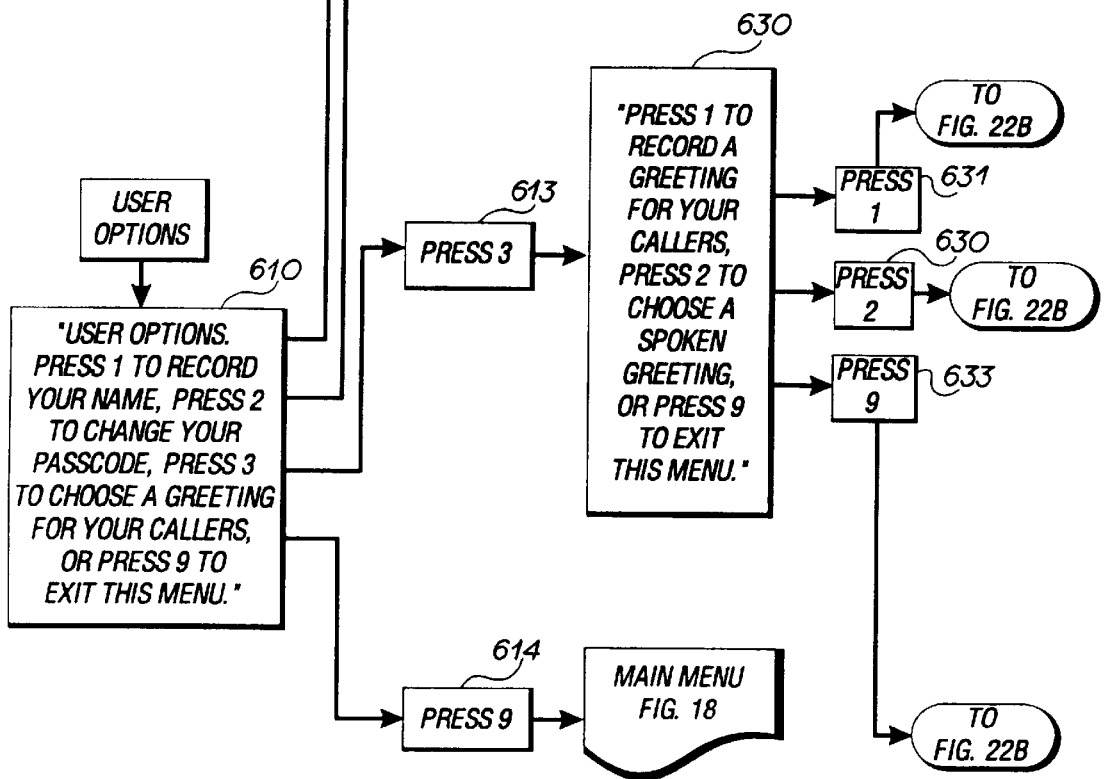
Figure 22B:
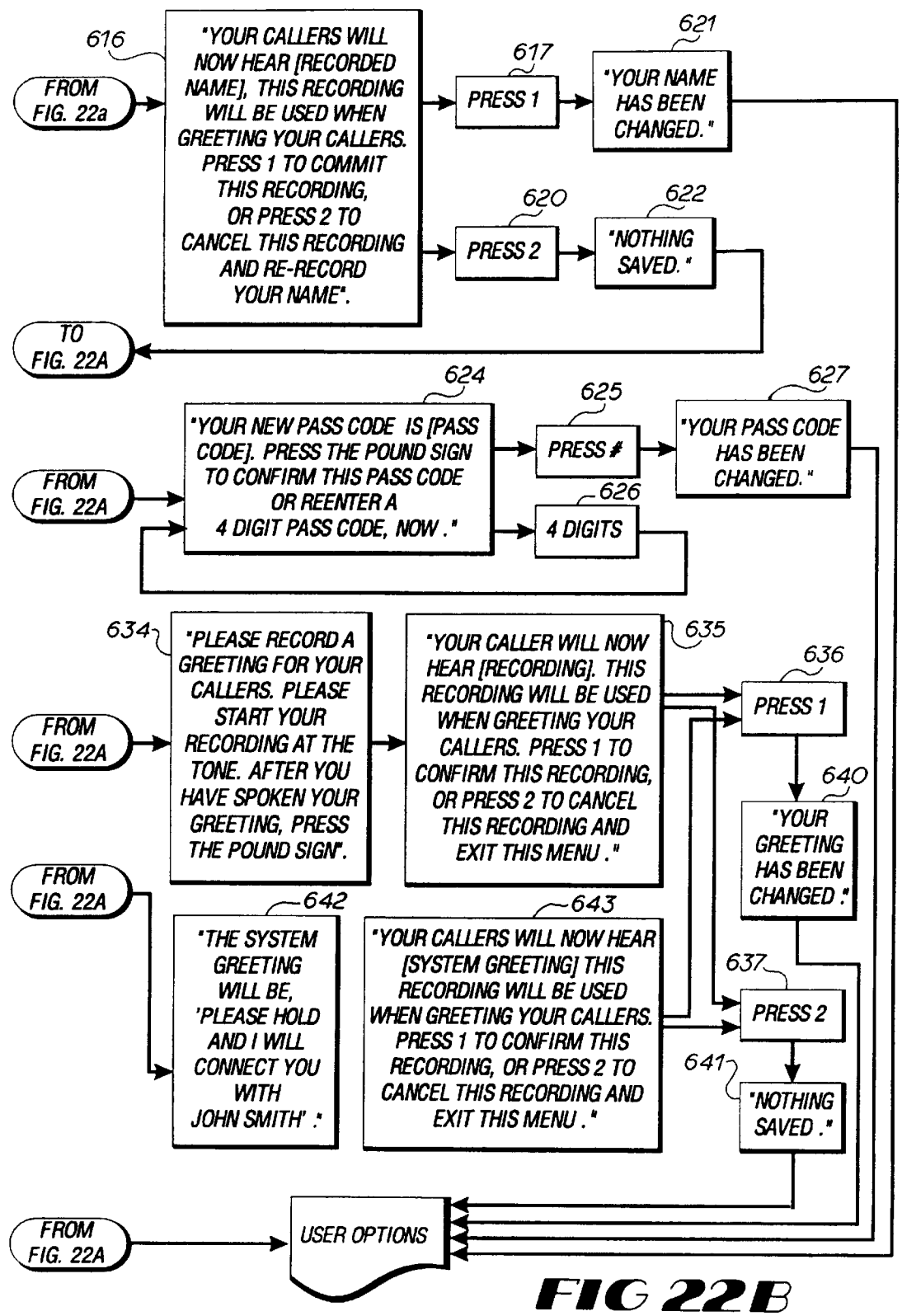

FIG. 22 is a flow chart illustrating the general method of user options in connection with the user interface.

FIG. 22 is entered at step 610 when the system makes the following announcement: "User options. Press 1 to record your name; press 2 to change your pass code; press 3 to choose a greeting for your caller; or press 9 to exit this menu." Thus, the subscriber is presented with four options: Record name-press 1, 611; change pass code-press 2, 612; choose greeting-press 3, 613; or exit menu-press 9, 614. If the subscriber chooses the first option, record name, in step 615 the system makes the following announcement: "Please record a name for your calls. Please say your name at the tone; after you have spoken your name, press the pound sign." In step 616, the system makes the following announcement: "Your callers will now hear [recorded name]. This recording will be used when greeting your callers. Press 1 to commit this recording, or press 2 to cancel this recording and re-record your name." Thus, the subscriber is presented with two options: Commit recording-press 1, 617; or cancel recording and re-record-press 2, 620. If the subscriber commits the recording, in step 621 the system makes the following announcement: "Your name has been changed." The system then returns to the user options menu. If the subscriber cancels the recording, in step 622 the system announces: "Nothing saved." The system then returns to step 615.

If at step 610 the subscriber chooses the second user option, change pass code, in step 623 the system makes the following announcement: "Please enter a new four digit pass code, now." In step 624, the system makes the following announcement: "Your new pass code is [pass code]. Press the pound sign to confirm this pass code, or reenter a four digit pass code, now." Thus, the subscriber has two options: "confirm pass code-press "#", 625; or reenter pass code, 626. If the subscriber chooses to reenter the pass code, the system repeats step 624. If the subscriber chooses to confirm the pass code, in step 627 the system makes the following announcement: "Your pass code has been changed." The system then returns to the user options menu.

If at step 610 the subscriber chooses the third user option, choose greeting, in step 630 the system makes the to following announcement: "Press 1 to record a greeting for your callers, press 2 to choose a system greeting, or press 9 to exit this menu." Thus, the subscriber has three options: record a greeting-press 1, 631; choose a system greeting-press 2, 632; or exit menu-press 9, 633. If the subscriber chooses to record a greeting, in step 634 the system makes the following announcement: "Please record a greeting for your callers. Please start your recording at the tone. After you have spoken your greeting, press the pound sign." In step 635, the system makes the following announcement: "Your callers will now hear [recording]. This recording will be used when greeting your callers. Press 1 to confirm this recording, or press 2 to cancel this recording and exit this menu." Thus, the subscriber has two options: confirm recording-press 1, 636; or cancel recording and exit menu-press 2, 637. If the subscriber chooses to confirm the recording, in step 640 the system makes the following announcement: "Your greeting has been changed." The system returns to the user options menu. If the subscriber chooses to cancel the recording and exit the menu, in step 641 the system makes the following announcement: "Nothing saved." The system then returns to the user options menu.

Referring again to step 630, if the subscriber chooses a system greeting, in step 642 the system makes the following announcement: "The system greeting will be 'Please hold and I will connect you with John Smith.'" In step 643, the system will make the following announcement: "Your callers will now hear [system greeting]. This recording will be used when greeting your callers. Press 1 to confirm this recording, or press 2 to cancel this recording and exit this menu." Thus, subscribers are presented with two options: Confirm recording-press 1, 636; or cancel the recording and exit menu-press 2, 637. These options are the same options as follow step 635, and are discussed above.

Referring again to step 630, if the subscriber chooses to exit the menu, the system returns to the user options menu.

Referring again to step 610, if the subscriber chooses the fourth option, exit menu, the system returns to the main menu.

Figure 23A:
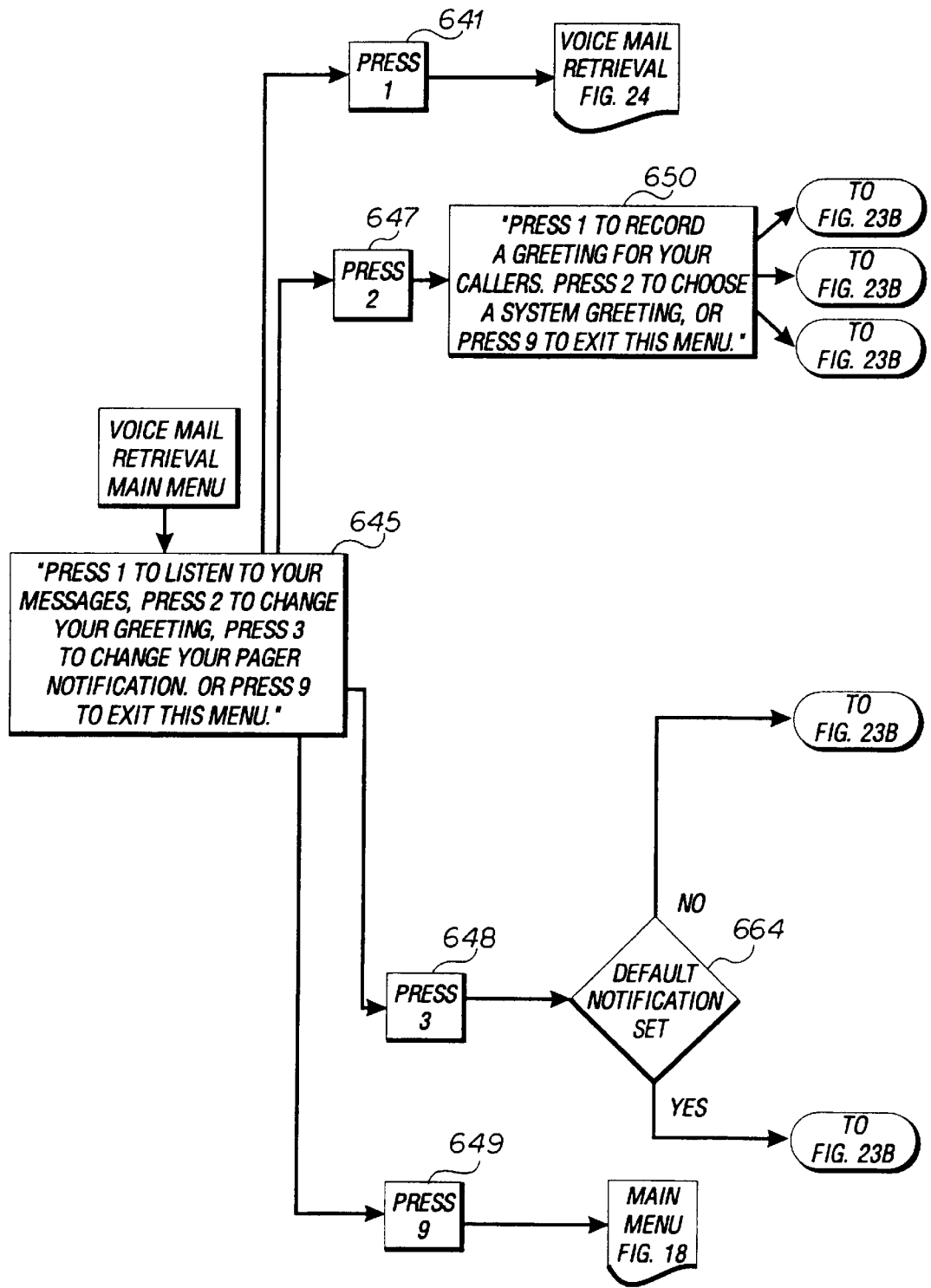
Figure 23B:
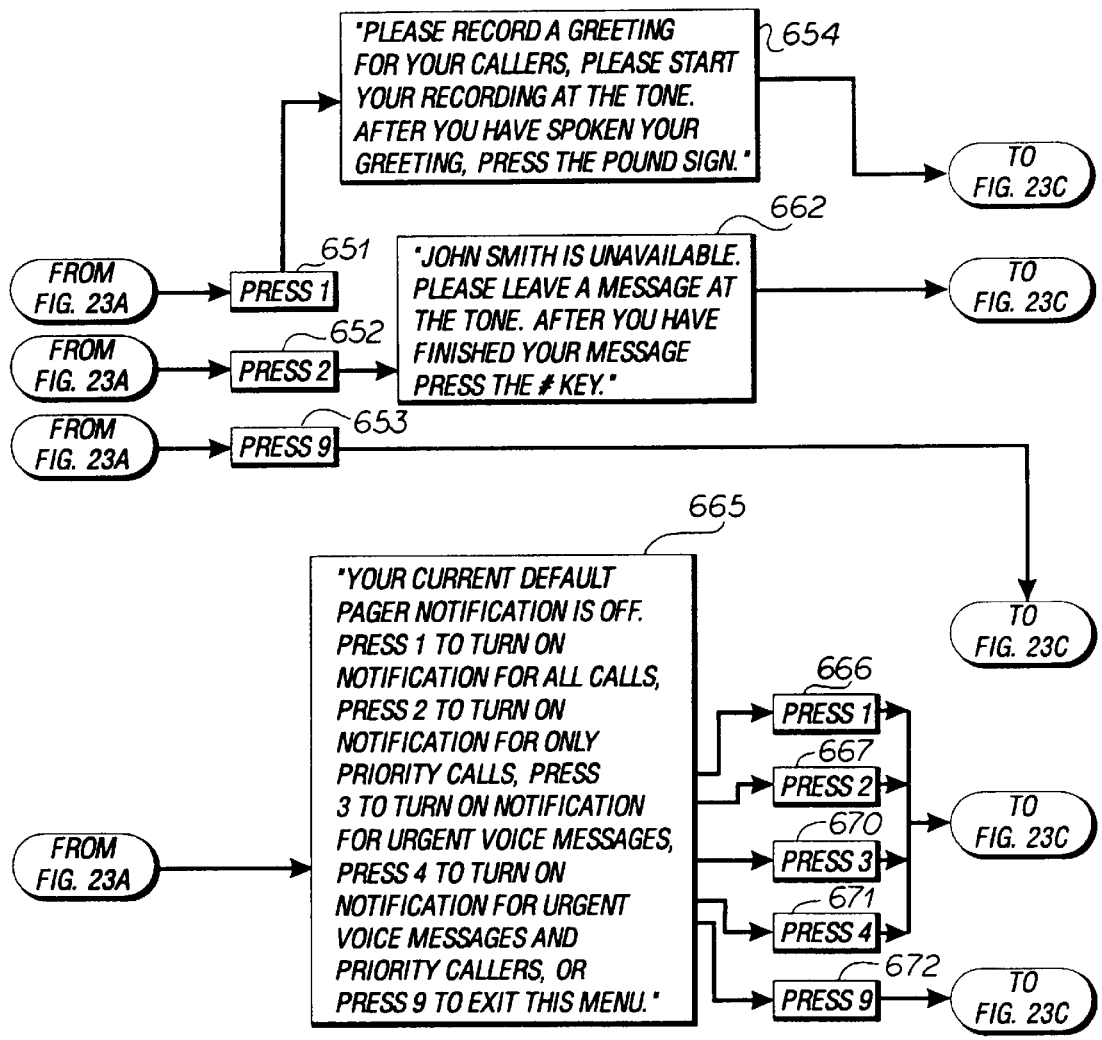
Figure 23B:
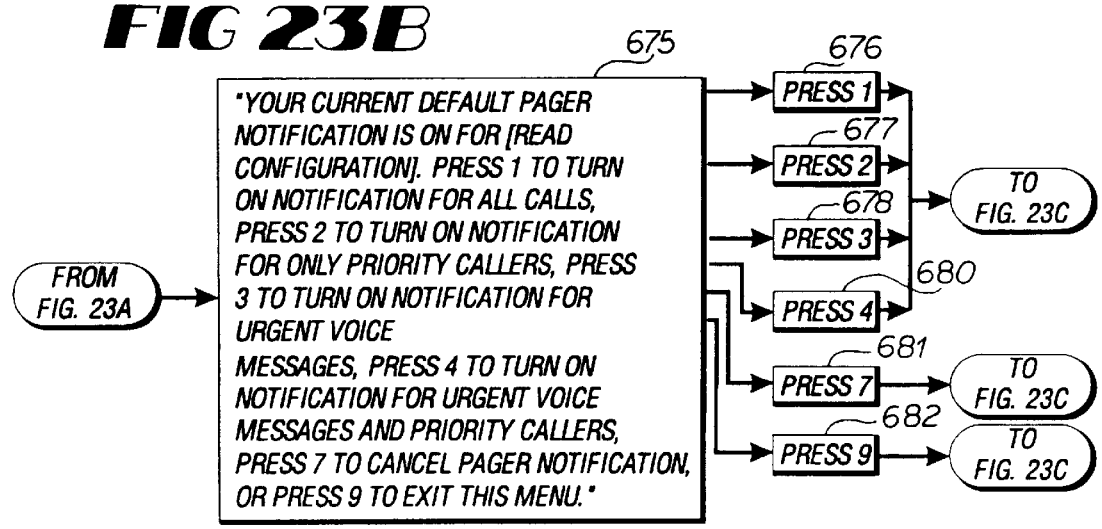

FIG. 23 is a flow chart illustrating the general method of user interface in connection with the voice mail retrieval main menu.

FIG. 23 is entered at step 645 when the system makes the following announcement: "Press 1 to listen to your messages, press 2 to change your greeting, press 3 to change your pager notification or press 9 to exit this menu." Thus, subscriber is presented with four options: Listen to messages-press 1, 646; change greeting-press 2, 647; change pager notification-press 3, 648; or exit menu-press 9, 649. If the first option is chosen, listen to messages, the system proceeds to the voice mail retrieval menu shown in FIG. 24. If the subscriber chooses the second option, change your greeting, in step 650 the system makes the following announcement: "Press 1 to record a greeting for your callers, press 2 to choose a system greeting, or press 9 to exit this menu." Thus, the subscriber has three options: record greeting-press 1, 651; choose system greeting-press 2, 652; or exit menu-press 9, 653. If the subscriber chooses the first option, in step 654 the system makes the following announcement: "Please record a greeting for your callers, please start your recording at the tone. After you have spoken your greeting, press the pound sign." In step 655, the system makes the following announcement: "Your callers will now hear [recording]. This recording will be used when greeting your callers. Press 1 to confirm this recording, or press 2 to cancel this recording and exit this menu." Thus, the subscriber has two options: confirm recording-press 1, 656; or exit menu-press 2, 657. If the subscriber chooses the first option, in step 660 the system makes the following announcement: "Your greeting has been changed." The system then proceeds to the user options menu. If the subscriber chooses to cancel the recording and exit the menu, in step 661 the system makes the following announcement: "Nothing saved." The system then returns to the user options menu.

Referring again to step 650, if the subscriber chooses the option of choosing a system greeting, in step 662 the system makes the following announcement: "John Smith is unavailable. Please leave a message at the tone. After you have finished your message press the pound key." In step 663, the system makes the following announcement: "Your callers will now hear [system greeting]. This recording will be used when greeting your callers. Press 1 to confirm this recording or press 2 to cancel this recording and exit this menu." Thus, the subscriber has two options: confirm recording-press 1, 656; or cancel recording and exit menu-press 2, 657. These steps are discussed above.

Referring again to step 650, if the subscriber chooses to exit the menu, the system proceeds to the user options menu.

Referring again to step 645, if the subscriber chooses the third option, change pager notification, in step 664 the system checks whether the default notification has been set. If not, in step 665 the system makes the following announcement: "Your current default pager notification is off. Press 1 to turn on notification for all calls, press 2 to turn on notification for only priority calls, press 3 to turn on notification for urgent voice messages, press 4 to turn on notification for urgent voice messages and priority callers, or press 9 to exit this menu." Thus, the subscriber has five options: turn on notification for all calls-press 1, 666; turn on notification for only priority callers-press 2, 667; turn on notification for urgent voice messages-press 3, 670; turn on notification for urgent voice messages and priority callers-press 4, 671; or exit menu-press 9, 672. If the subscriber chooses any of the first four of these five options, in step 673 the system announces: "Pager notification is now on." The system then proceeds to the user options menu. If the subscriber chooses the fifth option, in step 674 the system announces: "Nothing saved." The system then proceeds to the user options menu.

Referring again to step 664, if the default notification is set, in step 675 the system makes the following announcement: "Your current default pager notification is on for [read configuration]. Press 1 to turn on notification for all calls, press 2 to turn on notification for only priority callers, press 3 to turn on notification for urgent voice messages, press 4 to turn on notification for urgent voice messages and priority callers, press 7 to cancel pager notification, or press 9 to exit this menu." Thus, the subscriber has six options: Turn on notification for all calls-press 1, 676; turn on notification for only priority callers-press 2, 677; turn on notification for urgent voice messages-press 3, 678; turn on notification for urgent voice messages and priority callers-press 4, 680; cancel pager notification-press 7, 681; and exit menu-press 9, 682. If the subscriber chooses any of the first four of these six options, in step 683 the system announces: "Pager notification is now on." If the subscriber chooses the fifth option, in step 684 the system makes the following announcement: "Pager notification is off." If the subscriber chooses the sixth option, in step 685 the system announces: "Nothing saved." The system proceeds to the user options menu after step 683, 684 or 685.

Referring again to step 645, if the subscriber chooses the fourth option, exit menu, the system proceeds to the main menu.

Figure 24A:
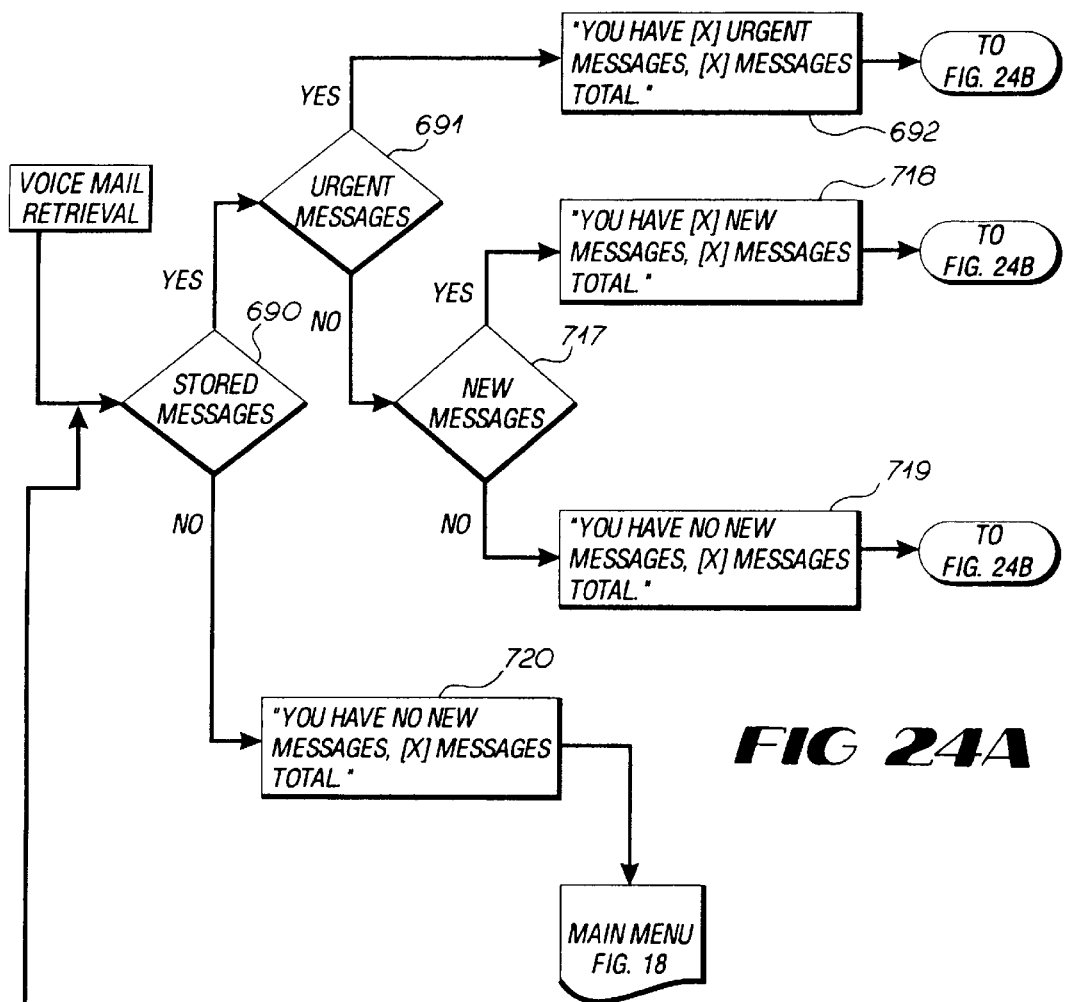
Figure 24A:
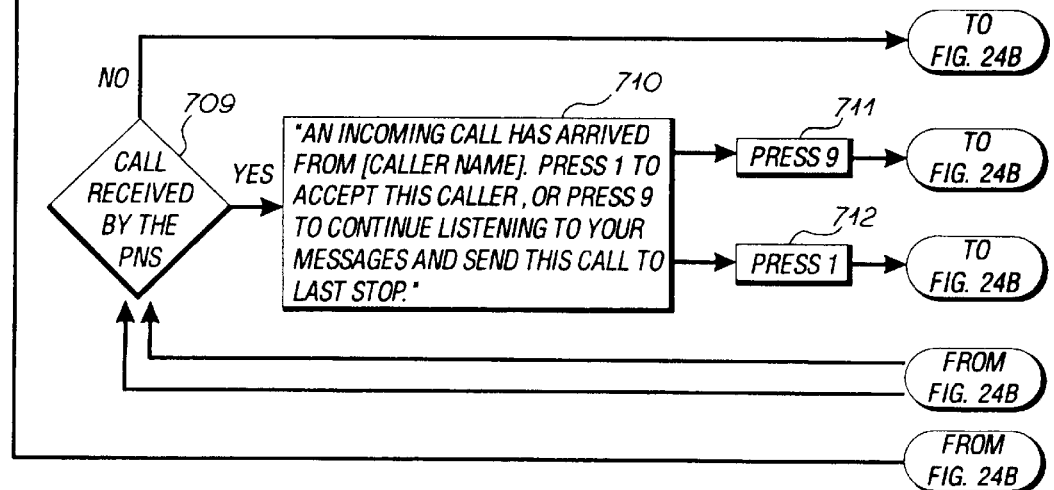
Figure 24C:
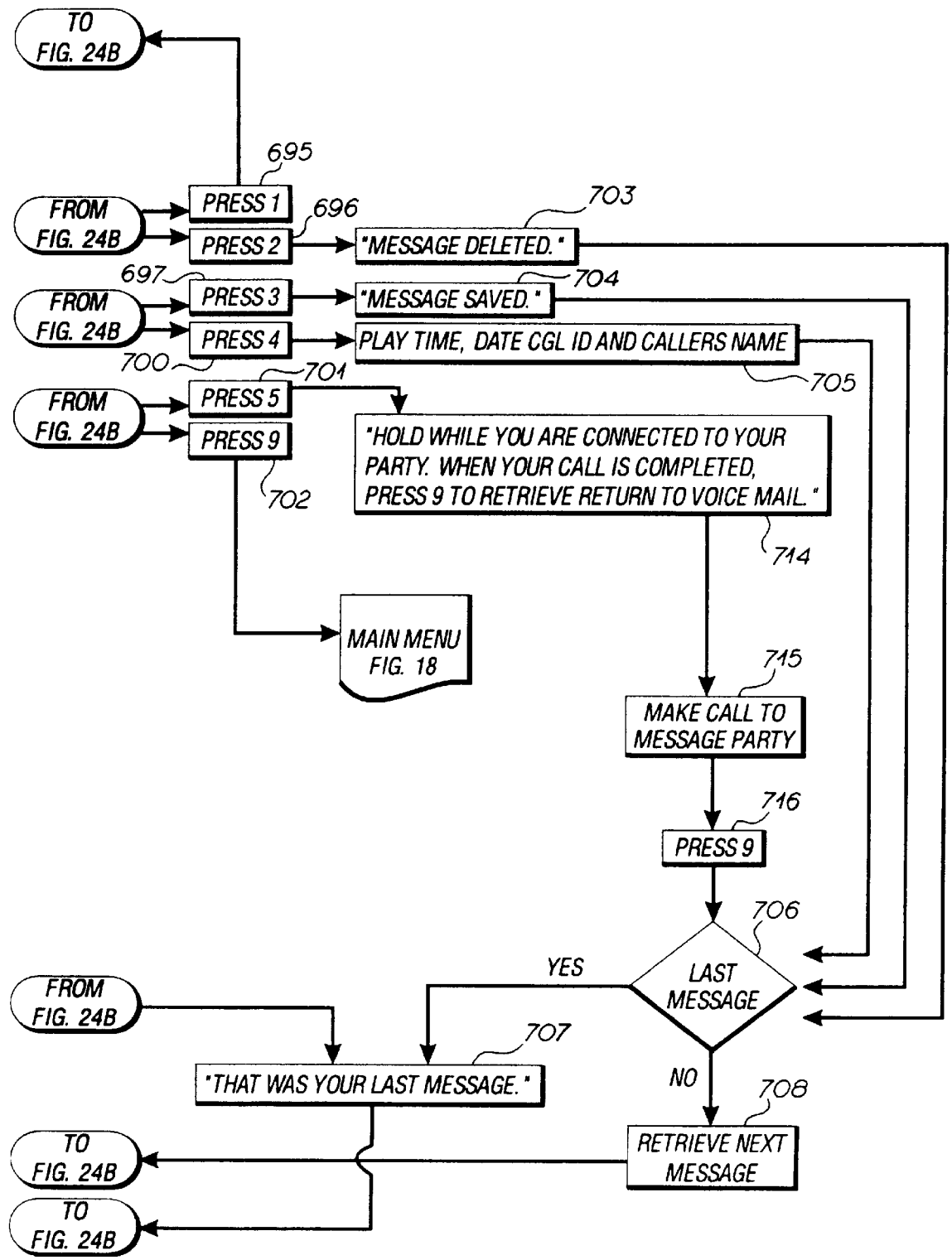

FIG. 24 is a flow chart illustrating the general method of user interface in connection with voice mail retrieval.

FIG. 24 is entered at step 690 when the system checks for stored messages. If there are stored messages, in step 691 the system checks for urgent messages. If there are urgent messages, in step 692 the system makes the following announcement: "You have [X] urgent message, [X] messages total." In step 693, the system provides information relating to the date, time, and recorded message. In step 694, the system makes the following announcement: "Press 1 to play the current message, press 2 to delete this message, press 3 to save this message, press 4 to get envelope information, press 5 to return the call of the message party, or press 9 to exit this menu." Thus, the subscriber has six options: play message-press 1, 695; delete message-press 2, 696; save message-press 3, 697; get envelope information-press 4, 700; return call-press 5, 701; or exit menu-press 9, 702. If the subscriber chooses to play the current message, the message played in step 694 is repeated. If the subscriber chooses to delete the message, in step 703 the system makes the following announcement: "Message deleted." If the subscriber chooses to save the message, in step 704 the following message is announced: "Message saved." If the subscriber chooses to receive the envelope information, in step 705 the system announces the time of the message, the date of the message, the calling line number identification (CLID), and the caller's name.

Following steps 703 through 705, in step 706 the system checks to determine whether the message played was the last message. If so, in step 707 the system makes the following announcement: "That was your last message." The system then returns to the voice mail retrieval menu.

Referring again to step 706, if the message played was not the last message, in step 708 the system retrieves the next message. In step 709, the system checks to determine whether a call has been received by the network platform. If not, the system proceeds to step 693, discussed above. If a call has been received, in step 710 the system makes the following announcement: "An incoming call has arrived from [caller name]. Press 1 to accept this caller, or press 9 to continue listening to your messages and send this call to the last stop." Thus, the subscriber has two options: send call to last stop-press 9, 711; or accept call-press 1, 712. If the subscriber chooses to send the call to last stop, the system proceeds to step 693, discussed above. If the subscriber decides to accept the call, in step 713 the system makes the following announcement: "You are now connected to your caller." The system then considers the service complete.

Referring again to step 694, if the subscriber chooses to return the call of the message party, in step 714 the system makes the following announcement: "Hold while you are connected to your party. When your call is completed, press 9 to retrieve return to voice mail." In step 715, the system makes the call to the message party. In step 716, the system responds to the press 9 instruction of a subscriber by proceeding to step 706, discussed above.

Referring again to step 694, if the subscriber chooses to exit the menu, the system proceeds to the main menu.

Referring again to step 691, if there are no urgent messages, in step 717 the system checks for new messages. If there are new messages, in step 718 the system makes the following announcement: "You have [X] new messages, [X] new messages total." The system then proceeds to step 693, discussed above, to announce the date, the time, and the recorded message to the subscriber. Referring again to step 717, if there are no new messages, in step 719 the system makes the following announcement: "You have no new messages, [X] messages total." The system then proceeds to step 693 discussed above, to announce the date, time, and the recorded message to the subscriber.

Referring again to step 690, if there are no stored messages, in step 720 the system makes the following announcement: "You have no new messages, [X] messages total." The system then proceeds to the main menu.

The preferred embodiment of the present invention allows subscribers to scan messages in step 721 by simply pressing the # key. In step 722, the system scans to the next message. In step 723, the system checks whether the message is the last message. If the message is the last message, the system proceeds to step 707, described above. If the message is not the last message, the system proceeds to step 709, described above.

Figure 25:
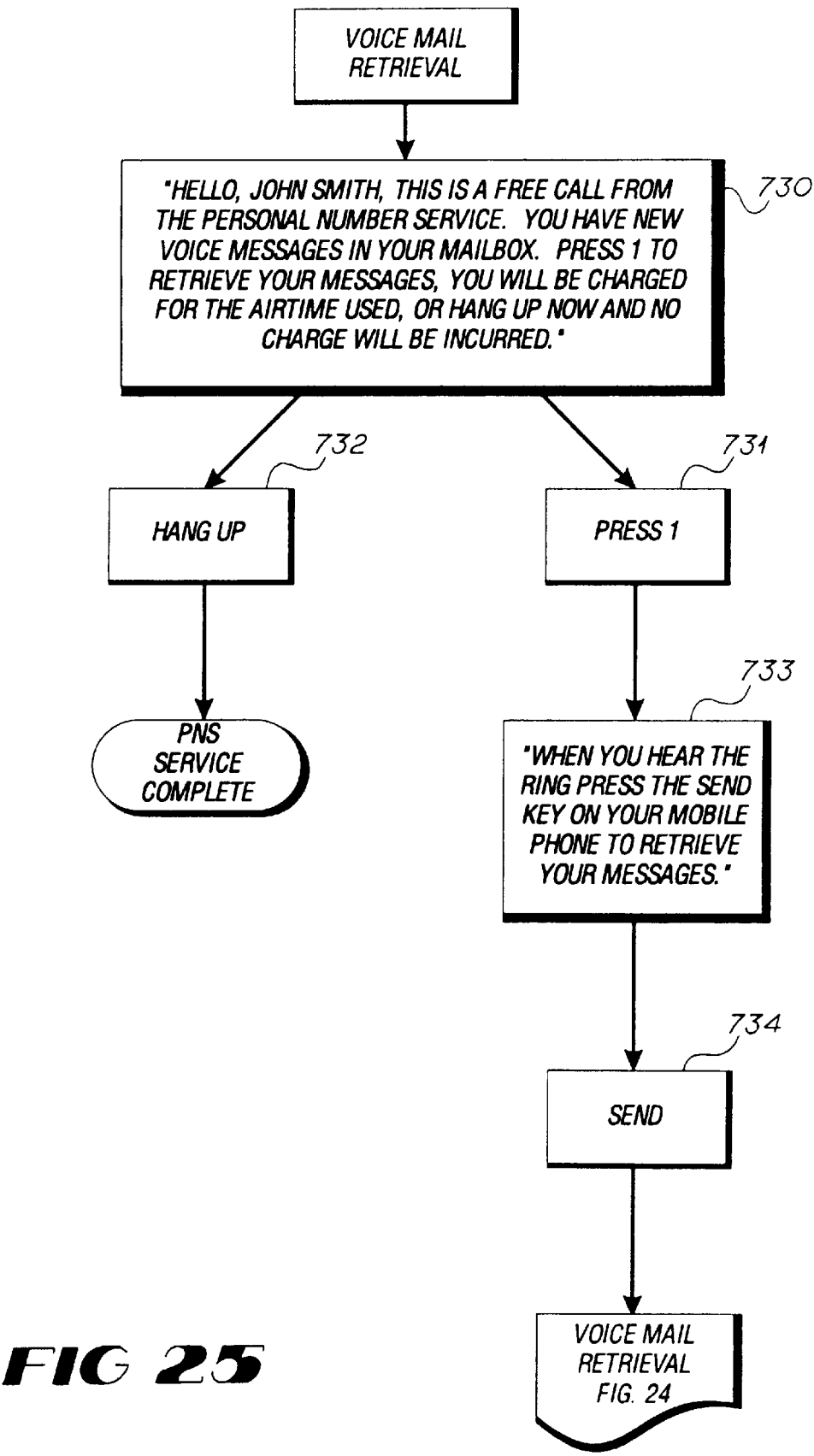

FIG. 25 is a flow chart illustrating the general method of user interface in connection with the PNS voice mail system call notification.

FIG. 25 is entered at step 730 when the system makes the following announcement: "Hello John Smith, this is a free call from the personal number service. You have new voice messages in your mailbox. Press 1 to retrieve your messages, you will be charged for the airtime used, or hang up now and no charge will be incurred." Thus, the subscriber has two options: retrieve messages-press 1, 731; or hang up, 732. If the subscriber chooses to retrieve messages, in step 733 the system makes the following announcement: "When you hear the ring press the send key on your mobile phone to retrieve the messages." In step 734, the system sends the messages, and returns to voice mail retrieval. If the subscriber chooses to hang up (step 732), the system considers the service complete.

Figure 26A:
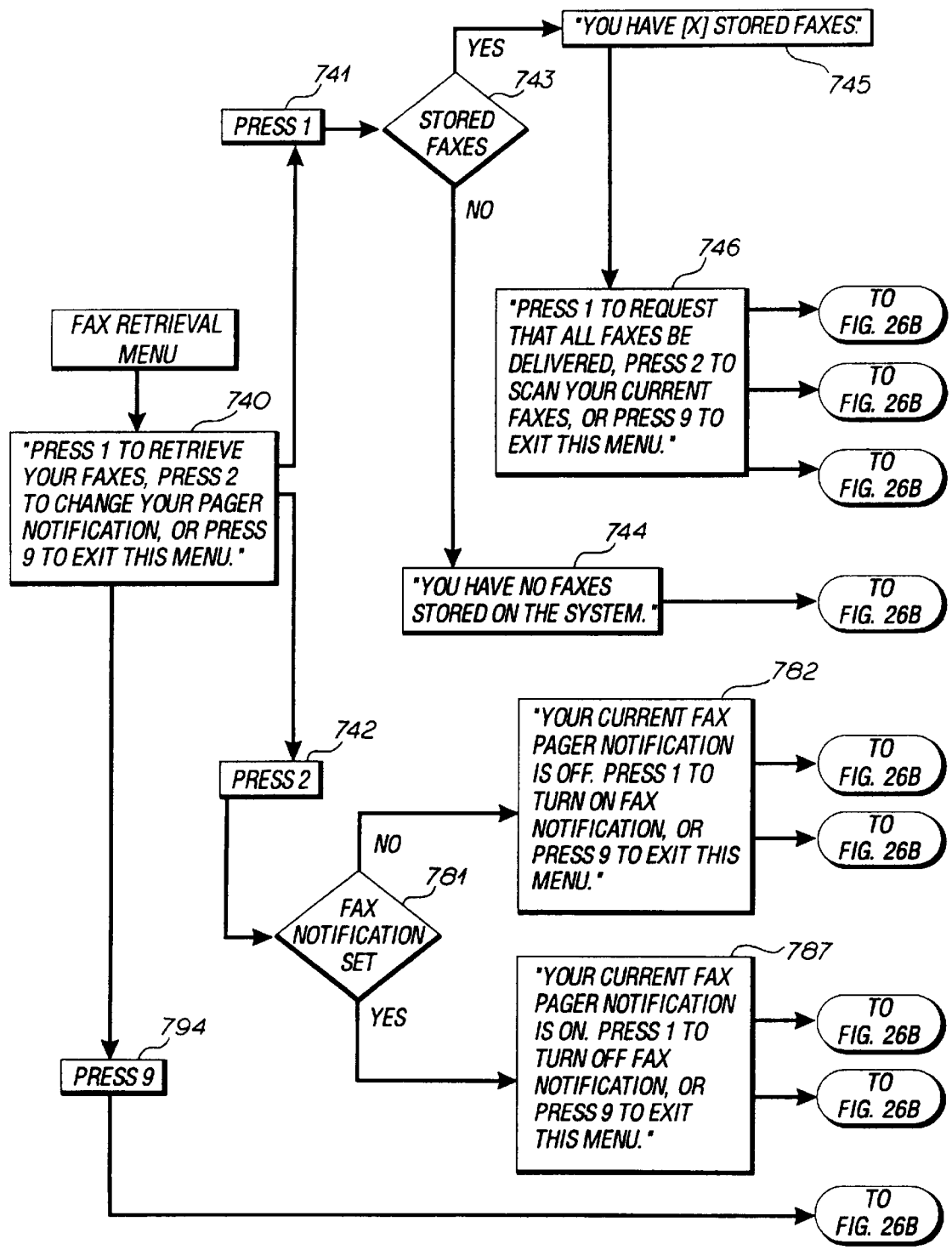
Figure 26C:
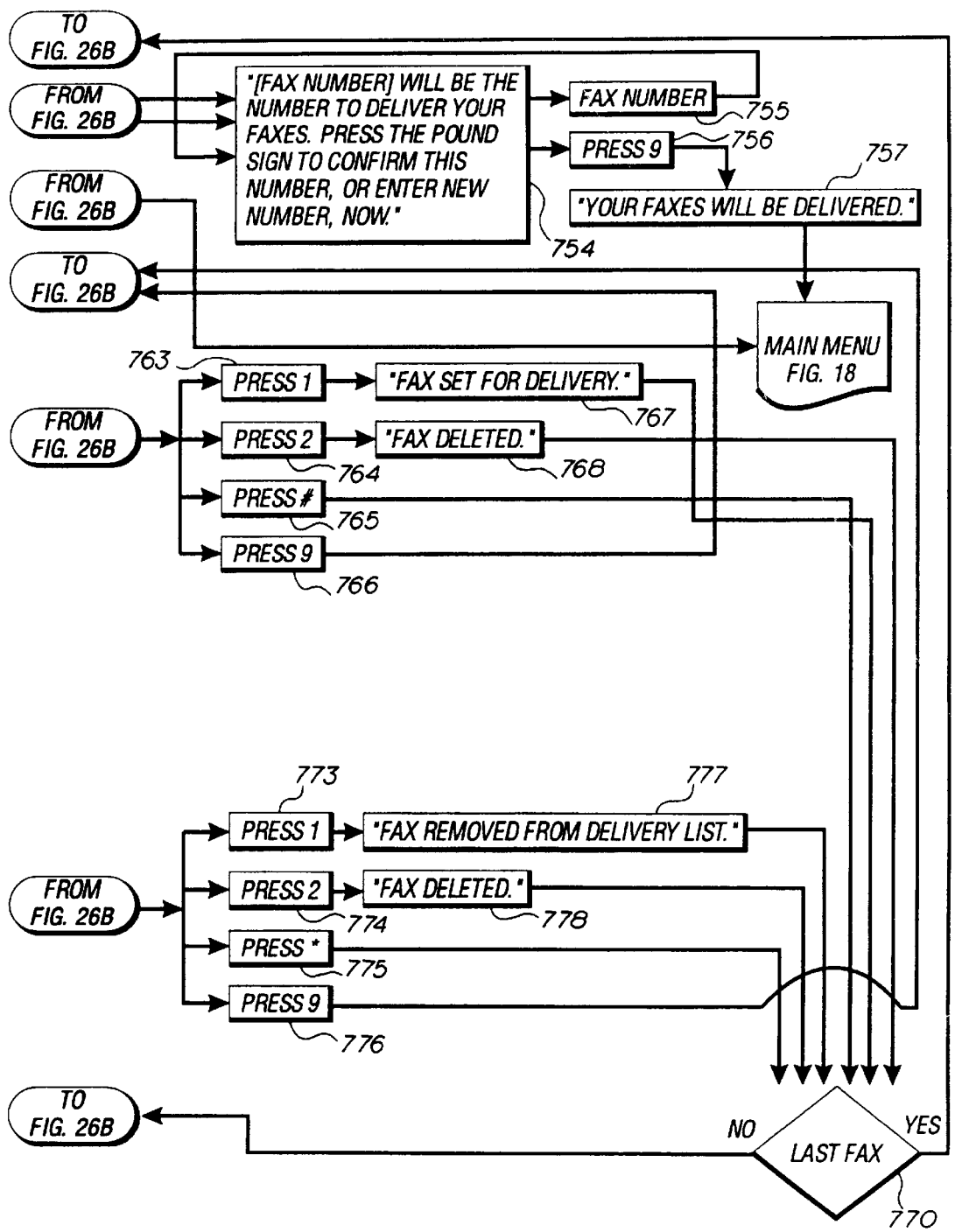

FIG. 26 is a flow chart illustrating the general method of the user interface in connection with the facsimile message retrieval menu.

FIG. 26 is entered at step 740 when the system makes the following announcement: "Press 1 to retrieve your faxes, press 2 to change your pager notification, or press 9 to exit this menu." Thus, the subscriber has three options: retrieve facsimile messages-press 1, 741; change pager notification-press 2, 742; or exit menu-press 9. If the subscriber chooses to retrieve facsimile messages, in step 743 the system checks to determine whether facsimile messages are stored. If not, in step 744 the system makes the following announcement: "You have no faxes stored on the system." The system then returns to the main menu.

If facsimile messages are stored, in step 745 the system makes the following announcement: "You have [X] stored faxes." Then, in step 746 the system makes the following announcement: "Press 1 to request that all faxes be delivered, press 2 to scan your current faxes, or press 9 to exit this menu." Thus, the subscriber has three options: request facsimile message delivery-press 1, 747; scan facsimile messages-press 2, 748; or exit menu-press 9, 749. If the subscriber chooses to request facsimile message delivery, in step 750 the system makes the following announcement: "Press pound to have your faxes delivered to your system defined fax machine, enter a new fax delivery number, now, or press 9 to stop the fax delivery and exit this menu." Thus, the subscriber has three options: deliver facsimile messages-press #, 751; enter new facsimile number, 752; or exit menu-press 9, 753. If the subscriber chooses either of the first two options, then in step 754 the system makes the following announcement: "[Fax number] will be the number to deliver your faxes. Press the pound sign to confirm this number, or enter a new number, now." Thus, the subscriber has the option of entering a new fax number in step 755, or pressing the pound sign in step 756.

If the subscriber chooses to enter a new fax number, the system repeats step 754. If the subscriber presses the pound sign, in step 757 the system makes the following announcement: "Your faxes will be delivered." The system then proceeds to the main menu.

Referring again to step 750, if the subscriber decides to stop the facsimile message delivery and exit the menu, the system proceeds to the main menu.

Referring again to step 746, if the subscriber chooses the second option, scan current faxes, then in step 760 the system announces the TSI, date, time, and originating calling line number identification. In step 761, the system checks to determine whether the facsimile message has already been set for delivery. If not, in step 762 the system makes the following announcement: "Press 1 to mark this fax for delivery, press 2 to delete this fax, press the pound sign to continue scanning your faxes, or press 9 to exit this menu." Thus, the subscriber has four options: Mark facsimile message for delivery-press 1, 763; delete facsimile message-press 2, 764; scan facsimile messages-press #, 765; or exit menu-press 9, 766. If the subscriber chooses the first option of marking the facsimile message for delivery, in step 767 the system makes the following announcement: "Fax set for delivery." Then in step 770, the system checks to determine whether the facsimile message is the last facsimile message. If it is, the system proceeds to step 750, discussed above. If not, the system proceeds to step 771 and retrieves the next facsimile message. Then, the system returns to step 760.

Referring again to step 762, if the subscriber chooses a second option, delete facsimile message, in step 768 the system makes the following announcement: "Fax deleted." The system then proceeds to step 770, discussed above. If the subscriber chooses the third option, continue scanning facsimile messages, the system proceeds to step 770, discussed above. If the subscriber chooses to exit the menu, the system proceeds to step 750, discussed above.

Referring again to step 761, if the facsimile message is already set for delivery, in step 772 the system makes the following announcement: "Press 1 to remove this fax from the delivery list, press 2 to delete this fax, press the pound sign to continue scanning your faxes, or press 9 to exit this menu." Thus, the subscriber has four options: remove facsimile message from delivery list-press 1, 773; delete facsimile message-press 2, 774; continue scanning facsimile messages-press #, 775; or exit menu-press 9, 776. If the subscriber chooses the first option, then in step 777 the system makes the following announcement: "Fax removed from delivery list." The system then proceeds to step 770, discussed above. If the subscriber chooses a second option, then in step 778 the system makes the following announcement: "Fax deleted." The system then proceeds to step 770. If the subscriber chooses the third option of continuing to scan facsimile messages, then the system proceeds to step 770. If, however, the subscriber chooses the fourth option, exit the menu, the system then proceeds to step 750.

Referring again to step 746, if the subscriber chooses the third option, exit the menu, the system returns to the main menu.

Referring again to step 740, if the subscriber chooses the second option, change pager notification, in step 781 the system checks to determine whether the facsimile message has been set. If not, in step 782 the system makes the following announcement: "Your current fax pager notification is off. Press 1 to turn on fax notification, or press 9 to exit this menu." Thus, the subscriber has two options: turn on fax notification-press 1, 783; or exit menu-press 9, 784. If the subscriber chooses to turn on fax notification, in step 785 the system makes the following announcement: "Fax notification is on." The system then proceeds to the main menu. If the subscriber chooses to exit the menu, in step 786 the system makes the following announcement: "Nothing changed." The system then proceeds to the main menu.

Referring again to step 781, if the facsimile message notification has been set, then in step 787 the system makes the following announcement: "Your current fax pager notification is on. Press 1 to turn off fax notification, or press 9 to exit this menu." Thus, the subscriber has two options: turn off facsimile message notification-press 1, 790; or exit menu-press 9, 791. If the subscriber chooses to turn off facsimile message notification, then in step 792 the system makes the following announcement: "Fax notification is off." The system then proceeds to the main menu. If the subscriber chooses to exit the menu, in step 793 the system makes the following announcement: "Nothing changed." The system then proceeds to the main menu.

Referring again to step 740, if the subscriber chooses to exit the menu in step 794, the system then proceeds to the main menu.

While this invention has been described in detail with particular reference to preferred embodiments thereof, it will be understood that variations and modifications can be effected within the spirit and scope of the invention as described hereinabove and as defined in the appended claims.

We claim:

1. A method for disposal of a voice mail message for a subscriber using a mobile telephone, said voice mail message having been received on a first calling line from a source, comprising the steps of:

accessing a voice mail service in response to an instruction from said subscriber received on a second calling line from said mobile telephone;

playing said voice mail message for said subscriber;

receiving a call back indication from said subscriber;

automatically generating a call to the calling line number associated with said first calling line in response to said call back indication from said subscriber; and connecting the subscriber to said first calling line if said call is successful.

2. The method of claim 1, further comprising the steps of monitoring said call to determine when said call is terminated and returning said subscriber to said voice mail service, in response to said call being terminated.

3. The method of claim 1, further comprising the step of announcing the number of voice mail messages received for said subscriber in response to said step of accessing said voice mail service.

4. The method of claim 1, wherein said step of playing said first voice mail message comprises determining source identification information for said subscriber, said source identification information including said first calling line number associated with said first calling line as determined by automatic number identification and the identity of said source as determined by comparison with information in a reverse white pages database and playing said source identification for said subscriber.

5. The method of claim 1, wherein said step of playing a voice mail message for said subscriber comprises playing source information separately from said voice mail message for said subscriber, said source information including said calling line number associated with said first calling line and the identity of said source.

6. The method of claim 1, wherein said voice mail service resides within a telephone network platform.

7. A method for returning a voice mail message for a subscriber of a voice mail service, comprising the steps of:
   accessing said voice mail service in response to an instruction from said subscriber received on a second calling line on a public switched telephone network;
   playing a first voice mail message for said subscriber, said first voice mail message having been received on a first calling line from a source and said first voice mail message and the first calling line number having been recorded;
   receiving a call back indication from said subscriber;
   automatically generating a call to said source of said first voice mail message in response to said call back indication by calling said first calling line number associated with said first calling line;
   connecting the subscriber to said first calling line if said call is successful;
   monitoring said call to determine when said call is terminated; and
   returning said subscriber to said voice mail service, in response to said call being terminated.

8. The method of claim 7, further comprising the step of playing a second voice mail message for said subscriber in response to said step of returning said subscriber to said voice mail service.

9. The method of claim 7, further comprising the step of announcing the number of voice mail messages received for said subscriber in response to said step of accessing said voice mail service.

10. The method of claim 7, wherein said step of playing said first voice mail message comprises determining source identification information for said subscriber, said source identification information including said first calling line number associated with said first calling line as determined by automatic number identification and the identity of said source as determined by comparison with information in a reverse white pages database and playing said source identification for said subscriber.

11. The method of claim 7, wherein said call back indication from said subscriber is received at a subscriber-selected point in said first voice mail message.

12. The method of claim 11, wherein said subscriber-selected point of said first voice mail message is the conclusion of said first voice mail message.

13. The method of claim 11, wherein said step of calling said first calling line number comprises leaving said voice mail service at said subscriber-selected point of said first voice mail message.

14. The method of claim 13, wherein said step of returning said subscriber to said voice mail service comprises returning said subscriber to said voice mail service at said subscriber-selected point of said first voice mail message.

15. The method of claim 7, wherein said subscriber accesses said voice mail service via a mobile telephone.

16. The method of claim 7, wherein said voice mail service resides within a telephone network platform.

17. The method of claim 16, wherein said first calling line number is recorded in a database associated with said network platform.

18. A method for returning a plurality of voice mail messages for a subscriber by a voice mail service residing within a telephone network platform, comprising the steps of:
   receiving a first communication with a voice mail message for said subscriber on a first calling line;
   recording said calling line number in a database associated with said network platform;
   receiving a second communication with a request from said subscriber to play said voice mail message;
   playing said voice mail message for said subscriber;
   receiving a call back indication from said subscriber;
   retrieving said first calling line number from said database associated with said network platform;
   automatically generating a third communication to the calling line number associated with said first calling line; and
   connecting said subscriber with said calling line associated with said first calling line number if said call is successful.

19. The method of claim 18, further comprising the steps of:
   monitoring said third communication to determine when said communication is terminated; and
   returning said subscriber to said voice mail service, in response to said communication being terminated.

20. The method of claim 18, wherein said subscriber accesses said voice mail service via a mobile telephone.

* * * * *